United States Patent
Kovacs et al.

(10) Patent No.: US 12,442,729 B2
(45) Date of Patent: Oct. 14, 2025

(54) DEVICES USEFUL FOR SAMPLE MANIPULATION

(71) Applicant: Singular Genomics Systems, Inc., San Diego, CA (US)

(72) Inventors: Sandor Kovacs, Middletown, DE (US); Yuji Ishitsuka, San Diego, CA (US); Kevin Marshall, San Diego, CA (US); Jaekyung Koh, San Diego, CA (US)

(73) Assignee: Singular Genomics Systems, Inc., San Diego, CA (US)

( * ) Notice: Subject to any disclaimer, the term of this patent is extended or adjusted under 35 U.S.C. 154(b) by 0 days.

(21) Appl. No.: 18/940,271

(22) Filed: Nov. 7, 2024

(65) Prior Publication Data

US 2025/0155332 A1    May 15, 2025

Related U.S. Application Data

(60) Provisional application No. 63/672,169, filed on Jul. 16, 2024, provisional application No. 63/665,058, filed on Jun. 27, 2024, provisional application No. 63/603,870, filed on Nov. 29, 2023, provisional application No. 63/598,373, filed on Nov. 13, 2023.

(51) Int. Cl.
*G01N 1/00*    (2006.01)
*G01N 1/28*    (2006.01)

(52) U.S. Cl.
CPC .................................. *G01N 1/2813* (2013.01)

(58) Field of Classification Search
None
See application file for complete search history.

(56) References Cited

U.S. PATENT DOCUMENTS

| | | | |
|---|---|---|---|
| 10,082,451 | B2 | 9/2018 | Chen et al. |
| 10,695,157 | B2 * | 6/2020 | Poyss ..................... A01N 1/146 |
| 10,724,078 | B2 | 7/2020 | Driel et al. |
| 10,957,071 | B2 | 3/2021 | Sarkar et al. |
| 11,747,262 | B2 | 9/2023 | Kovacs et al. |
| 12,066,370 | B2 | 8/2024 | Kovacs et al. |
| 2018/0100856 | A1 | 4/2018 | McDonough et al. |
| 2018/0149562 | A1 | 5/2018 | Kawano |
| 2020/0209120 | A1 | 7/2020 | Carbone et al. |
| 2020/0316589 | A1 | 10/2020 | Genty |
| 2024/0241018 | A1 | 7/2024 | Ishitsuka et al. |

FOREIGN PATENT DOCUMENTS

WO    WO-2024/163634 A2    8/2024

OTHER PUBLICATIONS

Chen, K. H. et al. (Apr. 9, 2015). "Spatially resolved, highly multiplexed RNA profiling in single cells," *Science* 348(6233): aaa6090.

Gao, X. H. et al. (Mar. 12, 2020). "Comparison of fresh frozen tissue with formalin-fixed paraffin-embedded tissue for mutation analysis using a multi-gene panel in patients with colorectal cancer," *Frontiers in oncology* 10: 310.

(Continued)

*Primary Examiner* — Jyoti Nagpaul
(74) *Attorney, Agent, or Firm* — Mintz, Levin, Cohn, Ferris, Glovsky and Popeo, P.C.; Zachary L. Terranova

(57) ABSTRACT

Disclosed herein, inter alia, are devices and methods for efficient transfer and analyses of cellular material, tissue samples, such as tissue sections.

11 Claims, 22 Drawing Sheets

(56) References Cited

OTHER PUBLICATIONS

Kawamoto, T. (2003). "Use of a new adhesive film for the preparation of multi-purpose fresh-frozen sections from hard tissues, whole-animals, insects and plants," *Archives of histology and cytology* 66(2): 123-143.
Qin, C. et al. (Sep. 5, 2018). "The cutting and floating method for paraffin-embedded tissue for sectioning," *Journal of visualized experiments: JoVE* 139.
Ticha, P. et al. (Nov. 11, 2020). "A novel cryo-embedding method for in-depth analysis of craniofacial mini pig bone specimens," *Scientific Reports* 10: Article 19510, pp. 1-11.
Wang, G. et al. (Mar. 19, 2018). "Multiplexed imaging of high-density libraries of RNAs with MERFISH and expansion microscopy," *Scientific reports* 8(1): 4847.
Wang, X. et al. (Jul. 27, 2018). "Three-dimensional intact-tissue sequencing of single-cell transcriptional states," *Science* 361(6400): eaat5691.
Yang, Y. et al. (Jan. 2021, e-published Mar. 31, 2020). "A modified tape transfer approach for rapidly preparing high-quality cryosections of undecalcified adult rodent bones," *Journal of Orthopaedic Translation* 26: 92-100.

\* cited by examiner

Tissue section ribbon

DEVICES USEFUL FOR SAMPLE MANIPULATION

CROSS-REFERENCE TO RELATED APPLICATIONS

This application claims the benefit of U.S. Provisional Application No. 63/672,169, filed Jul. 16, 2024, U.S. Provisional Application No. 63/665,058, filed Jun. 27, 2024, U.S. Provisional Application No. 63/603,870, filed Nov. 29, 2023, U.S. Provisional Application No. 63/598,373, filed Nov. 13, 2023, each of which are incorporated herein by reference in their entirety and for all purposes.

BACKGROUND

Methods for acquiring, preparing, and storing tissue sections for either immediate or future analysis have been largely unchanged for decades. For example, when a patient has a biopsy or surgery, the surgeon often removes a portion of tissue for examination by a pathologist. The resected tissue may then be snap-frozen in liquid nitrogen shortly after surgical resection, generating what is commonly referred to as "fresh frozen" tissue. Alternatively, the resected tissue may be preserved in formaldehyde, embedded in paraffin wax, and optionally stored at room temperature, referred to as formalin-fixation and paraffin embedding (FFPE). Both preservation methods are widely used for preserving the macroscopic architecture of cellular structures (e.g., preserve tissue architecture, cell shape, and the components of the cell, such as proteins, DNA, RNA, carbohydrates, and enzymes) in tissue sections. Once a tissue sample has been prepared (e.g., either a fresh frozen sample or FFPE tissue block), a pathologist typically slices the tissue sample into very thin sections (e.g., sectioning using a cryotome, vibratome, or microtome) that are then placed on a glass slide and examined under a microscope. In recent years with the development of additional technologies to further analyze the sample (e.g., spatial gene expression and/or proteomic analyses), extracting or transferring the fragile tissue sample from a glass slide/transitional surface to another medium would be an attractive step in the processing of tissue samples. However, subsequent transfer of the thin tissue section to another surface often introduces additional damage to the sample. For example, once the tissue section is attached to the first surface (e.g., a typical biopsy slide, such as functionalized and/or a charged glass surface), it may be extremely difficult to transfer again without damaging the tissue due to strong contact forces between the tissue section and attachment surface. Novel approaches for transferring biological specimens while minimizing damage are greatly needed. Disclosed herein, inter alia, are solutions to these and other problems in the art.

BRIEF SUMMARY

In an aspect is provided a method of immobilizing a biological sample, such as a tissue section, to a carrier substrate, the method including: contacting the biological sample (e.g., tissue section) with a carrier substrate, wherein the carrier substrate is a device described herein.

BRIEF DESCRIPTION OF THE DRAWINGS

FIG. 2A depicts a sample-carrier construct (i) wherein the sample is embedded in an embedding material, e.g., paraffin wax. The embedding material is then removed, for example when the embedding material is paraffin wax by contacting the construct with an organic solvent such as xylene or heptane, leaving the biological sample on the construct, as illustrated in step (ii) of FIG. 2A. The biological sample of the construct is then contacted with a receiving substrate (e.g., bare or functionalized glass, plastic, polymer receiving substrate), see step (iii) of FIG. 2A, followed by removal of the carrier substrate, see step (iv) of FIG. 2A. Alternatively, the sample-carrier construct may be subjected to fluorogenic and/or chromogenic counterstaining (e.g., H&E staining) methods to aid in visualization and identifying details of the cell types, organelles, structures in the tissue section, see step (ii) of FIG. 2B. The biological sample of the construct is then contacted with a receiving substrate (e.g., bare or functionalized glass, plastic, polymer receiving substrate), see step (iii) of FIG. 2B, followed by removal of the carrier substrate, see step (iv) of FIG. 2B. Shown in FIG. 2C is an overview of selected removal of one or more portions of the construct. To a sample-carrier construct, (i) of FIG. 2C, one or more portions of the construct are removed, for example using a cutting device, and depicted as dashed lines in step (ii) of FIG. 2C. The resulting portions of the construct, illustrated in step (iii) of FIG. 2C, are then contacted with a receiving substrate, such that the biological sample of the portion is in contact with the receiving substrate, as shown in step (iv) of FIG. 2C.

FIG. 9 shows an embodiment of the carrier with the set polymeric gel (i.e., the polymerized solid or semi-solid hydrogel) within the pocket of the carrier.

DETAILED DESCRIPTION

Figure 1:
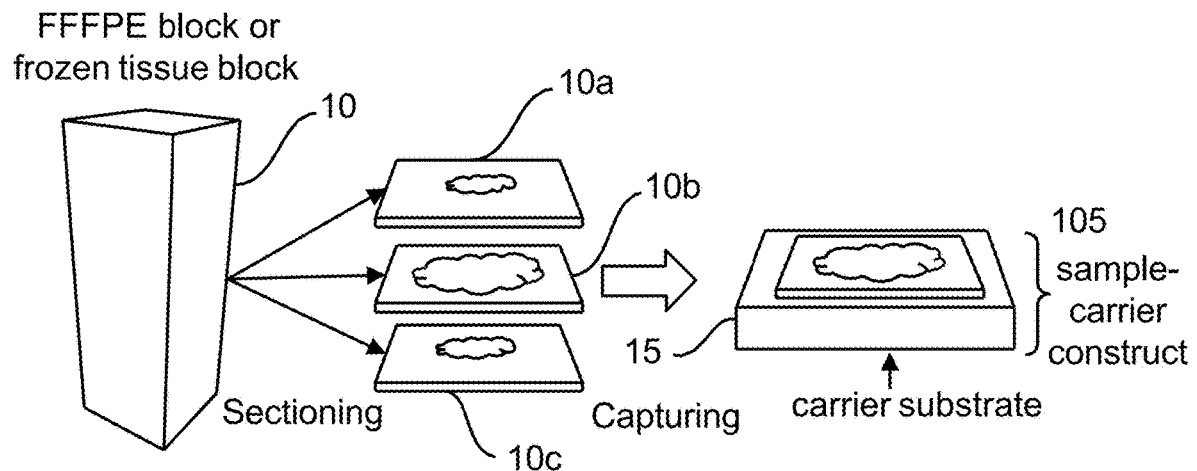
FIG. 1 depicts generating sections and subsequent capture of a biological sample. A sample block, either an FFPE block (i.e., a paraffin embedded biological sample) or fresh frozen tissue block containing a biological sample, is sliced into very thin sections, referred to as sectioning. Individual sections are then be captured using a carrier substrate to generate a sample-carrier construct.

The aspects and embodiments described herein relate to the transfer and manipulation of biological samples (e.g., tissue sections). As described herein, the methods and compositions of this disclosure have many advantages, including greatly enhanced efficiency and speed for tissue testing; and greatly decreased cost for multiple tissue testing.

Grasping and lifting a flat object from a surface (e.g., a microscope slide on a table top) is an ongoing research topic, especially in the field of robotics. Robotics and automation are currently used in the field of life sciences to aid in performing large-scale and/or high-throughput sequencing of proteins, DNA, and the like. Even for humans with ample dexterity and control, manipulating traditional microscope slides and/or flow cells (e.g., a glass slide containing small fluidic channels), is challenging and if not performed properly, expensive mishaps can occur. Incorporating an ergonomically designed frame, which includes a raised handle, allows for greater access and enables the user to manipulate the sample without the risk of dropping or destroying the sample. Disclosed herein is a carrier that is configured to be ergonomically used to grasp, lift, or otherwise support a tissue sample. In an aspect is provided a carrier including a frame that includes a handle; wherein the frame is configured to retain a carrier substrate (e.g., a polymeric gel).

I. Definitions

All patents, patent applications, articles and publications mentioned herein, both supra and infra, are hereby expressly incorporated herein by reference in their entireties.

Unless defined otherwise herein, all technical and scientific terms used herein have the same meaning as commonly understood by one of ordinary skill in the art to which this disclosure belongs. Various scientific dictionaries that include the terms included herein are well known and available to those in the art. Although any methods and materials similar or equivalent to those described herein find use in the practice or testing of the disclosure, some preferred methods and materials are described. Accordingly, the terms defined immediately below are more fully described by reference to the specification as a whole. It is to be understood that this disclosure is not limited to the particular methodology, protocols, and reagents described, as these may vary, depending upon the context in which they are used by those of skill in the art. The following definitions are provided to facilitate understanding of certain terms used frequently herein and are not meant to limit the scope of the present disclosure.

As used herein, the singular terms "a", "an", and "the" include the plural reference unless the context clearly indicates otherwise. Reference throughout this specification to, for example, "one embodiment", "an embodiment", "another embodiment", "a particular embodiment", "a related embodiment", "a certain embodiment", "an additional embodiment", or "a further embodiment" or combinations thereof means that a particular feature, structure or characteristic described in connection with the embodiment is included in at least one embodiment of the present disclosure. Thus, the appearances of the foregoing phrases in various places throughout this specification are not necessarily all referring to the same embodiment. Furthermore, the particular features, structures, or characteristics may be combined in any suitable manner in one or more embodiments.

As used herein, the term "about" means a range of values including the specified value, which a person of ordinary skill in the art would consider reasonably similar to the specified value. In embodiments, the term "about" means within a standard deviation using measurements generally acceptable in the art. In embodiments, about means a range extending to +/−10% of the specified value. In embodiments, about means the specified value.

Throughout this specification, unless the context requires otherwise, the words "comprise", "comprises" and "comprising" will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that no other elements are optional and may or may not be present depending upon whether or not they affect the activity or action of the listed elements.

In the description, relative terms such as "before," "after," "above," "below," "up," "down," "top" and "bottom" as well as derivative thereof (e.g., "horizontally," "downwardly," "upwardly," etc.) should be construed to refer to the orientation as then described or as shown in the drawing or figure under discussion. These relative terms are for convenience of description and do not require that the system be constructed or operated in a particular orientation.

As used herein, the term "polymer" refers to macromolecules having one or more structurally unique repeating units. The repeating units are referred to as "monomers," which are polymerized for the polymer. Typically, a polymer is formed by monomers linked in a chain-like structure. A polymer formed entirely from a single type of monomer is referred to as a "homopolymer." A polymer formed from two or more unique repeating structural units may be referred to as a "copolymer." A polymer may be linear or branched, and may be random, block, polymer brush, hyperbranched polymer, bottlebrush polymer, dendritic polymer, or polymer micelles. The term "polymer" includes homopolymers, copolymers, tripolymers, tetra polymers and other polymeric molecules made from monomeric subunits. Copolymers include alternating copolymers, periodic copolymers, statistical copolymers, random copolymers, block copolymers, linear copolymers and branched copolymers. The term "polymerizable monomer" is used in accordance with its meaning in the art of polymer chemistry and refers to a compound that may covalently bind chemically to other monomer molecules (such as other polymerizable monomers that are the same or different) to form a polymer.

Polymers can be hydrophilic, hydrophobic or amphiphilic, as known in the art. Thus, "hydrophilic polymers" are substantially miscible with water and include, but are not limited to, polyethylene glycol and the like. "Hydrophobic polymers" are substantially immiscible with water and include, but are not limited to, polyethylene, polypropylene, polybutadiene, polystyrene, polymers disclosed herein, and the like. "Amphiphilic polymers" have both hydrophilic and hydrophobic properties and are typically copolymers having hydrophilic segment(s) and hydrophobic segment(s). Polymers include homopolymers, random copolymers, and block copolymers, as known in the art. The term "homopolymer" refers, in the usual and customary sense, to a polymer having a single monomeric unit. The term "copolymer" refers to a polymer derived from two or more monomeric species. The term "random copolymer" refers to a polymer derived from two or more monomeric species with no preferred ordering of the monomeric species. The term "block copolymer" refers to polymers having two or homopolymer subunits linked by covalent bond. Thus, the term "hydrophobic homopolymer" refers to a homopolymer which is hydrophobic. The term "hydrophobic block copolymer" refers to two or more homopolymer subunits linked by covalent bonds and which is hydrophobic.

A "receiving substrate" is used according to its plain and ordinary meaning and generally refers to a substantially solid construct with a surface that functions to support a tissue section. A receiving substrate may be composed of any appropriate material such as metal, plastic, glass or polymer based materials.

As used herein, the term "hydrogel" or "hydrogel carrier" refers to a three-dimensional polymeric structure that is substantially insoluble in water, but which is capable of absorbing and retaining water (e.g. large quantities of water) to form a substantially stable, often soft and pliable, structure. In embodiments, water can penetrate in between polymer chains of a polymer network, subsequently causing swelling and the formation of a hydrogel. In embodiments, hydrogels are super-absorbent (e.g., containing more than about 90% water) and can be comprised of natural or synthetic polymers. Hydrogels can contain over 99% water and may include natural or synthetic polymers, or a combination thereof. Hydrogels also possess a degree of flexibility very similar to natural tissue, due to their significant water content. A detailed description of suitable hydrogels may be found in published U.S. patent application US 2010/0055733, herein specifically incorporated by reference. By "hydrogel subunits" or "hydrogel precursors" is meant hydrophilic monomers, prepolymers, or polymers that can be crosslinked, or "polymerized", to form a three-dimensional (3D) hydrogel network.

Hydrogels may be prepared by cross-linking hydrophilic biopolymers or synthetic polymers. Thus, in some embodiments, the hydrogel may include a crosslinker. As used herein, the term "crosslinker" refers to a molecule that can form a three-dimensional network when reacted with the appropriate base monomers. Examples of the hydrogel polymers, which may include one or more crosslinkers, include but are not limited to, hyaluronans, chitosans, agar, heparin, sulfate, cellulose, alginates (including alginate sulfate), collagen, dextrans (including dextran sulfate), pectin, carrageenan, polylysine, gelatins (including gelatin type A), agarose, (meth)acrylate-oligolactide-PEO-oligolactide-(meth)acrylate, PEO—PPO-PEO copolymers (Pluronics), poly(phosphazene), poly(methacrylates), poly(N-vinylpyrrolidone), PL(G)A-PEO-PL(G)A copolymers, poly(ethylene imine), polyethylene glycol (PEG)-thiol, PEG-acrylate, acrylamide, N,N'-bis(acryloyl)cystamine, PEG, polypropylene oxide (PPO), polyacrylic acid, poly(hydroxyethyl methacrylate) (PHEMA), poly(methyl methacrylate) (PMMA), poly(N-isopropylacrylamide) (PNIPAAm), poly(lactic acid) (PLA), poly(lactic-co-glycolic acid) (PLGA), polycaprolactone (PCL), poly(vinylsulfonic acid) (PVSA), poly(L-aspartic acid), poly(L-glutamic acid), bisacrylamide, diacrylate, diallylamine, triallylamine, divinyl sulfone, diethyleneglycol diallyl ether, ethyleneglycol diacrylate, polymethyleneglycol diacrylate, polyethyleneglycol diacrylate, trimethylopropoane trimethacrylate, ethoxylated trimethylol triacrylate, or ethoxylated pentaerythritol tetracrylate, or combinations thereof. Thus, for example, a combination may include a polymer and a crosslinker, for example polyethylene glycol (PEG)-thiol/PEG-acrylate, acrylamide/N,N'-bis(acryloyl)cystamine (BACy), or PEG/polypropylene oxide (PPO). In embodiments, the hydrogel includes chemical crosslinks (e.g., intermolecular or intramolecular joining of two or more molecules by a covalent bond) and may be referred to as a chemical hydrogel. In embodiments, the hydrogel includes physical crosslinks (e.g., intermolecular or intramolecular joining of two or more molecules by a non-covalent bond) and may be referred to as a physical hydrogel. In embodiments, the physical hydrogel include one or more crosslinks including hydrogen bonds, hydrophobic interactions, and/or polymer chain entanglements.

As used herein, the term "interfacial", or "interfacial layer", is used in accordance with its plain ordinary meaning and refers to the boundary between any two bulk phases (gas, liquid, or solid) in contact where the properties differ from the properties of the bulk phases. In embodiments, an interfacial layer includes water. Interfacial water differs from bulk water in a number of properties, for example, interfacial water has a higher heat capacity than bulk water because more energy is necessary to break its hydrogen bonds. The arrangement and structure of the interfacial water layer varies depending on the structure of the hydrophilic and/or hydrophobic surface(s) the water layer is in contact with. Additional properties of interfacial water may be found in, e.g., Mentre P. J. Biol. Phys. and Chem. 2004; 4:115-123 and Tanaka M. Front. Chem. 2020; 8:165, which are incorporated herein by reference in their entirety.

As used herein, the terms "solid support" and "substrate" and "substrate surface" and "solid surface" refers to discrete solid or semi-solid surfaces to which a plurality of functional groups (e.g., bioconjugate reactive moieties or specific binding reagents) may be attached. A solid support may encompass any type of solid, porous, or hollow sphere, ball, cylinder, or other similar configuration composed of plastic, ceramic, metal, or polymeric material (e.g., hydrogel) onto which a nucleic acid may be immobilized (e.g., covalently or non-covalently). A solid support may include a discrete particle that may be spherical (e.g., microspheres) or have a non-spherical or irregular shape, such as cubic, cuboid, pyramidal, cylindrical, conical, oblong, or disc-shaped, and the like. A bead can be non-spherical in shape. A solid support may be used interchangeably with the term "bead."

A solid support may further include a polymer or hydrogel on the surface to which the primers are attached. Exemplary solid supports include, but are not limited to, glass and modified or functionalized glass, plastics (including acrylics, polystyrene and copolymers of styrene and other materials, polypropylene, polyethylene, polybutylene, polyurethanes, Teflon™, cyclic olefin copolymers, polyimides etc.), nylon, ceramics, resins, Zeonor, silica or silica-based materials including silicon and modified silicon, carbon, metals, inorganic glasses, optical fiber bundles, photopatternable dry film resists, UV-cured adhesives and polymers. Particularly useful solid supports for some embodiments have at least one surface located on a microplate. Solid surfaces can also be varied in their shape depending on the application in a method described herein. For example, a solid surface useful herein can be planar, or contain regions which are concave or convex. In embodiments, the geometry of the concave or convex regions (e.g., wells) of the solid surface conform to the size and shape of a substantially circular particle to maximize the contact between the particle. In embodiments, the wells of an array are randomly located such that nearest neighbor wells have random spacing between each other. Alternatively, in embodiments the spacing between the wells can be ordered, for example, forming a regular pattern. The term solid substrate is encompassing of a substrate (e.g., a microplate) having a surface including a polymer coating covalently attached thereto.

The term "surface" is intended to mean an external part or external layer of a substrate. The surface can be in contact with another material such as a gas, liquid, gel, polymer, organic polymer, second surface of a similar or different material, metal, or coat. The surface, or regions thereof, can be substantially flat. The substrate and/or the surface can have surface features such as wells, pits, channels, ridges, raised regions, pegs, posts or the like.

The terms "bind" and "bound" as used herein are used in accordance with their plain and ordinary meanings and refer to an association between atoms or molecules. The association can be direct or indirect. For example, bound atoms or molecules may be directly bound to one another, e.g., by a covalent bond or non-covalent bond (e.g. electrostatic interactions (e.g. ionic bond, hydrogen bond, halogen bond), van der Waals interactions (e.g. dipole-dipole, dipole-induced dipole, London dispersion), ring stacking (pi effects), hydrophobic interactions and the like). As a further example, two molecules may be bound indirectly to one another by way of direct binding to one or more intermediate molecules (e.g., as in a substrate, bound to a first antibody, bound to an analyte, bound to a second antibody), thereby forming a complex. As used herein, the term "attached" refers to the state of two things being joined, fastened, adhered, connected or bound to each other. For example, a sample such as a cell or tissue, can be attached to a material, such as a hydrogel, polymer, or solid support, by a covalent or non-covalent bond. In embodiments, attachment is a covalent attachment.

Where a range of values is provided, it is understood that each intervening value, to the tenth of the unit of the lower limit unless the context clearly indicates otherwise, between the upper and lower limit of that range, and any other stated or unstated intervening value in, or smaller range of values within, that stated range is encompassed by such disclosure herein. The upper and lower limits of any such smaller range (within a more broadly recited range) may independently be included in the smaller ranges, or as particular values themselves, and are also encompassed by such disclosure herein, subject to any specifically excluded limit in the stated range. Where the stated range includes one or both of the limits, ranges excluding either or both of those included limits are also included by such disclosure herein.

Provided herein are methods, systems, and compositions for analyzing a sample (e.g., sequencing nucleic acids within a sample) in situ. The term "in situ" is used in accordance with its ordinary meaning in the art and refers to a sample surrounded by at least a portion of its native environment, such as may preserve the relative position of two or more elements. For example, an extracted human cell obtained is considered in situ when the cell is retained in its local microenvironment so as to avoid extracting the target (e.g., nucleic acid molecules or proteins) away from their native environment. An in situ sample (e.g., a cell) can be obtained from a suitable subject. An in situ cell sample may refer to a cell and its surrounding milieu, or a tissue. A sample can be isolated or obtained directly from a subject or part thereof. In embodiments, the methods described herein (e.g., sequencing a plurality of target nucleic acids of a cell in situ) are applied to an isolated cell (i.e., a cell not surrounded by least a portion of its native environment). For the avoidance of any doubt, when the method is performed within a cell (e.g., an isolated cell) the method may be considered in situ. In some embodiments, a sample is obtained indirectly from an individual or medical professional. A sample can be any specimen that is isolated or obtained from a subject or part thereof. A sample can be any specimen that is isolated or obtained from multiple subjects. Non-limiting examples of specimens include fluid or tissue from a subject, including, without limitation, blood or a blood product (e.g., serum, plasma, platelets, buffy coats, or the like), umbilical cord blood, chorionic villi, amniotic fluid, cerebrospinal fluid, spinal fluid, lavage fluid (e.g., lung, gastric, peritoneal, ductal, car, arthroscopic), a biopsy sample, celocentesis sample, cells (blood cells, lymphocytes, placental cells, stem cells, bone marrow derived cells, embryo or fetal cells) or parts thereof (e.g., mitochondrial, nucleus, extracts, or the like), urine, feces, sputum, saliva, nasal mucous, prostate fluid, lavage, semen, lymphatic fluid, bile, tears, sweat, breast milk, breast fluid, the like or combinations thereof. Non-limiting examples of tissues include organ tissues (e.g., liver, kidney, lung, thymus, adrenals, skin, bladder, reproductive organs, intestine, colon, spleen, brain, the like or parts thereof), epithelial tissue, hair, hair follicles, ducts, canals, bone, eye, nose, mouth, throat, car, nails, the like, parts thereof or combinations thereof. A sample may include cells or tissues that are normal, healthy, diseased (e.g., infected), and/or cancerous (e.g., cancer cells). A sample obtained from a subject may include cells or cellular material (e.g., nucleic acids) of multiple organisms (e.g., virus nucleic acid, fetal nucleic acid, bacterial nucleic acid, parasite nucleic acid). A sample may include a cell and RNA transcripts. A sample can include nucleic acids obtained from one or more subjects. In some embodiments a sample includes nucleic acid obtained from a single subject. A subject can be any living or non-living organism, including but not limited to a human, non-human animal, plant, bacterium, fungus, virus, or protist. A subject may be any age (e.g., an embryo, a fetus, infant, child, adult). A subject can be of any sex (e.g., male, female, or combination thereof). A subject may be pregnant. In some embodiments, a subject is a mammal. In some embodiments, a subject is a plant. In some embodiments, a subject is a human subject. A subject can be a patient (e.g., a human patient). In some embodiments a subject is suspected of having a genetic variation or a disease or condition associated with a genetic variation. A "tissue section" as used herein refers to a portion of a biological tissue derived from a biological sample, typically from an organism (e.g., a human or animal subject or patient).

As used herein, the term "fresh," generally in the context of a fresh tissue means that the tissue has recently been obtained from an organism, generally before any subsequent fixation steps, for example, flash freezing or chemical fixation. In embodiments, a fresh tissue is obtained from an organism about 1 second up to about 20 minutes before any fixation steps are performed. In embodiments, a fresh tissue is obtained from an organism about 1 second up to about 60 seconds before any fixation steps are performed. In embodiments, a fresh tissue is obtained from an organism about 30 seconds up to about 60 seconds before any fixation steps are performed. In embodiments, a fresh tissue is obtained from an organism about 1 minutes up to about 20 minutes before any fixation steps are performed. In embodiments, a fresh tissue is obtained from an organism about 1 minutes up to about 10 minutes before any fixation steps are performed. In embodiments, a fresh tissue is obtained from an organism about 1 minutes up to about 5 minutes before any fixation steps are performed. In embodiments, a fresh tissue is obtained from an organism about 30 seconds, about 1 minute, about 2 minutes, about 3 minutes, about 4 minutes, about 5 minutes, about 10 minutes, about 15 minutes, or about 20 minutes before any fixation steps are performed.

As used herein, the term "fix," refers to formation of covalent bonds, such as crosslinks, between biomolecules or within molecules. The process of fixing tissue samples or biological samples (e.g., cells and nuclei) for example, is called "fixation." The agent that causes fixation is generally referred to as a "fixative" or "fixing agent." "Fixed biological samples" (e.g., fixed cells or nuclei) or "fixed tissues" refers to biological samples (e.g., cells or nuclei) or tissues that have been in contact with a fixative under conditions sufficient to allow or result in formation of intra- and inter-molecular crosslinks between biomolecules in the biological sample. Fixation may be reversed and the process of reversing fixation may be referred to as "un-fixing" or "decrosslinking." Unfixing or decrosslinking refers to breaking or reversing the formation of covalent bonds in biomolecules formed by fixatives. In some examples, the tissue fixed is fresh tissue. In some examples, the tissue fixed may be frozen tissue. In some examples, the tissue fixed may not be dissociated. In some examples, the tissue fixed may be dissociated or partially dissociated (e.g., chopped, cut). In some examples, tissue that has been rapidly frozen and, perhaps, cut or chopped into pieces (e.g., small enough to fit into a tube or container used for fixation) may be used. In some examples, tissue may be dissociated or partially dissociated (e.g., cut, chopped) before or during fixation. In some examples, tissue that is fixed may not be dissociated. The frozen biological tissue can be fixed using a fixing agent, which is suitably an organic fixing agent. Suitable organic fixing agents include without limitation alcohols, ketones, aldehydes (e.g., glutaraldehyde), cross-linking agents, disuccinimidyl suberate (DSS), dimethylsuberimidate (DMS), formalin, dimethyladipimidate (DMA), dithiobis(-succinimidyl propionate) (DSP), disuccinimidyl tartrate (DST), ethylene glycol bis (succinimidyl succinate) (EGS), bis(sulfosuccinimidyl)suberate (BS3) and combinations thereof. A particularly suitable fixing agent is a formaldehyde-based fixing agent such as formalin, which is a mixture of formaldehyde and water. The formalin may include about 1% to about 15% by weight formaldehyde and about 85% to about 99% by weight water, suitable about 2% to about 8% by weight formaldehyde and about 92% to about 98% by weight water, or about 4% by weight formaldehyde and about 96% by weight water. In some examples, tissues may be fixed in 4% paraformaldehyde. Other suitable fixing agents will be appreciated by those of ordinary skill in the art (e.g., International PCT App. No. PCT/US2020/066705, which is incorporated herein by reference in its entirety).

As used herein, the term "permeable" refers to a property of a substance that allows certain materials to pass through the substance. "Permeable" may be used to describe a biological sample, such as a cell or nucleus, in which analytes in the biological sample can leave the biological sample. "Permeabilize" is an action taken to cause, for example, a biological sample (e.g., a cell) to release its analytes. In some examples, permeabilization of a biological sample is accomplished by affecting the integrity (e.g., compromising) of a biological sample membrane (e.g., a cellular or nuclear membrane) such as by application of a protease or other enzyme capable of disturbing a membrane allowing analytes to diffuse out of the biological sample. In some embodiments, permeabilizing a biological sample does not release the biomolecules (e.g., proteins and/or nucleic acids) contained within the sample.

As used herein, the term "single biological sample", such as a single nucleus generally refers to a biological sample that is not present in an aggregated form or clump. Single biological samples, such as cells and/or nuclei may be the result of dissociating a tissue sample.

As used herein, the term "tissue freezing" is used in accordance with its plain and ordinary meaning and refers to different methods for freezing tissues. In some examples, the methods used may be rapid methods (e.g., "flash freezing" or "snap freezing"). In some examples, tissues may be lowered to temperatures below about −70° C. using these methods. In some examples, rapid freezing may use ultracold media. In some examples, an ultracold medium may be liquid nitrogen. In some examples, this type of freezing may preserve tissue integrity, in part by preventing the formation of ice crystals that would affect the tissue morphology. In some examples, an ultracold medium may be dry ice.

The terms "polypeptide," "peptide" and "protein" are used interchangeably herein to refer to a polymer of amino acid residues, wherein the polymer may optionally be conjugated to a moiety that does not consist of amino acids. The terms apply to amino acid polymers in which one or more amino acid residue is an artificial chemical mimetic of a corresponding naturally occurring amino acid, as well as to naturally occurring amino acid polymers and non-naturally occurring amino acid polymer. A protein may refer to a protein expressed in a cell.

As used herein, a "single cell" refers to one cell. Single cells useful in the methods described herein can be obtained from a tissue of interest, or from a biopsy, blood sample, or cell culture. Additionally, cells from specific organs, tissues, tumors, neoplasms, or the like can be obtained and used in the methods described herein. In general, cells from any population can be used in the methods, such as a population of prokaryotic or eukaryotic organisms, including bacteria or yeast.

As used herein, the term "tissue" is used in accordance with its plain and ordinary meaning and refers to an organization of cells in a structure, where the structure generally functions as a unit in an organism (e.g., mammals) and may carry out specific functions. In some examples, cells in a tissue are configured in a mass and may not be free from one another. This disclosure describes methods of obtaining single biological samples (e.g., cells or nuclei) from tissues that can be used in various single biological samples (e.g., single-cell/nucleus) workflows. In some examples, blood cells (e.g., lymphocytes) can be considered a tissue. However, blood cells, like lymphocytes, generally are free from one another in the blood. The methods disclosed herein can be used to process those cells to obtain cells and/or nuclei, although dissociation steps may not be necessary when using those types of tissues. Generally, any type of tissue can be used in the methods described herein. Examples of tissues that may be used in the disclosed methods include, but are not limited to connective, epithelial, muscle and nervous tissue. In some examples, the tissues are from mammals. Tissues that contain any type of cells may be used. For example, tissues from abdomen, bladder, brain, esophagus, heart, intestine, kidney, liver, lung, lymph node, olfactory bulb, ovary, pancreas, skin, spleen, stomach, testicle, and the like. The tissue may be normal or tumor tissue (e.g., malignant). This example is not meant to be limiting. Although the conditions used in the disclosed may not be identical for different types of tissue, the methods may be applied to any tissue. The tissues used in the disclosed methods may be in various states. In some examples, the tissues used in the disclosed methods may be fresh, frozen, or fixed.

The term "cellular component" is used in accordance with its ordinary meaning in the art and refers to any organelle, nucleic acid, protein, or analyte that is found in a prokaryotic, eukaryotic, archacal, or other organismic cell type. Examples of cellular components (e.g., a component of a cell) include RNA transcripts, proteins, membranes, lipids, and other analytes. In embodiments, a cellular component is a biomolecule.

A "gene" refers to a polynucleotide that is capable of conferring biological function after being transcribed and/or translated.

As used herein, the terms "biomolecule" or "analyte" refer to an agent (e.g., a compound, macromolecule, or small molecule), and the like derived from a biological system (e.g., an organism, a cell, or a tissue). The biomolecule may contain multiple individual components that collectively construct the biomolecule, for example, in embodiments, the biomolecule is a polynucleotide wherein the polynucleotide is composed of nucleotide monomers. The biomolecule may be or may include DNA, RNA, organelles, carbohydrates, lipids, proteins, or any combination thereof. These components may be extracellular. In some examples, the biomolecule may be referred to as a clump or aggregate of combinations of components. In some instances, the biomolecule may include one or more constituents of a cell but may not include other constituents of the cell. In embodiments, a biomolecule is a molecule produced by a biological system (e.g., an organism). The biomolecule may be any substance (e.g. molecule) or entity that is desired to be detected by the method of the invention. The biomolecule is the "target" of the assay method of the invention. The biomolecule may accordingly be any compound that may be desired to be detected, for example a peptide or protein, or nucleic acid molecule or a small molecule, including organic and inorganic molecules. The biomolecule may be a cell or a microorganism, including a virus, or a fragment or product thereof. Biomolecules of particular interest may thus include proteinaceous molecules such as peptides, polypeptides, proteins or prions or any molecule which includes a protein or polypeptide component, etc., or fragments thereof. The biomolecule may be a single molecule or a complex that contains two or more molecular subunits, which may or may not be covalently bound to one another, and which may be the same or different. Thus, in addition to cells or microorganisms, such a complex biomolecule may also be a protein complex. Such a complex may thus be a homo- or hetero-multimer. Aggregates of molecules e.g., proteins may also be target analytes, for example aggregates of the same protein or different proteins. The biomolecule may also be a complex between proteins or peptides and nucleic acid molecules such as DNA or RNA. Of particular interest may be the interactions between proteins and nucleic acids, e.g., regulatory factors, such as transcription factors, and interactions between DNA or RNA molecules As used herein, "biomaterial" refers to any biological material produced by an organism. In some embodiments, biomaterial includes secretions, extracellular matrix, proteins, lipids, organelles, membranes, cells, portions thereof, and combinations thereof. In some embodiments, cellular material includes secretions, extracellular matrix, proteins, lipids, organelles, membranes, cells, portions thereof, and combinations thereof. In some embodiments, biomaterial includes viruses. In some embodiments, the biomaterial is a replicating virus and thus includes virus infected cells. In embodiments, a biological sample includes biomaterials.

In some embodiments, a sample includes one or more nucleic acids, or fragments thereof. A sample can include nucleic acids obtained from one or more subjects. In some embodiments a sample includes nucleic acid obtained from a single subject. In some embodiments, a sample includes a mixture of nucleic acids. A mixture of nucleic acids can include two or more nucleic acid species having different nucleotide sequences, different fragment lengths, different origins (e.g., genomic origins, cell or tissue origins, subject origins, the like or combinations thereof), or combinations thereof. A sample may include synthetic nucleic acid.

A subject can be any living or non-living organism, including but not limited to a human, non-human animal, plant, bacterium, fungus, virus or protist. A subject may be any age (e.g., an embryo, a fetus, infant, child, adult). A subject can be of any sex (e.g., male, female, or combination thereof). A subject may be pregnant. In some embodiments, a subject is a mammal. In some embodiments, a subject is a human subject. A subject can be a patient (e.g., a human patient). In some embodiments a subject is suspected of having a genetic variation or a disease or condition associated with a genetic variation.

As used herein, the term "kit" refers to any delivery system for delivering materials. In the context of reaction assays, such delivery systems include systems that allow for the storage, transport, or delivery of reaction reagents (e.g., oligonucleotides, enzymes, etc. in the appropriate containers) and/or supporting materials (e.g., buffers, written instructions for performing the assay, etc.) from one location to another. For example, kits include one or more enclosures (e.g., boxes) containing the relevant reaction reagents and/or supporting materials. As used herein, the term "fragmented kit" refers to a delivery system including two or more separate containers that each contain a subportion of the total kit components. The containers may be delivered to the intended recipient together or separately. For example, a first container may contain an enzyme for use in an assay, while a second container contains oligonucleotides. In contrast, a "combined kit" refers to a delivery system containing all of the components of a reaction assay in a single container (e.g., in a single box housing each of the desired components). The term "kit" includes both fragmented and combined kits.

The term "protein-specific binding agent" refers to an agent to a protein or polypeptide molecule, or portion thereof, capable of selectively binding or interacting with a protein. In embodiments, a protein-specific binding agent specifically binds a particular protein (e.g., a protein antigen or epitope thereof). In embodiments a protein-specific binding agent is an immunoglobulin (IgA, IgD, IgE, IgG, or IgM). Intact immunoglobulins, also known as antibodies, are typically tetrameric glycosylated proteins composed of two light (L) chains of approximately 25 kDa each, and two heavy (H) chains of approximately 50 kDa each. In embodiments, the protein binding moiety is an antigen-specific antibody. Non-limiting examples of protein-specific binding agent encompassed within the term "antigen-specific antibody" used herein include: (i) an Fab fragment, a monovalent fragment consisting of the VL, VH, CL and CH1 domains; (ii) an F(ab')2 fragment, a bivalent fragment including two Fab fragments linked by a disulfide bridge at the hinge region; (iii) an Fd fragment consisting of the VH and CH1 domains; (iv) an Fv fragment consisting of the VL and VH domains of a single arm of an antibody, (v) a dAb fragment, which consists of a VH domain; and (vi) an isolated CDR. Furthermore, although the two domains of the Fv fragment, VL and VH, are coded for by separate genes, they may be recombinantly joined by a synthetic linker, creating a single protein chain in which the VL and VH domains pair to form monovalent molecules (known as single chain Fv (scFv)). The most commonly used linker is a 15-residue (Gly4Ser)3 peptide, but other linkers are also known in the art. Single chain antibodies are also intended to be encompassed within the terms "protein-specific binding agent," of an antibody. The antibody can also be a polyclonal antibody, monoclonal antibody, chimeric antibody, antigen-binding fragment, Fc fragment, single chain antibodies, or any derivatives thereof. In embodiments, the protein-specific binding agent is the antigen-binding site (e.g., fragment antigen-binding (Fab) variable region) of an antibody. The term "antigen-binding site" of an antibody (or simply "antibody portion"), as used herein, refers to one or more fragments of an antibody that retains the ability to specifically bind to an antigen. It has been shown that the antigen-binding function of an antibody can be performed by fragments of a full-length antibody.

An "antibody" (Ab) is a protein that binds specifically to a particular substance, known as an "antigen" (Ag). An "antibody" or "antigen-binding fragment" is an immunoglobulin that binds a specific "epitope." The term encompasses polyclonal, monoclonal, and chimeric antibodies. In nature, antibodies are generally produced by lymphocytes in response to immune challenge, such as by infection or immunization. An "antigen" (Ag) is any substance that reacts specifically with antibodies or T lymphocytes (T cells). An antibody may include the entire antibody as well as any antibody fragments capable of binding the antigen or antigenic fragment of interest. Examples include complete antibody molecules, antibody fragments, such as Fab, F(ab')2, CDRs, VL, VH, and any other portion of an antibody which is capable of specifically binding to an antigen. Antibodies used herein are immunospecific for, and therefore specifically and selectively bind to, for example, proteins either detected (e.g., biological targets of interest) or used for detection (e.g., probes containing oligonucleotide barcodes) in the methods and devices as described herein.

As used herein, the term "control" or "control experiment" is used in accordance with its plain and ordinary meaning and refers to an experiment in which the subjects, cells, tissues, or reagents of the experiment are treated as in a parallel experiment except for omission of a procedure, reagent, or variable of the experiment. In some instances, the control is used as a standard of comparison in evaluating experimental effects. In embodiments, a control cell is the same cell type as the cell being examined, wherein the control cell does not include the variable or is subjected to conditions being examined.

Typically, the concentration and molecular weight of the hydrogel subunit(s) will depend on the selected polymer and the desired characteristics, e.g., pore size, swelling properties, conductivity, elasticity/stiffness (Young's modulus), biodegradability index, etc., of the hydrogel network into which they will be polymerized. For example, it may be desirable for the hydrogel to include pores of sufficient size to allow the passage of macromolecules, e.g., proteins, nucleic acids, or small molecules as described in greater detail below, into the specimen. The ordinarily skilled artisan will be aware that pore size generally decreases with increasing concentration of hydrogel subunits and generally increases with an increasing ratio of hydrogel subunits to crosslinker, and will prepare a hydrogel composition that includes a concentration of hydrogel subunits that allows the passage of such macromolecules. As another example, it may be desirable for the hydrogel to have a particular stiffness, e.g., to provide stability in handling the embedded specimen, e.g., a Young's Modulus (also referred to herein as a compression modulus) of about 2-70 $kN/m^2$, for example, about 2 $kN/m^2$, about 4 $kN/m^2$, about 7 $kN/m^2$, about 10 $kN/m^2$, about 15 $kN/m^2$, about 20 $kN/m^2$, about 40 $kN/m^2$, but typically not more than about 70 $kN/m^2$. The ordinarily skilled artisan will be aware that the elasticity of a hydrogel network may be influenced by a variety of factors, including the branching of the polymer, the concentration of hydrogel subunits, and the degree of cross-linking, and will prepare a hydrogel composition that includes a concentration of hydrogel subunits to provide such desired elasticity. Thus, for example, the hydrogel composition may include an acrylamide monomer at a concentration of from about 1% w/v to about 20% w/v, e.g., about 2% to about 15%, about 3% to about 10%, about 4% to about 8%, and a concentration of bis-acrylamide crosslinker in the range of about 0.01% to about 0.075%, e.g., 0.01%, 0.02%, 0.025%, 0.03%, 0.04%, 0.05%, 0.06%, or 0.075%; or, for example, the hydrogel composition may include PEG prepolymers having a molecular weight ranging from at least about 2.5K to about 50K, e.g., 2.5K or more, 3.5K or more, 5K or more, 7.5K or more, 10K or more, 15K or more, 20K or more, but typically not more than about 50K, at a concentration in a range from about 1% w/w to about 50% w/w, e.g., 1% or more, 5% or more, 7.5% or more, 10% or more, 15% or more, 20% or more, 30% or more, 40% or more, and usually not more than about 50%. Concentrations of hydrogel subunits that provide desired hydrogel characteristics may be readily determined by methods in the art or as described in the working examples below.

The term "image" is used according to its ordinary meaning and refers to a representation of all or part of an object. The representation may be an optically detected reproduction. For example, an image can be obtained from fluorescent, luminescent, scatter, or absorption signals. The part of the object that is present in an image can be the surface or other xy plane of the object. Typically, an image is a 2 dimensional representation of a 3 dimensional object. An image may include signals at differing intensities (i.e., signal levels). An image can be provided in a computer readable format or medium. An image is derived from the collection of focus points of light rays coming from an object (e.g., the sample), which may be detected by any image sensor.

As used herein, the term "signal" is intended to include, for example, fluorescent, luminescent, scatter, or absorption impulse or electromagnetic wave transmitted or received. Signals can be detected in the ultraviolet (UV) range (about 200 to 390 nm), visible (VIS) range (about 391 to 770 nm), infrared (IR) range (about 0.771 to 25 microns), or other range of the electromagnetic spectrum. The term "signal level" refers to an amount or quantity of detected energy or coded information. For example, a signal may be quantified by its intensity, wavelength, energy, frequency, power, luminance, or a combination thereof. Other signals can be quantified according to characteristics such as voltage, current, electric field strength, magnetic field strength, frequency, power, temperature, etc. Absence of signal is understood to be a signal level of zero or a signal level that is not meaningfully distinguished from noise.

The term "xy coordinates" refers to information that specifies location, size, shape, and/or orientation in an xy plane. The information can be, for example, numerical coordinates in a Cartesian system. The coordinates can be provided relative to one or both of the x and y axes or can be provided relative to another location in the xy plane (e.g., a fiducial). The term "xy plane" refers to a 2 dimensional area defined by straight line axes x and y. When used in reference to a detecting apparatus and an object observed by the detector, the xy plane may be specified as being orthogonal to the direction of observation between the detector and object being detected.

The term "adhesion strength" or "attachment strength" as used herein refers to the interfacial force bonding two materials together. The adhesion strength may refer to the minimal amount of force necessary to detach and/or remove the two materials. Means for quantifying adhesion strength are known in the art, for example with a pull-off adhesion test. A pull-off adhesion test measures the resistance of a substance (e.g., a tissue sample) from a substrate (e.g., a carrier substrate) when a perpendicular tensile force is applied to the substance. As outlined in the American Society for Testing and Materials (ASTM) D4541 (and similarly in BS EN ISO 4624), the test may include attaching a test dolly to the substance (e.g., the tissue sample) and then pulling the dolly by exerting a force perpendicular to the surface in an effort to remove the dolly with the substance from the substrate. An alternative testing approach is outlined in ASTM D6677 which utilizes a utility knife to peel the substance away from the substrate and ASTM D3359 which uses a pressure sensitive tape. The peel strength tests employed for examining the strength of Band-Aid® bonds is provided in ASTM D903, ASTM D1876, and ASTM F2258, each of which are incorporated herein by reference and may be used for measuring the adhesion strength as described herein. Instruments for performing such measurements include the monotonic uniaxial tensile testing device provided by Bose® Biodynamic Test Instrument, Minnetonka, MN, for example by employing at a constant rate (e.g., 0.05 mm/sec) and continuously recording the load response (e.g., 200 measurements/sec) to the point of macroscopic failure, or the Avery Adhesive Test (AAT).

As used herein, the term "resected" or "resection" is used in accordance with its plain and ordinary meaning and refers to removal of part or all of a tissue or an organ from a subject, typically through surgical removal.

As used herein, the term "raised handle" refers to the appendage that is elevated relative to the bottom of the frame. For example, when the frame is in contact with a work surface (e.g., a table surface), the raised handle may be about 15 mm to about 25 mm from the surface. In embodiments, the raised handle is about 1, 2, 3, 4, 5, 6, 7, 8, 9, or 10 cm from the surface (for example when measured from the uppermost point or edge of the handle). In embodiments, the raised handle is about 5, 6, 7, 8, 9, 10, 11, 12, 13, 14, or 15 cm from the surface (for example when measured from the uppermost point or edge of the handle). In embodiments, the frame is about 22 mm from the surface. The raised handle is operatively attached to the flow cell carrier so the user can grasp the flow cell carrier. In embodiments, the raised handle does not make contact with the surface (aside from the attached frame contact with the surface). A raised handle may be considered an ergonomic handle.

As used herein, the term "ergonomic handle" refers to an appendage that is designed to improve efficiency, comfort, or safety. For example, an ergonomic handle may be designed such that a user can align their fingers on the handle in a manner that maximizes hand capacity and does not require wrist flexion, extension, or deviation, in order to allow the user to maintain a neutral wrist posture. The ergonomic handle may include additional features such as ridges, or other textures such as grooves, indentations, rippling, stippling, or the like, to improve grip. Alternatively, the ergonomic handle may further include a polymer or rubber coating (e.g., synthetic polymer, thermoplastic, or plastisol coating). The polymer or rubber coating may provide a flexible, non-slip cushion to further promote the ergonomic design of the handle.

The term "injection molded" is used in accordance with its ordinary meaning in the art and refers to a manufacturing process for producing parts by injecting hot (e.g., molten) material into a mold. Injection molding may be performed with a variety of input materials, such as metals, glasses, elastomers, confections, and polymers (e.g., thermoplastic and thermosetting polymers).

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

II. Compositions, Devices, & Kits

In an aspect, there is disclosed devices for manipulating one or more biological samples. For example, the biological samples can be obtained from a sample block (e.g., frozen tissue block or a paraffin embedded biological sample). FIG. 1 schematically shows a biological sample block 10, which can be for example either an FFPE block (i.e., a paraffin embedded biological sample) or fresh frozen tissue block containing a biological sample. The sample block 10 can be sliced into very thin sections 10a, 10b, and 10c pursuant to a sectioning process. The sections 10a-10c are captured or otherwise coupled to a carrier substrate 15 to generate a sample-carrier construct 105. The biological sample can be a biological tissue, cultured cells, or cells taken from an animal subject of interest. In embodiments, the biological sample includes material that is human origin or mouse origin. In embodiments, the biological sample is fresh, frozen, or fixed. In embodiments it can be a section or core obtained from a formalin-fixed paraffin-embedded (FFPE) tissue block. The sample can include material from a tissue section, tissue micro-array (TMA), cell pellet, core biopsy, needle biopsy, or cells obtained from a blood or serum sample. In embodiments, the biological sample is immobilized on a surface of a functionalized slide, a functionalized plate, a functionalized well, or a functionalized film.

In an aspect, there is disclosed a carrier that is configured to be ergonomically used to grasp, lift, or otherwise support a biological sample, such as a tissue section sample. The carrier includes a frame that includes a handle; wherein the frame is configured to retain a carrier substrate such as three-dimensional polymeric gel or polymer slab, such as a hydrogel or solid or semi-solid polymer, useful for catching tissue sections. The substrate is described herein in an example context of being an agarose gel medium (e.g., agar) although other materials are within the scope of this disclosure. In a non-limiting example, the carrier is used to cast a mold of the polymer (e.g., agarose polymer gel within a pocket of the carrier). For example, the carrier receives a liquid polymer which conforms to the shape of the carrier pocket and cures to a solid (or semi-solid) polymer. In embodiments, the three-dimensional polymer slab, also referred to as a hydrogel, is a soft, pliable material that exhibits low permeability, preventing significant diffusion through its structure. The hydrogel maintains its integrity and shape at room temperature and lower temperatures (e.g., 0 to 4 degrees Celsius), providing a stable surface to which tissue sections can temporarily adhere. In embodiments, the polymer slab is configured to retain its form and prevent substantial diffusion. In embodiments, the polymer slab includes non-penetrative surface interactions with the biological sample.

In an aspect is provided a tissue catch tray assembly. In embodiments, the tissue catch assembly includes a tissue catch tray configured to contain a three-dimensional polymer slab. In embodiments, the tissue catch tray is formed of a frame that forms a periphery of a cavity having an upper end and a lower end, wherein the frame forms a peripheral trough that surrounds the cavity. In embodiments, the cavity is configured to contain a three-dimensional polymer slab. In embodiments, the cavity forms a mold for forming a three-dimensional polymer slab. In embodiments, the tissue catch tray assembly includes a handle extending outwardly from the tissue catch tray. In embodiments, the tissue catch tray assembly includes a cover film removably positionable on a bottom of the frame such that the cover film encloses a lower end of the cavity. In embodiments, the cover film may be referred to as a backing material and may include Mylar® or other peclable, flexible films, such as polypropylene (PP) films, polyvinyl chloride (PVC) films, or low-density polyethylene (LDPE) films. Such materials may provide temporary adhesion and can be easily peeled away without leaving residue. Alternative materials may include silicone-coated release liners, wax-coated papers, or other peelable polyester films, which function similarly as removable backing layers. In embodiments, a planar substrate is removably positionable on a top of the frame such that the substrate encloses a top end of the cavity. In embodiments, a cover film is removably positionable on a bottom of the frame such that the cover film encloses a lower end of the cavity.

In embodiments, the carrier includes a port or an opening, such as at a top or upper region of the carrier (e.g., opening 567 of FIG. 7), for pouring the liquid polymer into a mold section (e.g., a polymer case) of the carrier. The carrier can be oriented (such as vertically) to minimize, eliminate, and/or release air bubbles from the liquid polymer while the liquid polymer solidifies and gels. The resulting molded agarose polymer gel is then used to retrieve tissue sections (e.g., 1-50 µm thin discrete FFPE tissue sections) and capture such tissue sections floating on a water bath. Once captured, the tissue section(s) or sample(s) may be subjected to further analysis/immobilization on a receiving substrate, such as a glass slide. The carrier may be removably coupled to a lid to render or facilitate stacking of multiple carriers, as described more fully below.

Figure 5:
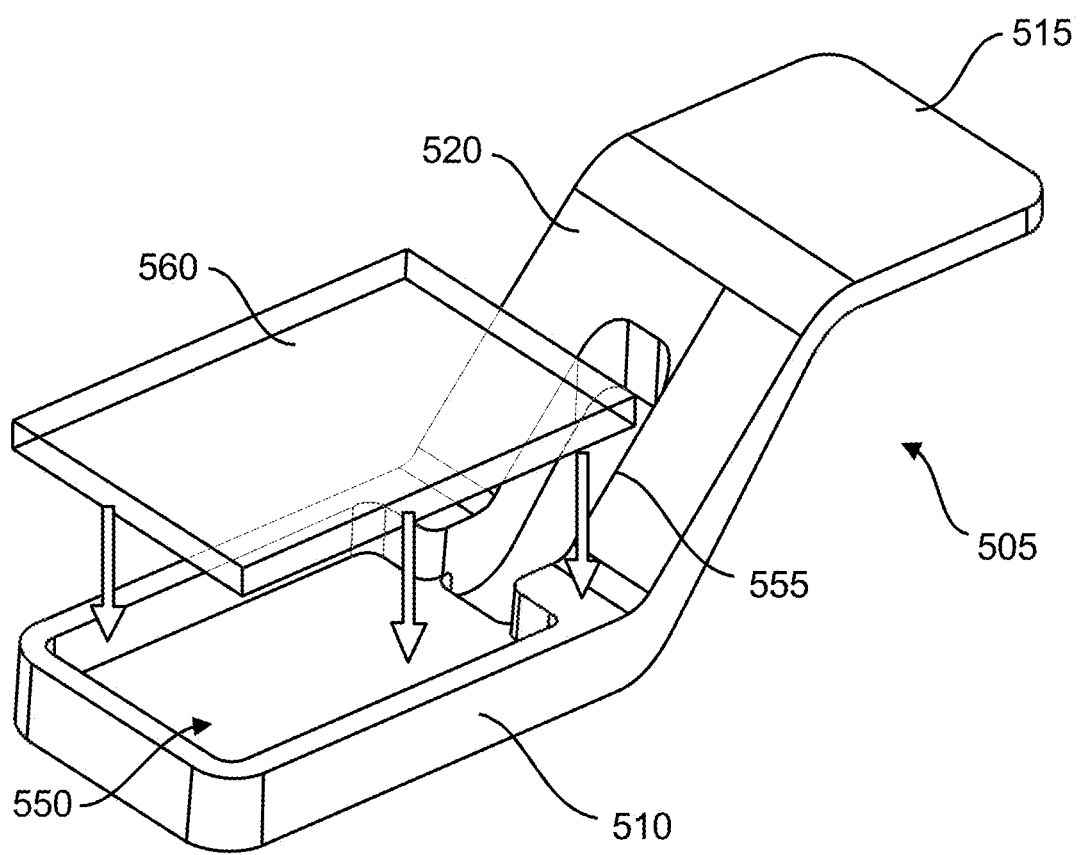
FIG. 5 shows a perspective view of an example carrier 505. The carrier 505 comprises a frame that includes a base 510 and a handle 515. A bridge section 520 connects the base to the handle. The carrier 505 can vary in shape and contour. In the illustrated embodiment, the base 510 forms a planar body that generally lies along or within a first plane 525, as shown in the side view of the carrier 505 of FIG. 6. The base 510 is rectangular or prismatic in shape although the shape can vary.

FIG. 5 shows a perspective view of an example carrier 505. The carrier 505 includes a frame that includes a base 510 and a handle 515 (e.g., wherein the handle is raised). A bridge section 520 connects the base to the handle. The carrier 505 can vary in shape and contour. In the illustrated embodiment, the base 510 forms a planar body that generally lies along or within a first plane 525, as shown in the side view of the carrier 105 of FIG. 6. The base 510 is rectangular or prismatic in shape although the shape can vary.

The handle 515 lies along or within a second plane 530 (FIG. 6) that is vertically offset (with respect to the view of FIG. 6) from the first plane 525. The first plane 525 may or may not be parallel to the second plane 530. The handle 515 is a generally planar body such as a rectangular disk although the shape can vary. The handle 515 is sized and shaped to be grasped by a user such as by also grasping at least a portion of the bridge section 520. The offset (i.e., distance) between plane 525 and 530 may be varied, for example and may be 1 mm, 2 mm, 3 mm, 4 mm, 5 mm, or greater. For example, the offset may be about 10 mm, about 20 mm, about 30 mm, about 40 mm, or about 50 mm. In embodiments, the offset is about 20 mm to about 35 mm.

The bridge section 520 lies along or within a third plane 545 (FIG. 6) that intersects the first plane 525 and the second plane 530. The third plane 545 can be normal to the first plane 525 and the second plane 530 or it can be at a non-normal angle as shown in FIG. 5. An angle formed between plane 525 and 545 can vary, for example, and may be about 10°, 15°, 20°, 25°, 30°, 35°, 40°, 45°, 50°, 55°, 60°, 65°, 70°, 75°, 80°, 85°, or about 90°.

With reference to FIG. 5, the base 510 includes a cavity 550 that is at least partially bounded along a perimeter by a raised wall of the base 510. The perimeter wall thus surrounds a periphery of the cavity 550. The cavity 550 can serve as a mold in which a carrier substrate can be formed, such as for a liquid polymer that is poured into the cavity 550. An aperture or slot 555 extends through the bridge section 520 and at least a portion of the base 510 such that the slot 555 provides a port into the cavity 550, as described further below. As shown in FIG. 5, a plate or lid 560 can be removably coupled to the base 510 to at least partially enclose the cavity 550. For example, the lid 560 can enclose an upper, open portion of the cavity 550. The lid 560 can partially enclose the cavity such that the port of the slot 555 forms the only ingress or egress for the cavity when the lid 560 is attached. The polymer may solidify to be a semi-solid or gel (e.g., a three-dimensional polymer slab) within the cavity. For example, the liquid polymer may be a light curable or thermally curable polymer.

Figure 7:
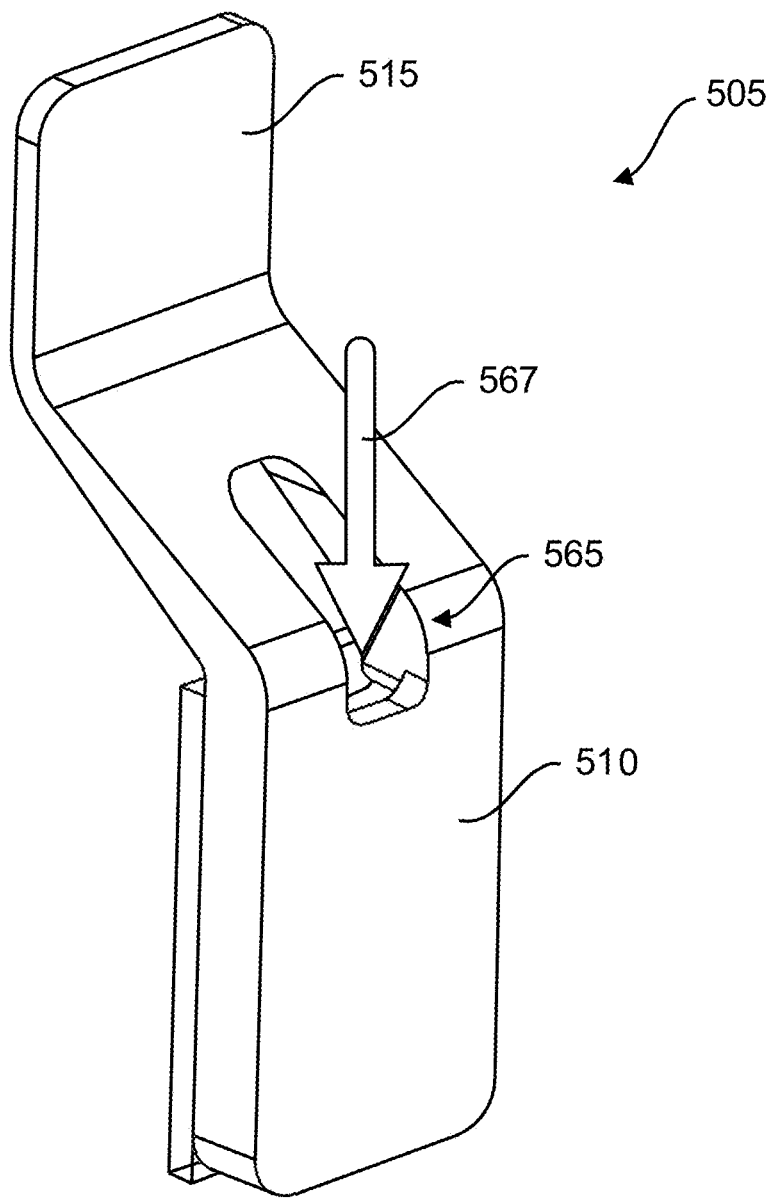
FIG. 7 shows a perspective view of the carrier 505 in a vertical orientation. The slot 555 forms a port 565 into the enclosed cavity 550. When the carrier 505 is vertically oriented as shown in FIG. 7, the port 565 opens upwardly and communicates with the cavity 550. A liquid polymer can be poured through the port 565 into the cavity 550, as represented by the downward arrow 567 in FIG. 7. The liquid polymer then resides within the cavity, which is at least partially enclosed by the lid 560.

FIG. 7 shows a perspective view of the carrier 505 in a vertical orientation. The slot 555 forms a port 565 into the enclosed cavity 550. When the carrier 505 is vertically oriented as shown in FIG. 7, the port 565 opens upwardly and communicates with the cavity 550. A liquid polymer can be poured through the port 565 into the cavity 550, as represented by the downward arrow 567 in FIG. 7. The liquid polymer then resides within the cavity, which is at least partially enclosed by the lid 560.

Figure 8:
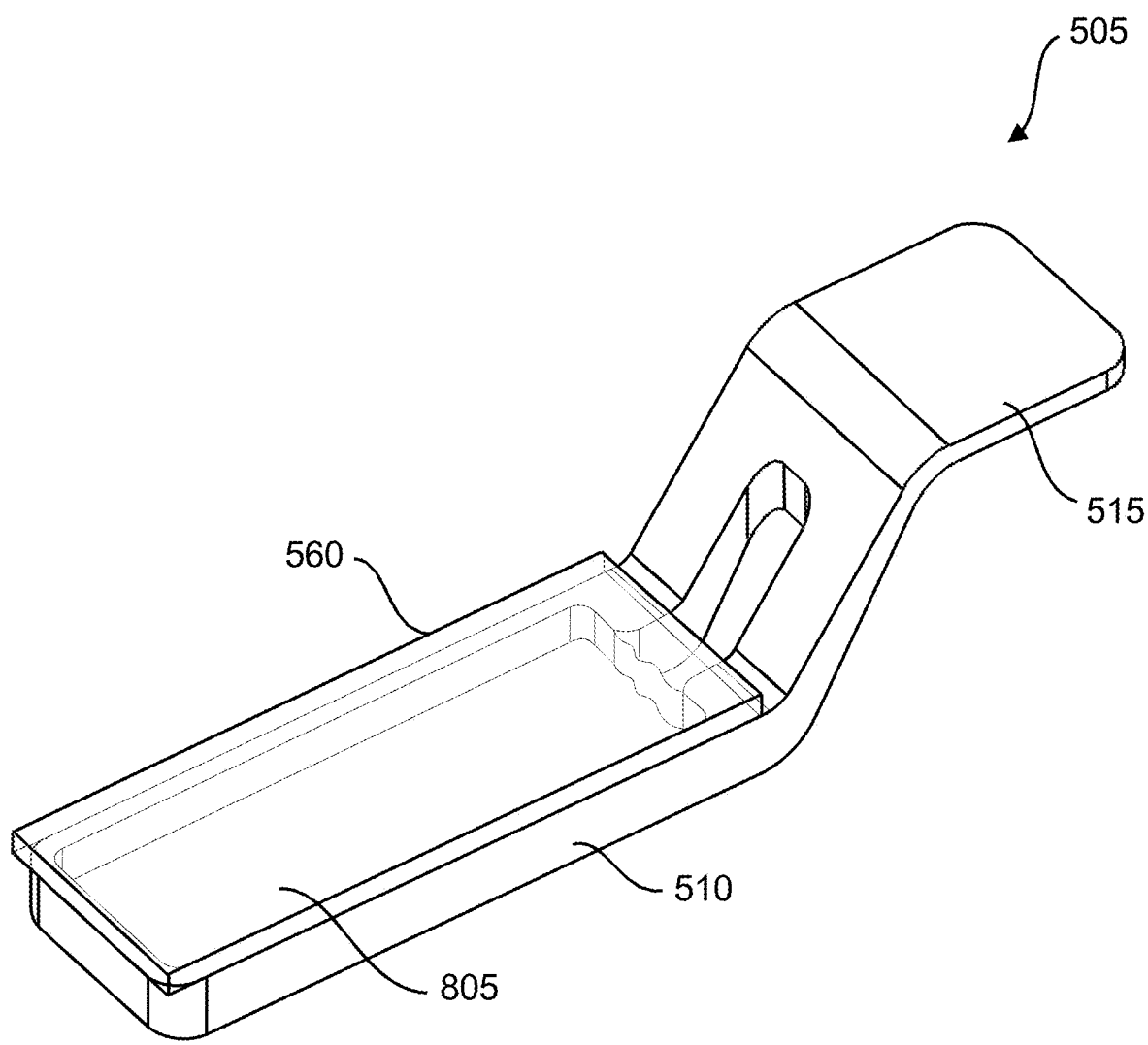
FIG. 8 shows the carrier 505 with the lid 560 coupled thereto. The carrier substrate in the form of a polymeric gel (e.g., agarose containing hydrogel) 805 resides in the cavity of the carrier and is covered by the lid 560.
Figure 9:
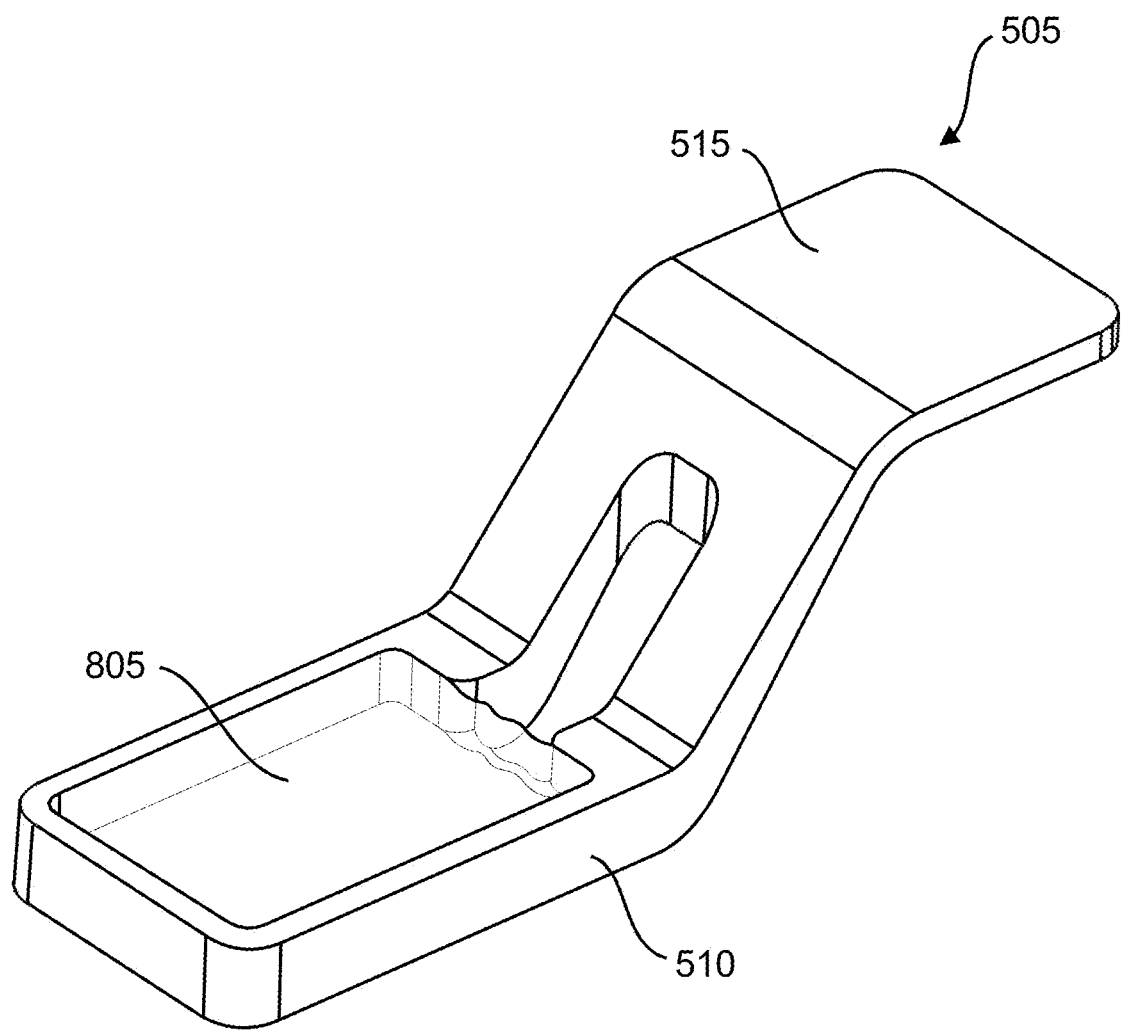
FIG. 9 shows the carrier 505 with the lid 560 removed. The agar 805 is set into the shape of the cavity mold as defined by the cavity 550.

FIG. 8 shows the carrier 505 with the lid 560 coupled thereto. The carrier substrate in the form of a polymer gel 805 resides in the cavity of the carrier and is covered by the lid 560. FIG. 9 shows the carrier 505 with the lid 560 removed. The polymer gel 805 is set into the shape of the cavity mold as defined by the cavity 550.

In embodiments to form the polymer within the mold of the carrier, the carrier 505 is positioned in the vertical orientation (as shown in FIG. 7) wherein the carrier 505 is vertically oriented so the port 565 opens upwardly. The liquid polymer can be poured through the port 565 into the cavity 550. When oriented as such, the first plane 525 that defines the base 510 and the second plane 530 that defines the handle 515 are substantially vertically oriented.

To the extent any bubble(s) is/are formed or otherwise present in the liquid polymer while in the cavity 550, such bubble(s) advantageously rise upward toward the port 565. The bubble(s) can release to atmosphere via the port 565. The liquid polymer can then be allowed to set or cure in shape as defined by the cavity 550. The carrier 505 can be in the vertical orientation during such setting or it can be in a horizontal orientation as shown in FIG. 8. As mentioned, lid 560 can then be removed to expose the carrier substrate in the form of the cured or set polymer gel as shown in FIG. 9.

Figure 10A:
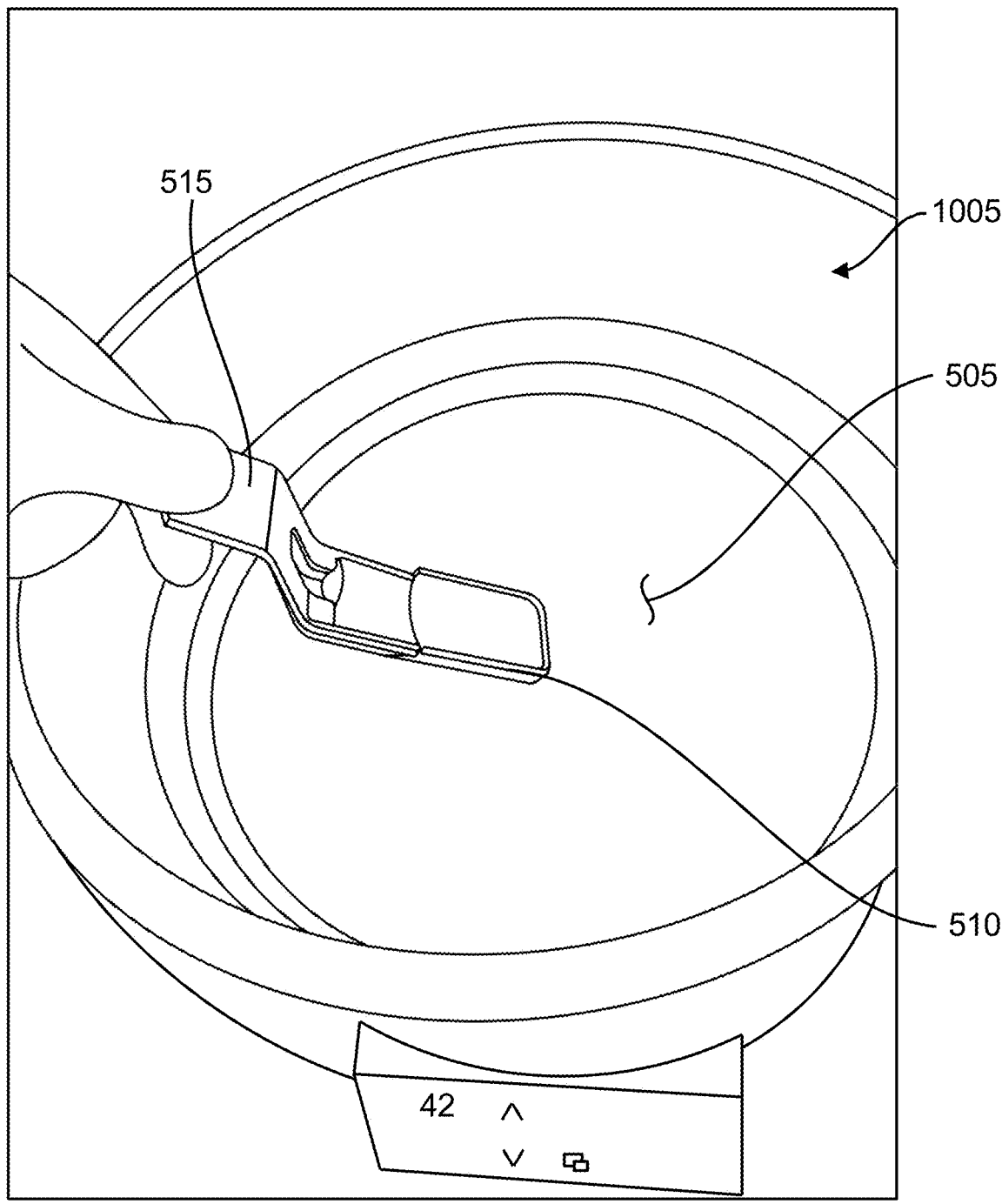
FIG. 10A shows a user positioning at least a portion of the carrier 505 into a water bath 1005 that contains one or more tissue sections such as floating on the water bath 1005. The user handles the carrier 505 to position the agar gel into the water bath. The user can grasp the handle 515 and use the carrier 505 to ladle or otherwise manipulate one or more tissue sections onto the agar gel positioned on the base 510. In this manner, the user uses the carrier 505 to catch or capture a tissue sample onto the agar gel, as shown in FIG. 10B.
Figure 10B:
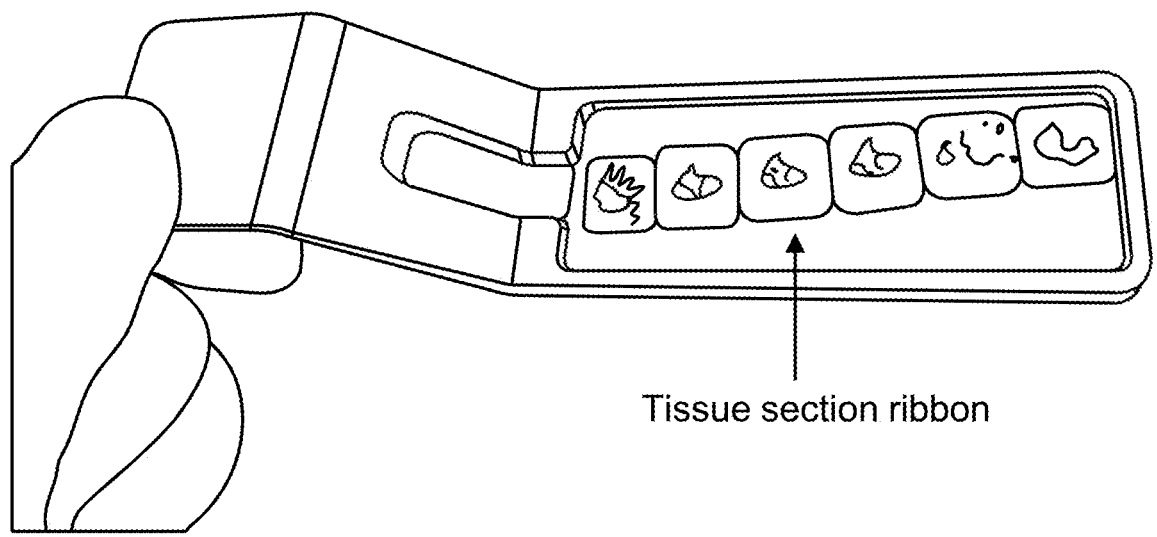

A user can then grasp the handle 515 and can move, handle, transport, or otherwise manipulate the carrier substrate (polymer gel or polymer slab) while it is in the carrier 505. FIG. 10A shows a user positioning at least a portion of the carrier 505 into a water bath 1005 that contains one or more tissue sections such as floating on the water bath 1005. The user handles the carrier 505 to position the polymer gel into the water bath. The user can grasp the handle 515 and use the carrier 505 to ladle or otherwise manipulate one or more tissue sections onto the polymer gel positioned on the base 510. In this manner, the user uses the carrier 505 to catch or capture a tissue sample onto the polymer gel, as shown in FIG. 10B. The user can then use other systems, methods or devices, such as those described herein for example, to process or further manipulate the tissue sample. The user may tilt or otherwise manipulate the carrier substrate to remove any excess water without displacing or removing the carrier substrate. In embodiments, the device includes a trough, channel, port, or indentation to facilitate water removal.

Figure 11:
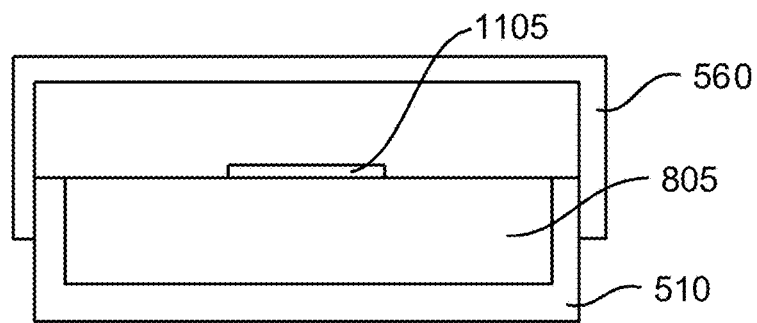
FIG. 11 shows a schematic, cross-sectional view of the base 510 of the carrier 505. An approximate thickness of the polymeric gel is about 5 mm.
Figure 12:
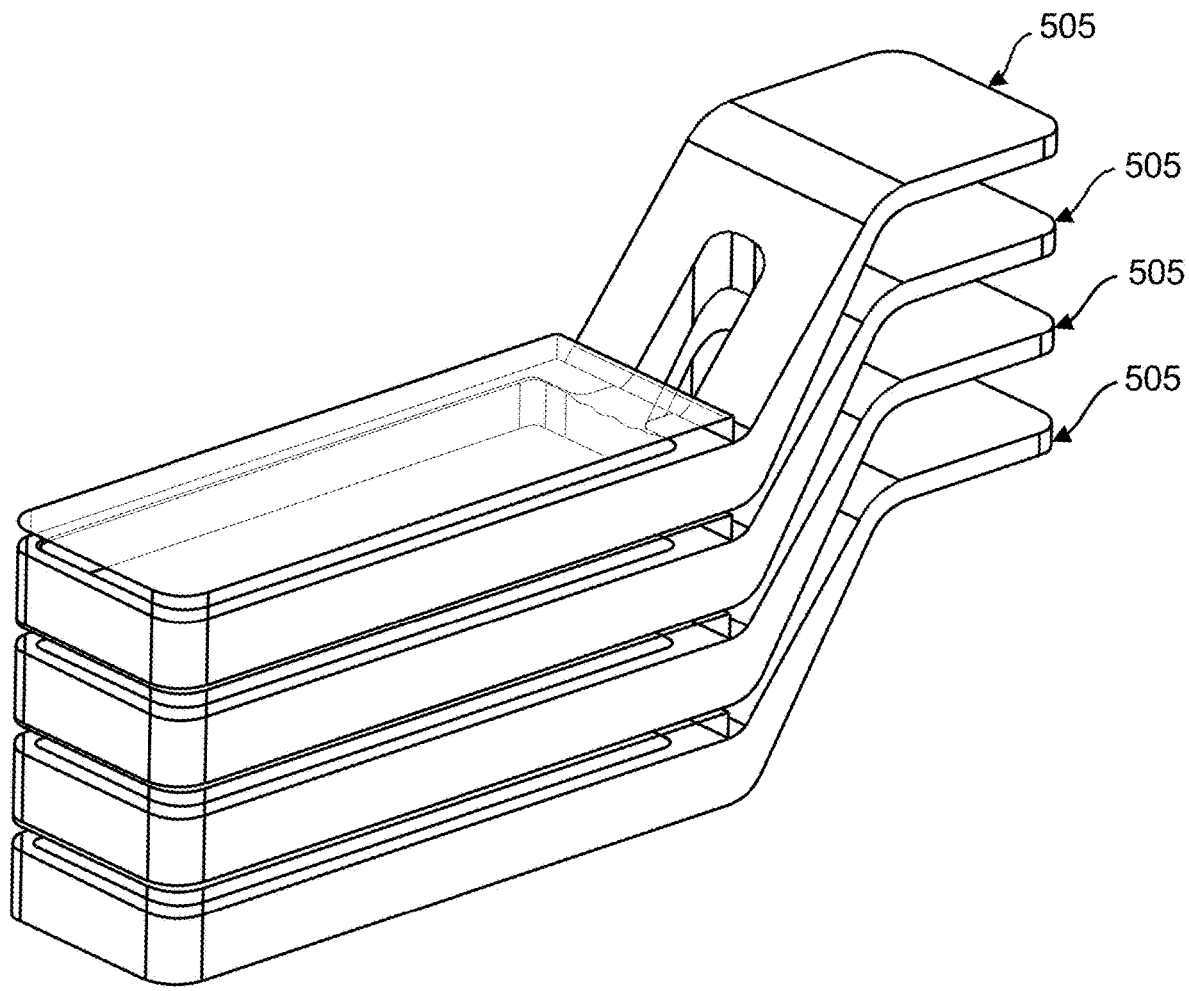
FIG. 12 shows five carriers 505 in a stacked arrangement, although the quantity can vary. In the illustrated embodiment, the upper surface of the lid 560 is flat, which complements a flat lower surface of the base 510. Thus, the lower surface of the base complements or mates with the upper surface of a lid positioned below a given carrier 505 in the stack. The upper surface of the lid is thus configured to mate with, interlock with, or otherwise coupe with a lower surface of a juxtaposed lower surface of a base of a carrier 505. This facilitates storage of multiple carriers in a space-usage efficient manner.

FIG. 11 shows a schematic, cross-sectional view of the base 510 of the carrier 505. The carrier substrate in the form of a polymer gel 805 resides within the base 510 (or mold) with the tissue section 1105 positioned on the polymer gel (e.g., agarose hydrogel). The lid 560 is coupled to the base 510 such that the lid 560 covers the polymer gel 805 and the tissue section 1105. The lid 560 forms an upper surface, such as a flat upper surface. The lid may engage with and be retained to the base with a notch, groove, latch, or other retention mechanism. The upper surface can alternately have a contoured shape. The lid 560, including its upper surface, is shaped to facilitate vertical stacking of two or more carriers 505 atop one another. FIG. 12 shows five carriers 505 in a stacked arrangement although the quantity can vary. In the illustrated embodiment, the upper surface of the lid 560 is flat, which complements a flat lower surface of the base 510. Thus, the lower surface of the base complements or mates with the upper surface of a lid positioned below a given carrier 505 in the stack. The upper surface of the lid is thus configured to mate with, interlock with, or otherwise coupe with a lower surface of a juxtaposed lower surface of a base of a carrier 505. This facilitates storage of multiple carriers in a space-usage efficient manner.

Figure 6:
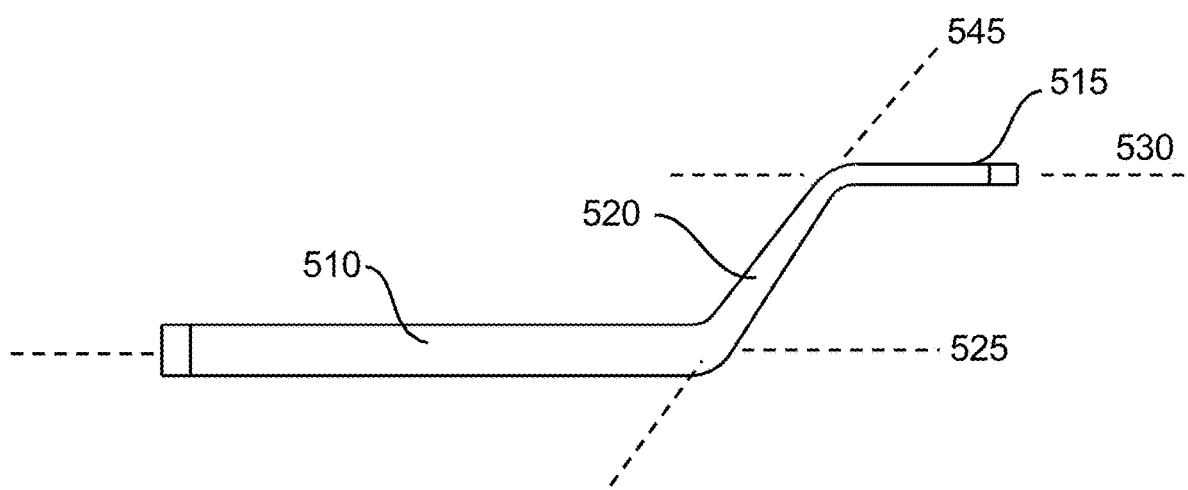
FIG. 6 shows a side view of an example carrier 505.
Figure 13:
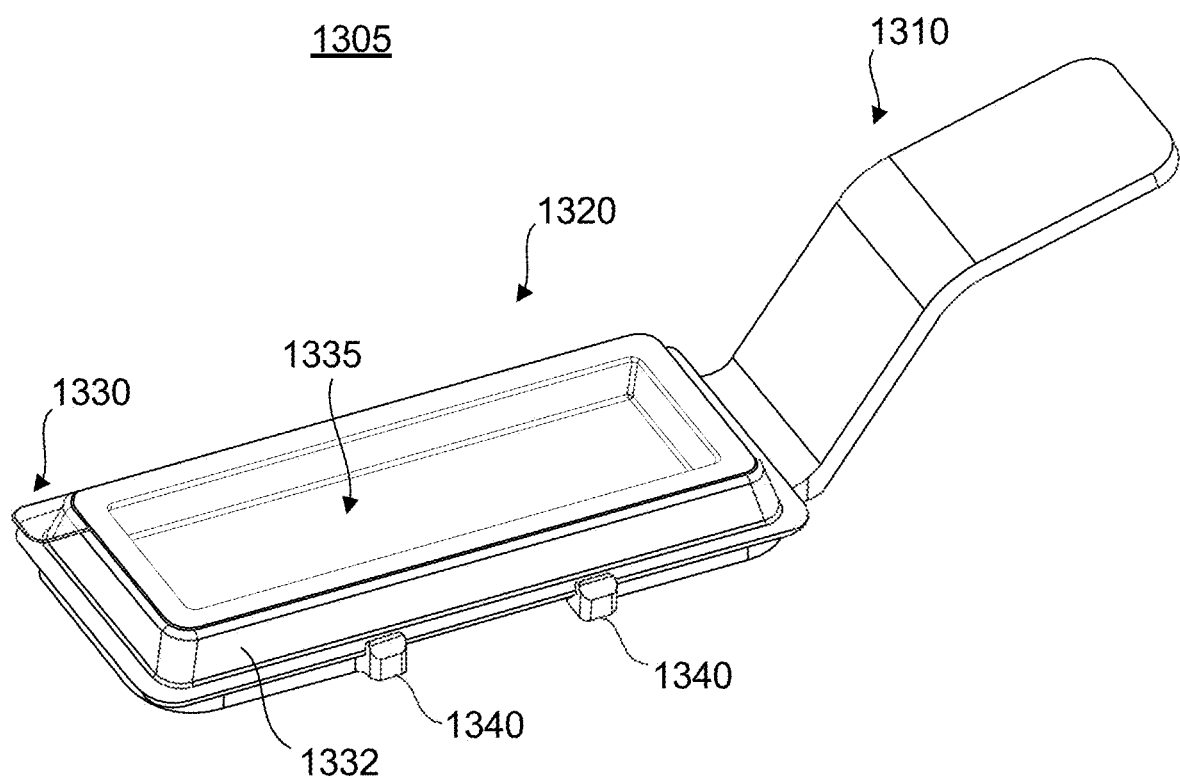
FIG. 13 shows a perspective view of another implementation of a carrier assembly.
Figure 14:
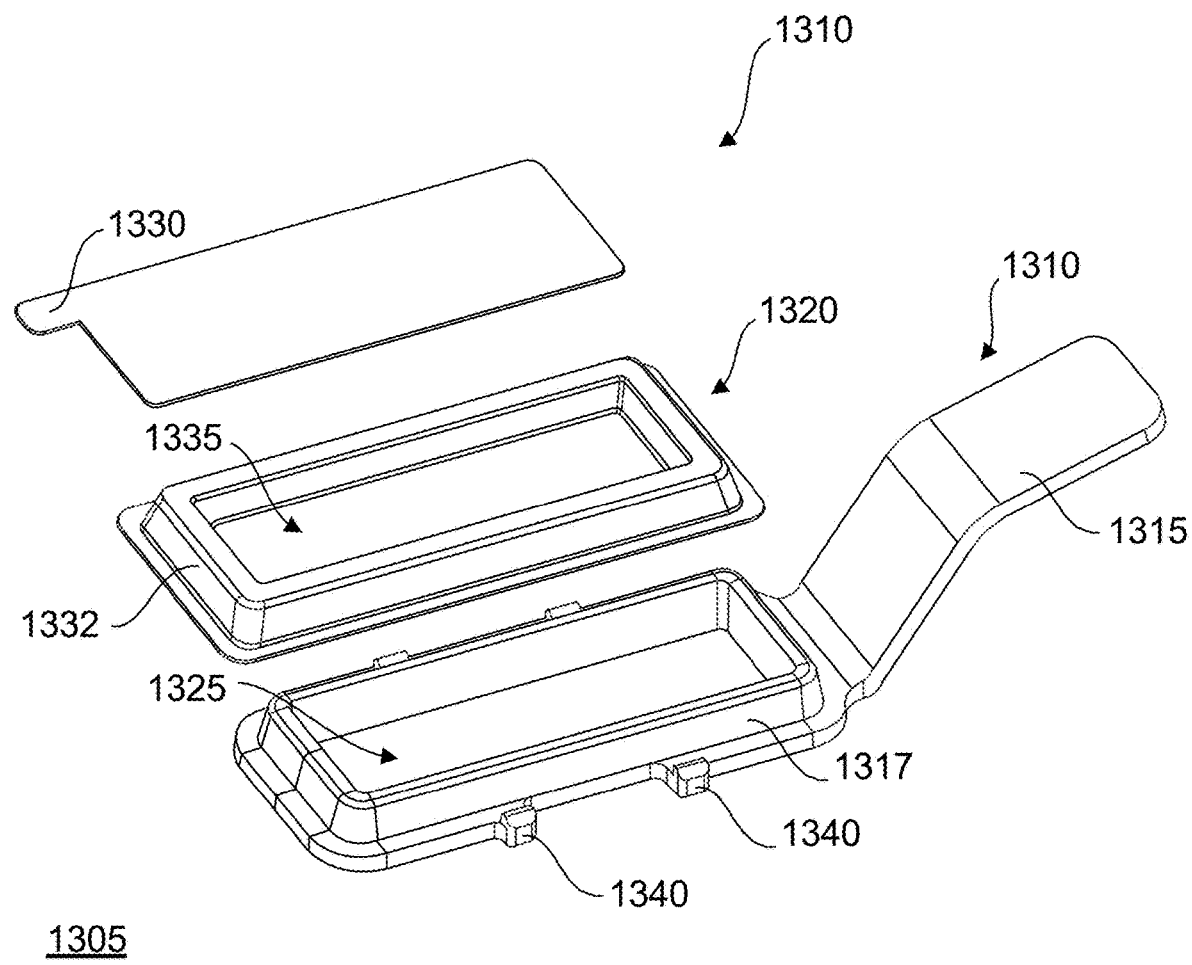
FIG. 14 shows a view of the carrier assembly of FIG. 13 in an exploded state.
Figure 15:
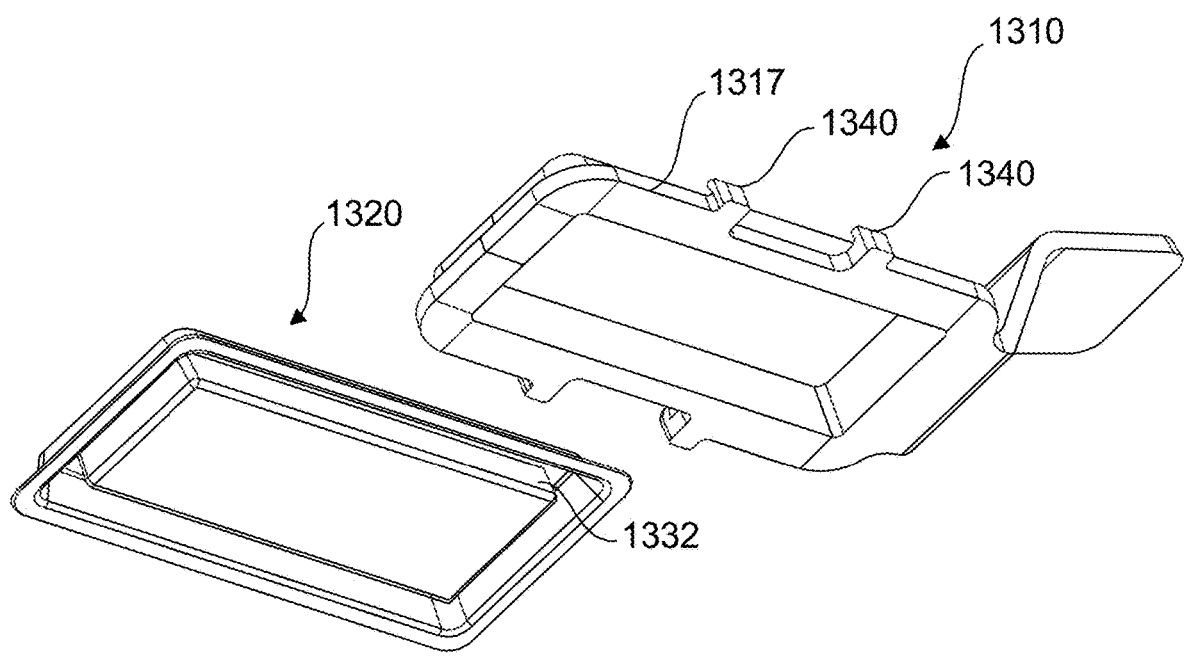
FIG. 15 shows a bottom view of the carrier assembly of FIG. 13 in an exploded state.

FIG. 13 shows a perspective view of another implementation of a carrier assembly 1305, which includes the carrier 1310, a mold frame 1320 removably attached to the carrier 1305, and a cover 1330 removably positioned on the mold frame 1320. FIG. 14 shows a view of the carrier assembly 1305 in an exploded state. FIG. 15 shows a bottom view of the carrier assembly 1305 in an exploded state. The carrier 1310 has a handle 1315 that connects to a base 1317 having one or more peripheral walls that surround or define an aperture 1325 that extends through the base 1310. The carrier 1310 can optionally have a side-view contour similar or the same as the side-view contour of the previously discussed implementation of the carrier that is shown in FIG. 6. The mold frame can be an injection molded body.

The mold 1320 frame removably couples to, mates with or is otherwise supported by the base 1317 of the carrier 1310. The mold frame 1320 has a peripheral wall 1332 that defines a pocket or cavity 1335 with or without a bottom wall or bottom surface. The cavity 1335 forms a mold for forming a hydrogel cast such as a hydrogel cast including agarose or other suitable polymer (e.g., polyacrylamide, cellulose, alginate, polyamide, cross-linked dextran or cross-linked polyethylene glycol). The peripheral wall 1332 and the cavity 1335 complement the shape of the peripheral wall and aperture 1325 of the base 1317. In this manner, the mold frame 1320 can be seated or mated atop the base 1317 such that the aperture 1325 of the base 1317 receives the complementary-shaped wall 1332 and cavity 1335 of the mold frame 1320. When seated as such, mold frame 1335 extends into or through the aperture 1325.

This arrangement provides a structurally secure fit between the mold frame 1320 and the base 1317 when the two are mated together. The base 1317 may also include one more attachment members or retention mechanisms, such as clips 1340 that removably and securely attach to the mold frame 1320 when the mold frame 1320 is seated on the base 1317 as shown in FIG. 13. In this regard, the clips 1340 can clip onto a bottom lip portion of the mold frame 1320 although other attachment mechanisms (e.g., pins, notch, channel and groove) or arrangements are possible. It should be appreciated that other structural arrangements for mating the mold frame 1320 to the base 1317 are possible. For example, the base 1317 may simply form a flat, contoured, curved or other-shaped platform upon which the mold frame 1320 can be seated. Or the base 1317 can have an aperture that receives the mold frame 1320.

With reference again to FIGS. 13 and 14, the cover 1330 is a generally planar structure having a shape that conforms to or complements the shape of the peripheral wall 1332 of the mold frame 1320. In this manner, the cover 1330 can be positioned atop the cavity 1335 such that it covers the cavity 1335 as shown in FIG. 13. The cover can have a tab 1330 (FIG. 13) or other element that can be grasped by a user to enable the user to handle or manipulate the cover 1330.

The frame assembly 1305 can be used in a similar or same manner as the implementation described with reference to FIGS. 10A and 10B above. A user uses the carrier 1310 to positions at least a portion of the mold frame 1320 into a water bath 1005 that contains one or more tissue sections such as floating on the water bath 1005. The user handles the carrier 505 to position the agar gel into the water bath. The user can grasp the handle 515 and use the carrier 505 (with the mold frame 1320 seated thereon) to ladle or otherwise manipulate one or more tissue sections onto the polymer gel (e.g., agarose hydrogel) positioned in the mold frame 1320. In this manner, the user uses the carrier 505 to catch or capture and retain a tissue sample onto the polymer gel, as shown in FIG. 10B.

The removable mold frame 1320 permits a user to detach the mold frame 1320 from the carrier 1310 once the polymer gel has been molded into shape. The carrier may be stored under suitable conditions, for example, at reduced temperatures (e.g., less than 25° C., for example at 4° C.-6° C., for tissue preservation at storage.

Figure 16:
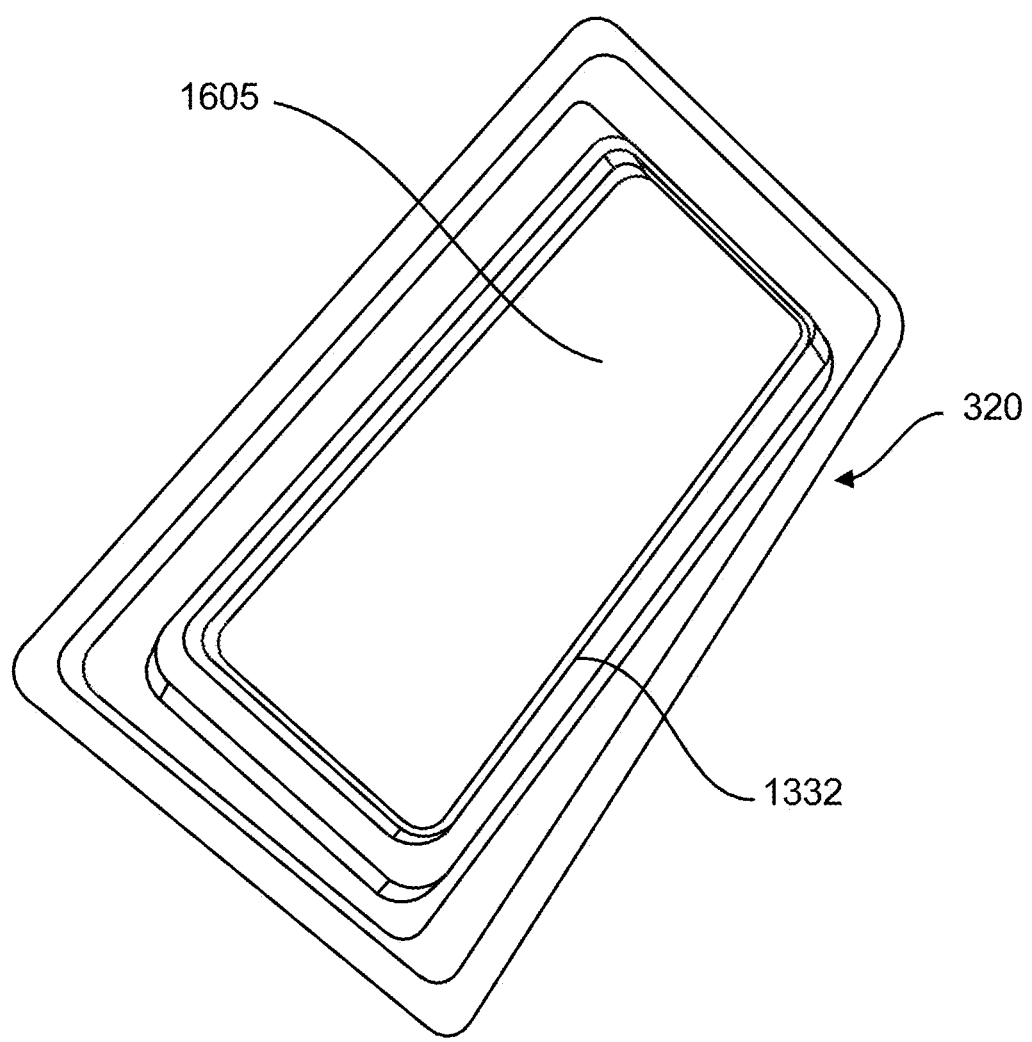
FIG. 16 shows an embodiment of a mold frame wherein a substrate is located on a bottom region of the mold frame.
Figure 17:
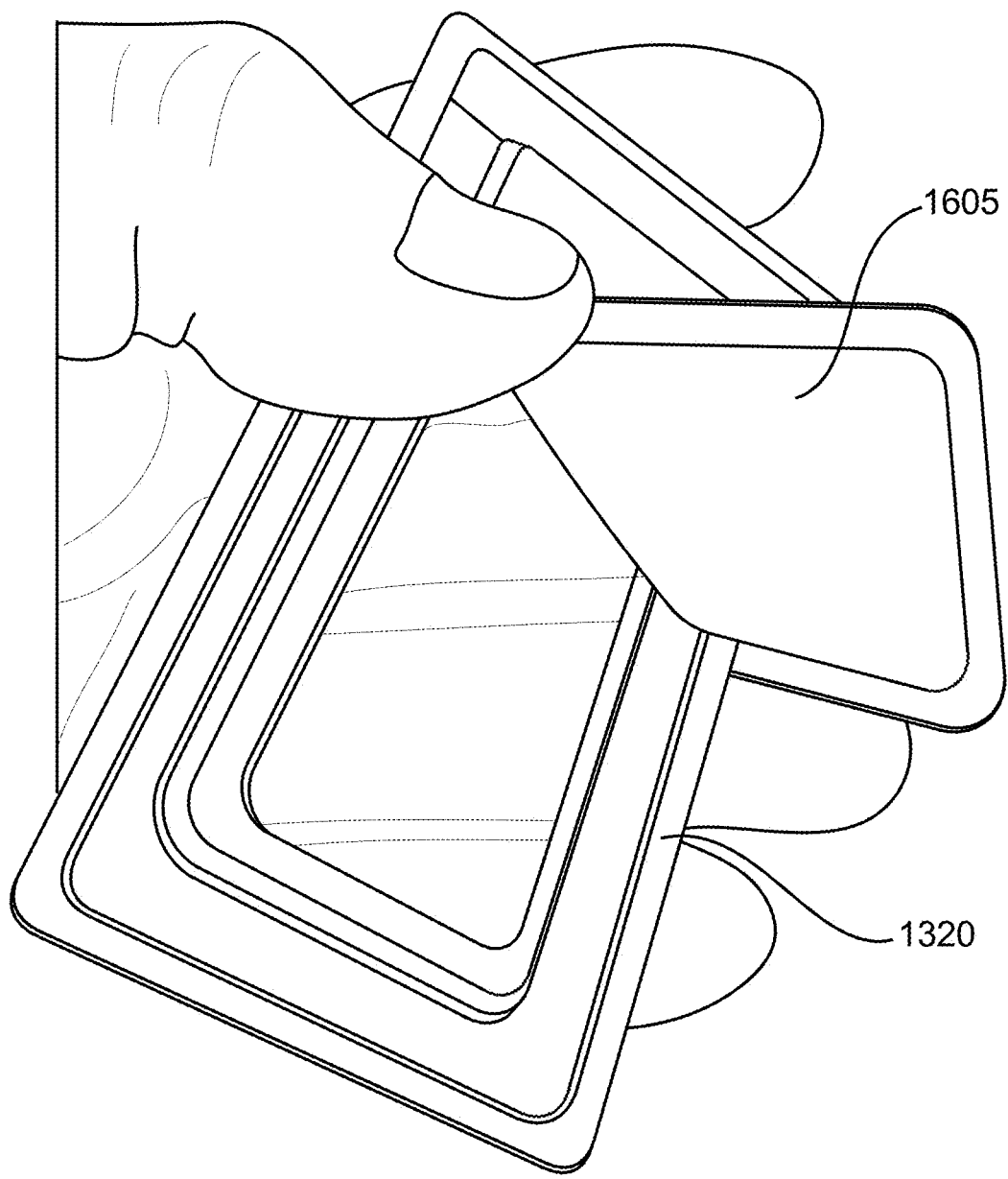
FIG. 17 shows the substrate being peeled away from the mold frame.

FIG. 16 shows an embodiment of the mold frame 1320 wherein a substrate 1605 is located on a bottom region of the mold frame 1320. The substrate 1605 forms a surface that aids in formation of the hydrogel when curing, and removing the substrate 1605 aids in removing a hydrogel section (e.g., a cut portion of the hydrogel). For example, removing the backing 1605 enables the substrate to be placed on a suitable cutting surface when punching tissue sections. The substrate 1605 forms a removable backing, bottom floor, or bottom surface of the cavity 1335 (the cavity 1335 is shown in FIG. 14.) The substrate 1605 can be attached to a bottom of the peripheral wall 1332 such as to a bottom lip of the peripheral wall 1332. The substrate 1605 is secured to the bottom of the mold frame 1320 such as by using adhesive that permits the substrate 1605 to be peeled away from the mold frame 1320. FIG. 17 shows the substrate 1605 being peeled away from the mold frame 1320. The substrate 1605 can be made of various materials. In a non-limiting example, the substrate 1605 is polyester film or tape such as MYLAR® tape, plastic, or polyester film. In embodiments, the substrate is attached to the mold frame 1320 with an adhesive. In embodiments, the substrate 1605 is temporarily removed from the mold frame 1320 to manipulate the tissue section (e.g., punch out a portion of the tissue section) and the substrate 1605 is reattached to the mold frame 1320 (e.g., the substrate adheres to the mold frame with the adhesive).

Figure 18:
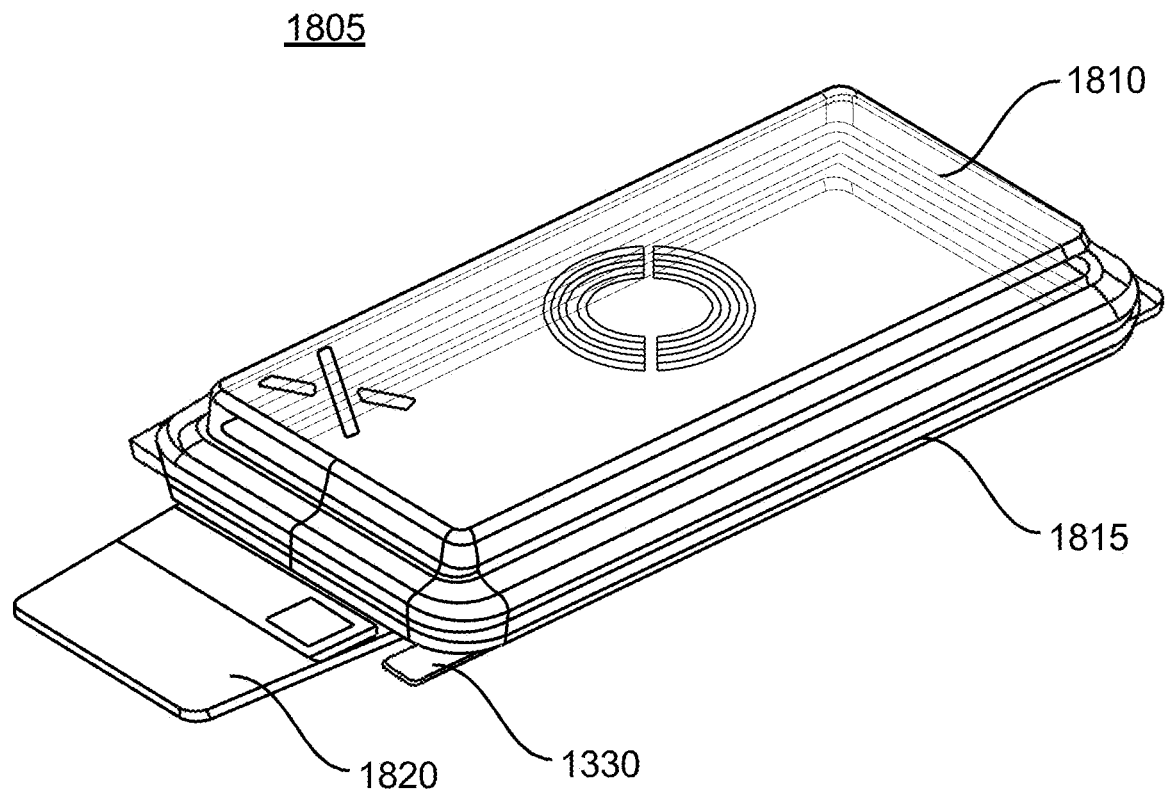
FIG. 18 shows a tissue catch tray assembly that can be used to capture tissue.
Figure 19:
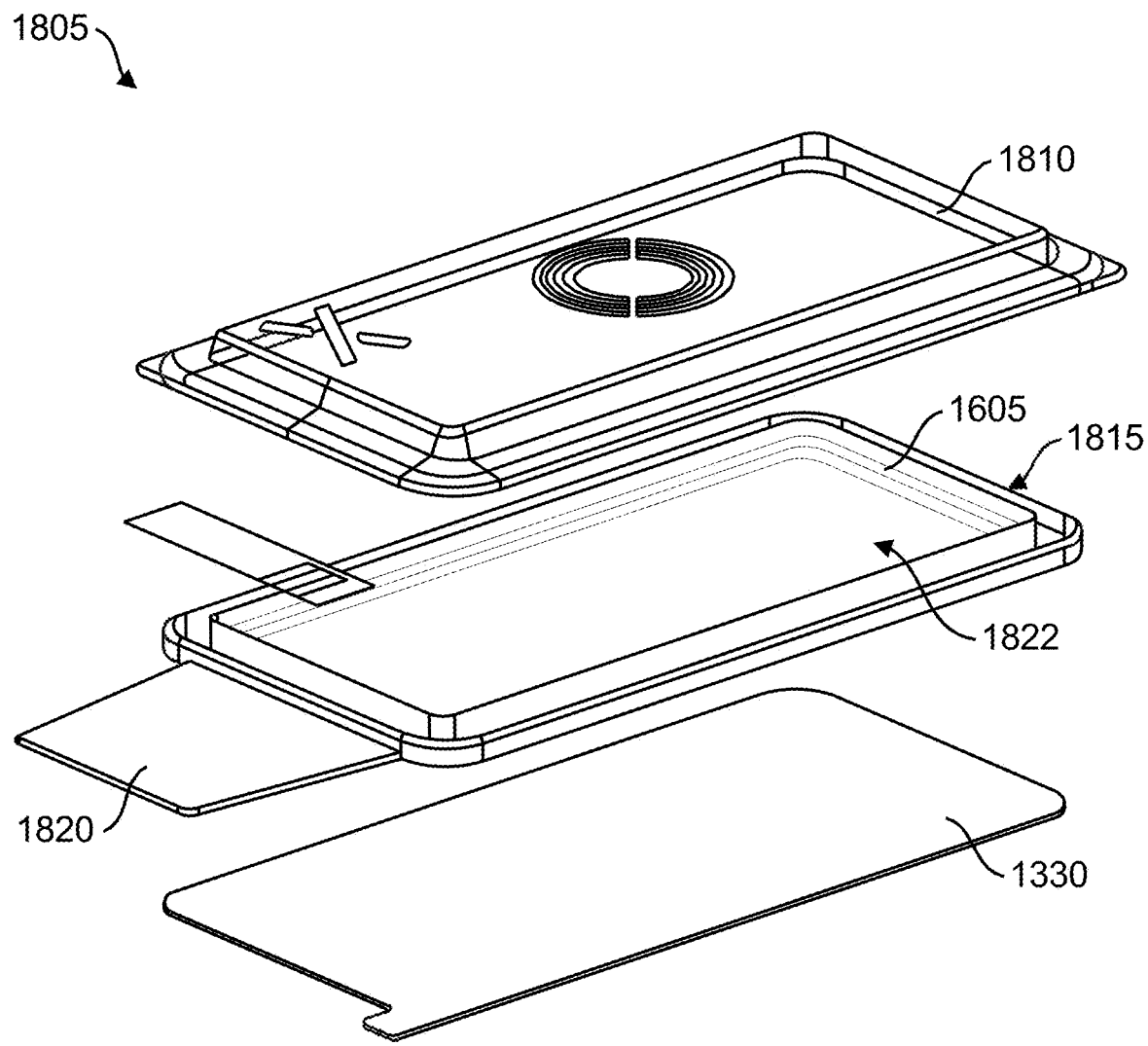
FIG. 19 shows the tissue catch tray assembly in an exploded state.

FIG. 18 shows a tissue catch tray assembly 1805 that can be used to capture tissue, for example using a water bath as described above with reference to FIG. 10A. FIG. 19 shows the tissue catch tray assembly 1805 in an exploded state. The tissue catch tray assembly 1805 includes a lid 1810 that removably mates with the tissue catch tray 1815 that has a handle 1820 extending outwardly from a body of the catch tray 1815. The handle can be a planar structure such as a tab that can be grasped by a user (to effectively hold and manipulate the entire tissue catch tray assembly 1805 when assembled. In embodiments, the handle includes a planar structure that extends outwardly from a side of the tissue catch tray. The handle may also include a region for marking or identifying the tissue sample.

The catch tray 1815 has a partially enclosed central cavity 1822 that forms a mold for forming a hydrogel cast such as a hydrogel cast including the polymer gel (e.g., polyacrylamide, cellulose, alginate, polyamide, cross-linked agarose, cross-linked dextran or cross-linked polyethylene glycol). A substrate 1605 removably covers one end of the cavity (such as a top end or a bottom end) and a cover film 1330 covers an opposite end of the cavity 1822. In embodiments, the tissue catch tray includes a planar substrate removably positionable on a top of the frame such that the substrate encloses a top end of the cavity. For example, when shipping and prior to initial use, the polymer slab may be covered in a removable substrate (e.g., a Mylar® or other peelable, flexible film, such as polypropylene (PP) film, polyvinyl chloride (PVC) film, or low-density polyethylene (LDPE) film).

Figure 20:
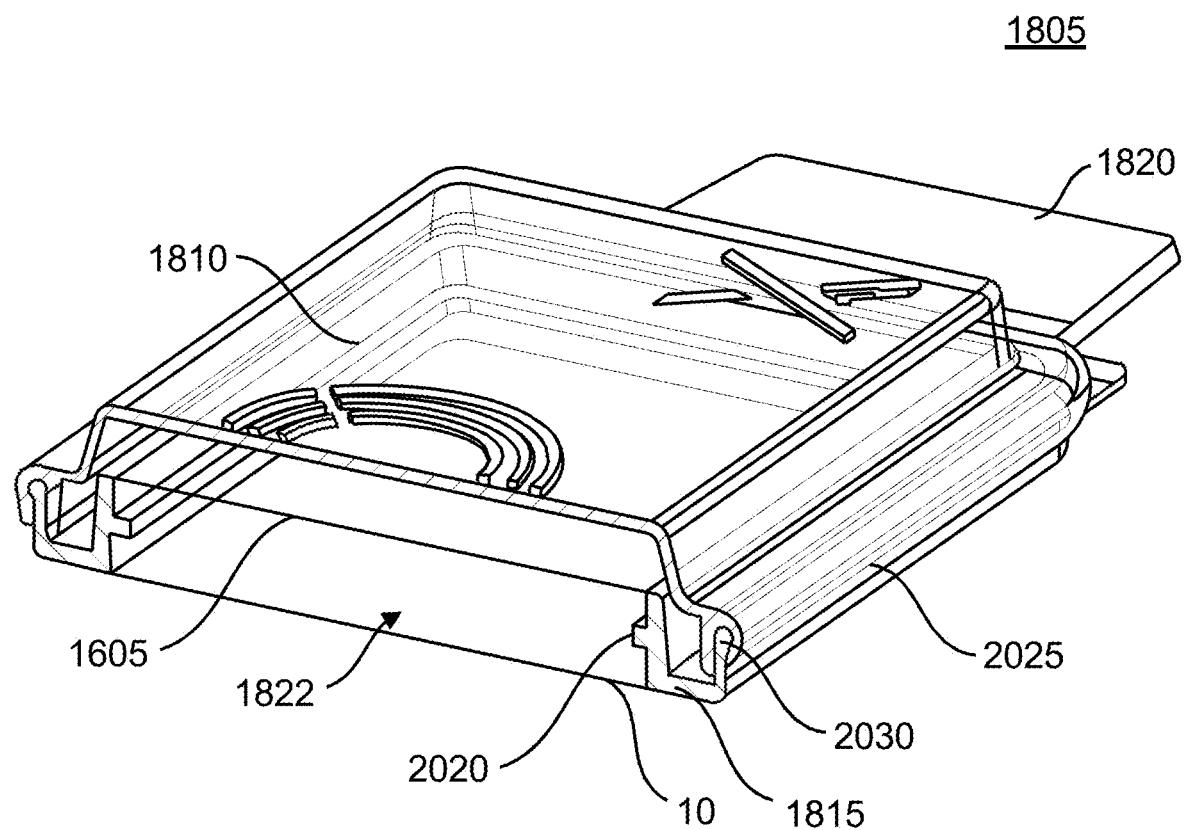
FIG. 20 shows the tissue catch tray assembly in cross section.

FIG. 20 shows the tissue catch tray assembly 1805 in cross section. As mentioned, the cavity 1822 is enclosed on opposite ends by the removable substrate 1605 and the cover film 1330. The lid 1810 is configured to removably snap onto the catch tray 1815. The lid 1810 may have an outer peripheral wall 2025 that defines a groove sized and shaped to removably receive an upwardly extending tongue 2030 of the catch tray 1815. Other mechanisms for removably coupling the catch tray 1815 and the lid 1810 are possible. An inner wall of the catch tray 1815 forms a rib 2020 that runs around an inner perimeter of the catch tray 1815. The rib 2020 structurally interacts with an agarose cast inside the cavity 1822 to assist in maintaining the polymer slab (e.g., hydrogel) in place. In embodiments, the tissue catch tray includes a rib on the frame, wherein the rib extends into the cavity. In embodiments, the rib extends into the cavity from a peripheral wall of the frame, and wherein the rib extends around an inner perimeter of the cavity. In embodiments, the rib extends around an entire inner perimeter of the cavity. In embodiments, the rib extends around only a portion of the inner perimeter of the cavity (e.g., one or two sides of the inner perimeter).

In embodiments, the tissue catch tray includes an outer peripheral wall that surrounds the cavity and an inner peripheral wall that surrounds the cavity, and wherein the peripheral trough is positioned between the outer peripheral wall and the inner peripheral wall.

In use, the lid 1810 is removed from the catch tray 1815. The lid may serve to keep debris from contacting the polymer slab and/or the tissue sample when not in use. A user grasps the catch tray 1815 such as by grabbing the handle 1820. The catch tray 1815 is used to ladle or otherwise manipulate one or more tissue sections onto a polymer gel positioned in the catch tray 1815 (such as described above with reference to FIG. 10A.) In embodiments, the tissue catch tray assembly includes a lid that removably attachable to a top end of the frame such that the substrate is interposed between the lid and the cavity.

Figure 21:
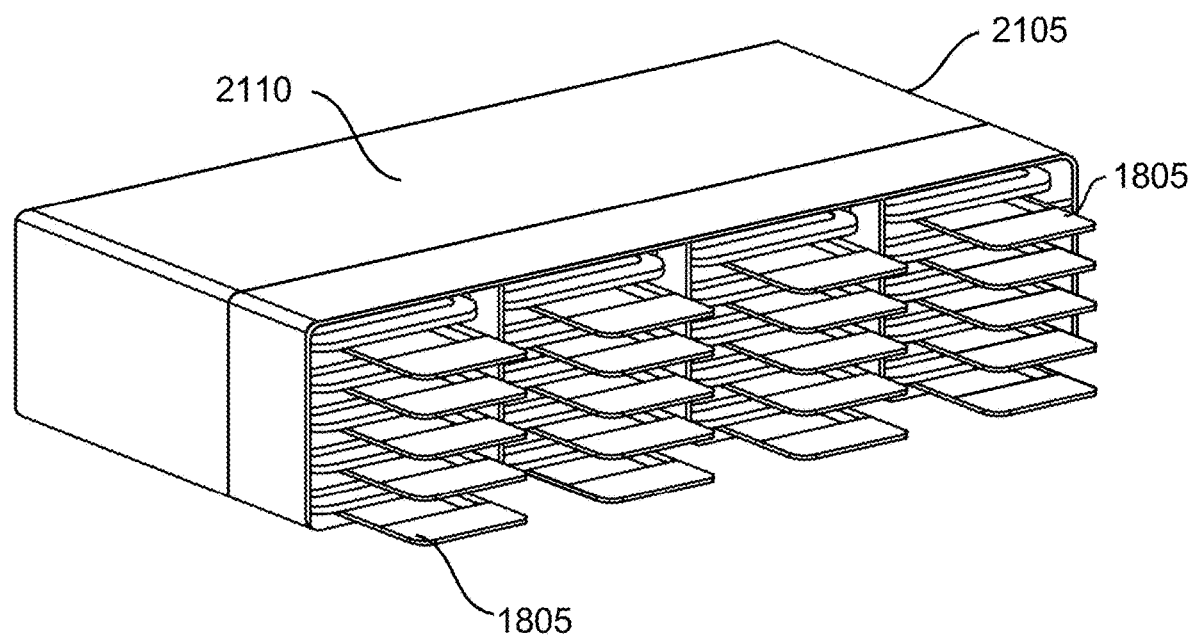
FIG. 21 shows a storage assembly for storing one or more catch tray assemblies.

FIG. 21 shows a storage assembly 2105 comprising a housing 2110 that can store one or more tissue catch tray assembly 1805. The housing 2110 defines a plurality of seats or slots each sized and shaped to slidingly receive a tissue catch tray assembly 1805 such as in a sliding manner. In embodiments, the kit includes a storage assembly configured to retain a plurality of the tissue catch tray assemblies as described herein.

The devices described herein include a hydrogel or polymer gel. Polymer gels are a versatile, soft, semi-solid class of materials typically having consistency between liquid and solid states. Their cross-linked network can form cavities of different shapes and sizes. In embodiments, polymer gels are systems formed by a polymer and a solvent in the arrangement of a three-dimensional (3D) cross-linked polymeric network. In embodiments, the polymer gels display a finite shear viscosity. In embodiments, the hydrogel is an agarose polymer gel. Agarose is a natural polysaccharide extracted from red seaweed and is known to form a gel in aqueous media. Agarose becomes soluble in aqueous media at high temperatures (over a melting temperature Tm characterizing the gel-sol transition). Then, it forms strong physical gels at low temperatures (lower than Tg, corresponding to the sol-gel transition). The stabilization of the gel is understood to be achieved through a hydrogen-bond network involving —OH groups in an associated double helical structure and water-agarose —OH groups. In embodiments, agarose is a linear polysaccharide made of repeating units of agarobiose that may be extracted from boiled red algae. In embodiments, the hydrogel includes polymerized monomers, water, and an organic solvent (e.g., acetonitrile, glycerol, glycerin, ethylene glycol).

In embodiments, the carrier substrate includes a compression modulus greater than about 100 kPa. In embodiments, the carrier substrate includes a compression modulus greater than about 250 kPa. In embodiments, the carrier substrate includes a compression modulus greater than about 500 kPa. In embodiments, the carrier substrate includes a compression modulus greater than about 750 kPa. In embodiments, the carrier substrate includes a compression modulus greater than about 1 MPa. In embodiments, the carrier substrate includes a compression modulus greater than about 1.5 MPa. In embodiments, the carrier substrate includes a compression modulus greater than about 2 MPa. In embodiments, the carrier substrate includes a compression modulus of about 5 kPa. In embodiments, the carrier substrate includes a compression modulus of about 25 kPa. In embodiments, the carrier substrate includes a compression modulus of about 30 kPa In embodiments, the carrier substrate includes a compression modulus of about 40 kPa In embodiments, the carrier substrate includes a compression modulus of about 50 kPa. In embodiments, the carrier substrate includes a compression modulus of about 60 kPa. In embodiments, the carrier substrate includes a compression modulus of about 70 kPa. In embodiments, the carrier substrate includes a compression modulus of about 80 kPa. In embodiments, the carrier substrate includes a compression modulus of about 90 kPa. In embodiments, the carrier substrate includes a compression modulus of about 100 kPa. In embodiments, the carrier substrate includes a compression modulus of about 250 kPa. In embodiments, the carrier substrate includes a compression modulus of about 500 kPa. In embodiments, the carrier substrate includes a compression modulus of about 750 kPa. In embodiments, the carrier substrate includes a compression modulus of about 1 MPa. In embodiments, the carrier substrate includes a compression modulus of about 1.5 MPa. In embodiments, the carrier substrate includes a compression modulus of about 2 MPa.

In another aspect is provided a polymer gel cast. In embodiments, the polymer gel cast includes a carrier substrate. In embodiments, the polymer gel cast includes a polymer gel. In embodiments, the polymer gel cast includes a three dimensional polymer slab. In embodiments, the polymer gel case includes a frame including a handle. In embodiments, the frame is removably coupled to a mold frame, wherein the mold frame is configured to retain the polymer gel. See, for example, FIG. 14. In embodiments, the mold frame includes a pocket. In embodiments, the pocket is configured to retain the polymer gel. For example, the pocked includes a retention mechanism such as compression tabs, posts, snap-fit retention clips, interlocking grooves, angled edges, or a frictional fit to retain the polymer gel.

In embodiments, the carrier substrate (e.g., the three dimensional polymer slab) includes a hydrogel. In embodiments, the carrier substrate includes agarose, amylose, amylopectin, alginate, gelatin, cellulose, polyolefin, polyethylene glycol, polyvinyl alcohol, and/or acrylate polymers and copolymers thereof. In embodiments, the carrier substrate includes agarose, amylose, or amylopectin. In embodiments, the carrier substrate includes agarose. In embodiments, the carrier substrate includes amylose. In embodiments, the carrier substrate includes amylopectin. In embodiments, the carrier substrate includes alginate. In embodiments, the carrier substrate includes gelatin. In embodiments, the carrier substrate includes cellulose. In embodiments, the carrier substrate includes polyolefin. In embodiments, the carrier substrate includes polyethylene glycol. In embodiments, the carrier substrate includes polyvinyl alcohol. In embodiments, the carrier substrate includes acrylate polymers and copolymers thereof.

In embodiments, the carrier substrate includes about 2% to about 10% agarose. In embodiments, the carrier substrate includes about 2% agarose. In embodiments, the carrier substrate includes about 3% agarose. In embodiments, the carrier substrate includes about 4% agarose. In embodiments, the carrier substrate includes about 5% agarose. In embodiments, the carrier substrate includes about 6% agarose. In embodiments, the carrier substrate includes about 7% agarose. In embodiments, the carrier substrate includes about 8% agarose. In embodiments, the carrier substrate includes about 9% agarose. In embodiments, the carrier substrate includes about 10% agarose. In embodiments, the carrier substrate includes agar.

In embodiments, the carrier substrate includes a hydrogel. In embodiments, the carrier substrate includes glycerol. In embodiments, the hydrogel carrier substrate includes agarose, alginate, gelatin, cellulose, polyolefin, polyethylene glycol, polyvinyl alcohol, and/or acrylate polymers and copolymers. In embodiments, the hydrogel carrier substrate includes agarose, amylose, or amylopectin. In embodiments, the hydrogel carrier substrate includes acrylamide, methacrylate and methacrylamide polymers and copolymers thereof. Any suitable hydrogel may be used as a carrier substrate, for example a hydrogel including poly(2-hydroxyethyl methacrylate) (PHEMA), optionally crosslinked with polyethylene glycol dimethacrylate; 2-hydroxyethyl methacrylate (HEMA) optionally crosslinked with TEGDMA (tricthylene glycol dimethacrylate); polyethylene glycol methacrylate (PEGMA), optionally crosslinked with TEGDMA (triethylene glycol dimethacrylate); a copolymer of methacrylic acid (MAA) and polyethylene glycol methacrylate (PEGMA), optionally crosslinked with tetra(ethylene glycol) dimethacrylate; or poly(N-isopropyl acrylamide) (PNIPAM), optionally crosslinked with N,N-methylene bisacrylamide. Additional hydrogels include a polymer such as poly(hydroxyethyl methacrylate) (PHEMA), poly(glyceryl methacrylate) (PGMA), poly(hydroxypropyl methacrylate) (PHPMA), polyacrylamide (PAM), polymethacrylamide (PMAM), polyvinyl alcohol (PVA), polyacrylic acid (PAA), polyvinyl pyrrolidone (PVP), poly(ε-caprolactone) (PCL), poly(ethyleneiminc) (PEI), poly(N,N-dimethylacrylamide) (PDMAM), poly(2-methoxyethyl acrylate) (PMEA), or a copolymer thereof. Polymer chains in a hydrogel may be crosslinked with each other chemically via covalent bonds or physically via non-covalent interactions to produce the network structure. The physical cross-linking involves hydrogen bonding, hydrophobic interactions, crystallinity, and ionic interactions. In chemically cross-linked hydrogels, covalent bonds cross-link individual polymer chains. Any suitable crosslinker may be used, for example N,N-methylene bisacrylamide, N,N-ethylene bisacrylamide, 1,4-Bis(acryloyl)piperazine, tricthylene glycol dimethacrylate (TEGDMA), 1,1,1-trimethylolpropane trimethacrylate (TMPTMA), poly(ethylene glycol) dimethacrylate (PEGDMA), glyoxal, or tetramethylethylenediamincor N,N'-Bis(acryloyl)cystamine.

In embodiments, the carrier substrate and/or the receiving substrate (e.g., glass slide) is sterile prior to immobilizing the tissue section onto the carrier substrate. In embodiments, the hydrogel carrier substrate is sterile prior to immobilizing the tissue section onto the carrier substrate. In embodiments, the carrier substrate is sterilized prior to contact with the tissue section. In embodiments, the receiving substrate is sterilized prior to contact with the tissue section. In embodiments, the hydrogel carrier substrate is sterilized prior to contact with the tissue section Methods of sterilization include, but are not limited to, steam autoclaving (e.g., sterilization in an autoclave under a standard condition at 121° C. for 30 min), ethanol sterilization, and gamma irradiation, as described further in Han X. Biointerphases. 2017; 12(2): 02C411 and Galante R et al., J. Biomed. Mater. Res. B Appl. Biomater. 2018; 106(6): 2472-2492, each of which is incorporated herein by reference.

In embodiments, the carrier substrate is a semi-solid foam. In embodiments, the carrier substrate includes a polythioketal-based polyurethane (PTK-UR) foam scaffold. In embodiments, the carrier substrate includes hydroxypropyl methylcellulose (HPMC) and polyvinylpyrrolidone (PVP). In embodiments, the carrier substrate includes dry ice (i.e., solid carbon dioxide). In embodiments, the carrier substrate includes ice (i.e., frozen water).

In embodiments, the hydrogel carrier substrate includes an agarose gel. Agarose gels can be made at different weight percentages by varying the amount of purified agarose in solution prior to gelation, which alters the microstructure and subsequent bulk mechanical behavior significantly. Agarose gels are typically categorized by their weight percentages, meaning that a 1% agarose gel is defined by 1 g of agarose powder (agar) per 100 mL of buffer solution. The type of buffer solution used to make agarose is generally a TBE buffer, which is a tris base, boric acid, and EDTA (ethylene diamine tetraacetic acid) mixture produced at various concentrations in water. In embodiments, the hydrogel carrier substrate includes less than about 5% agarose. In embodiments, the hydrogel carrier substrate includes less than about 4% agarose. In embodiments, the hydrogel carrier substrate includes less than about 3% agarose. In embodiments, the hydrogel carrier substrate includes less than about 2% agarose. In embodiments, the hydrogel carrier substrate includes more than about 5% agarose. In embodiments, the hydrogel carrier substrate includes about 5% agarose. In embodiments, the hydrogel carrier substrate includes about 4% agarose. In embodiments, the hydrogel carrier substrate includes about 3% agarose. In embodiments, the hydrogel carrier substrate includes about 2% agarose. In embodiments, the hydrogel carrier substrate includes about 5% agarose.

In embodiments, the hydrogel carrier substrate is contacted with glycerol (e.g., a 50-80% solution of glycerol. Without wishing to be bound by any theory, it is hypothesized that saturating hydrogel carrier substrate with glycerol reduced damage to frozen tissue samples, possibly by changing the surface tension or hydrophobicity. In embodiments, the hydrogel carrier substrate is stored in a glycerol solution prior to use.

In embodiments, the hydrogel carrier substrate further includes a support scaffold (e.g., the hydrogel carrier substrate forms part of a multi-layer substrate). In embodiments, the support scaffold forms a rigid backing for the hydrogel carrier substrate. In embodiments, the support scaffold includes a thermoplastic elastomer. In embodiments, the support scaffold includes a polyester. In embodiments, the support scaffold includes polyethylene terephthalate. In embodiments, the support scaffold includes biaxially-oriented polyethylene terephthalate. In embodiments, the support scaffold is non-porous. In embodiments, the support scaffold is solid.

In embodiments, the support scaffold includes a thermo-responsive polymer, chemically-responsive polymer, light-responsive polymer, or pH-responsive polymer. In embodiments, the support scaffold includes a thermo-responsive polymer. In embodiments, the support scaffold includes a chemically-responsive polymer. In embodiments, the support scaffold includes a light-responsive polymer. In embodiments, the support scaffold includes a pH-responsive polymer.

In embodiments, the hydrogel is a crosslinked hydrogel (e.g., contacting the polymers of a hydrogel with a crosslinking agent that covalently bonds one or more of the polymer chains together). Crosslinking between polymer chains affects their physical properties, such as the elasticity, viscosity, solubility, glass transition temperature (Tg), strength, toughness, and melting point, of the hydrogel. The crosslinked polymers have a higher Tg due to limited rotational motion between the polymer chains. Cross-linking increases the molecular weight of the polymer chains as well as restricts the translational movement; hence the solubility of the polymer decreases.

In embodiments, the hydrogel carrier substrate does not include a resin adhesive. In embodiments, the hydrogel carrier substrate does not include a resin adhesive on the surface that contacts the tissue section. Non-limiting examples of resin adhesives include glue (e.g., Elmer's glue), polyurethanes, cyanoacrylate, and epoxies. In embodiments, the hydrogel carrier substrate does not include a cyanoacrylate (e.g., methoxyisopropylcyanoacrylate, octylcyanoacrylate, or methoxyisopropylcyanoacrylate). In embodiments, the hydrogel carrier substrate does not include protein and/or lipids. Foreign proteins and lipids may negatively impact the detection biomolecules within the sample. In embodiments, the hydrogel carrier substrate does not deposit a detectable remnant following immobilization on the receiving substrate.

When considering a carrier substrate as a two-dimensional body, i.e., neglecting its thickness, the mechanical properties in the absence of anisotropies can be characterized by one or more elastic constants according to continuum elasticity theory. One such elastic constant is the Young's modulus (alternatively referred to as an elastic modulus). In principle, the Young's modulus of a carrier substrate can be measured by finding a relationship between a force applied to the carrier substrate and the resultant deformation. On a macroscale, the Young's modulus is usually obtained by measuring the stress-strain curves of a substrate specimen through the compression method or the tensile method and then finding the slope of the curve.

In embodiments, the carrier substrate includes a Young's modulus of about 5 kPa to about 30 kPa. In embodiments, the carrier substrate includes a Young's modulus of about 5 kPa to about 20 kPa. In embodiments, the carrier substrate includes a Young's modulus of about 5 kPa to about 15 kPa. In embodiments, the carrier substrate includes a Young's modulus of about 5 kPa, about 10 kPa, about 15 kPa, about 20 kPa, about 25 kPa, or about 30 kPa. In embodiments, the carrier substrate includes a Young's modulus of about 5 kPa. In embodiments, the carrier substrate includes a Young's modulus of about 10 kPa. In embodiments, the carrier substrate includes a Young's modulus of about 15 kPa. In embodiments, the carrier substrate includes a Young's modulus of about 20 kPa. In embodiments, the carrier substrate includes a Young's modulus of about 25 kPa. In embodiments, the carrier substrate includes a Young's modulus of about 30 kPa. In embodiments, the Young's modulus is quantified according to known techniques in the art (e.g., the indentation test). For example, the indentation test employs the use of an indenter which comes in to contact with and applies a perpendicular force on a small area of the carrier substrate. Alternatively, the Young's Modulus of thin elastic membranes of materials can be determined using Diaphragm tests, where the membrane is clamped at two ends and inflated in the form of a dome while the pressure of suction is controlled by a pressure controller.

In embodiments, the compression modulus is about 38+/−2 kPa (e.g., 1% agarose), about 254+/−20 kPa (e.g., 2% agarose), about 929+/−48 kPa (e.g., 5% agarose), or about 2580+/−225 kPa (e.g., 10% agarose). In embodiments, the compression modulus is 10 kPa. In embodiments, the carrier substrate includes about 2% w/v agarose. In embodiments, the compression modulus is 15 kPa, 45 kPa, or 85 kPa. In embodiments, the carrier substrate includes about 2%, 4%, or 6% w/v agarose. In embodiments, the compression modulus is 120 kPa. In embodiments, the carrier substrate includes about 5% w/v agarose. In embodiments, the compression modulus is 250 kPa or 930 kPa. In embodiments, the carrier substrate includes about 2.5% or 5% w/v agarose. In embodiments, the compression modulus is 20 kPa or 60 kPa. In embodiments, the carrier substrate includes about 2% or 4% w/v agarose. In embodiments, the compression modulus is 10 kPa. In embodiments, the carrier substrate includes about 2% w/v agarose.

In an aspect is provided a carrier device including: a base including a planar body that defines a cavity (e.g., forming a mold); a handle connected to the base and vertically spaced apart from the base; and a bridge that connects the handle to the base. In embodiments, the base forms an aperture and wherein the mold frame can be seated into the aperture. In embodiments, the base has at least one clip that removably secures the mold frame to the base In embodiments, an aperture extends through the bridge and forms an open port that communicates with the cavity. In embodiments, the aperture forms an upwardly open port that communicates with the cavity when the carrier is positioned in a vertical orientation. The port may be useful during curing of the polymer slab and/or for removing excess water during tissue capture.

In embodiments, the base lies within a first plane. In embodiments, the first plane is substantially vertical when the carrier is positioned in the vertical orientation. See, for example, FIG. 7.

In embodiments, the carrier device further includes a lid. In embodiments, the lid removably couples to the base to at least partially enclose the cavity. In embodiments, when the lid is connected to the base, a mold is formed in combination with the cavity suitable for forming a hydrogel support within the cavity. In embodiments, the lid partially encloses the cavity. In embodiments, the lid partially encloses the cavity such that the port forms the only ingress or egress for the cavity. In embodiments, the lid has an upper surface that complements a lower surface of the base. In embodiments, the upper surface of the lid is flat. Exemplary materials from which the lid may be made include, but are not limited to, glass, polymer (e.g., polyetherimide (PEI), polycarbonate, or polyetheretherketone (PEEK), ceramic, beryllium copper, spring steel, chrome vanadium, chrome silicon, phosphor bronze, stainless steel, aluminum, titanium, tungsten, metal alloys, metal composites, plastic, or any suitable rigid or semi-rigid material. In embodiments, the lid is made from aluminum. In embodiments, the lid is made from plastic. In embodiments, the lid is made from glass.

In embodiments, the carrier is stackable atop a second carrier when the lid is coupled to the carrier. See, for example, FIG. 12. In embodiments, a plurality of devices may be stacked atop each other.

In embodiments, the base has a perimeter wall that surrounds a periphery of the cavity. In embodiments, the base lies within a first plane and the handle lies within a second plane offset from the first plane. In embodiments, the carrier includes a substrate removably located on a bottom region of the mold frame wherein the substrate forms a surface that aids in removal of a hydrogel section from the cavity. In embodiments, the substrate includes a polyester (PE) film, polypropylene (PP) film, polyvinyl chloride (PVC) film, or a low-density polyethylene (LDPE) film.

In another aspect is provided a polymeric gel, such as a hydrogel, cast including a hydrogel and a frame including a handle, wherein the frame is configured to retain the polymeric gel. See, for example, casts illustrated in FIG. 8 and FIG. 9. In embodiments, the frame removably couples to a mold frame configured to retain the polymeric gel. See, for example, FIG. 14.

In embodiments, the frame further includes a pocket. In embodiments, the pocket is configured to retain the polymeric gel (for example a hydrogel). In embodiments, the tissue catch tray includes a rib on the frame, wherein the rib extends into the cavity. The rib may serve to retain the polymeric gel within the pocket cavity. Alternative retention mechanisms are contemplated herein, for example, compression tabs, posts, snap-fit retention clips, interlocking grooves, angled edges, or a frictional fit with a perimeter gasket. In embodiments, the rib extends into the cavity from a peripheral wall of the frame, and wherein the rib extends around an inner perimeter of the cavity. See, for example, the rib 2020 in FIG. 20. In embodiments, the rib extends around an entire inner perimeter of the cavity. In embodiments, the rib extends around 50% of the inner perimeter of the cavity. In embodiments, the rib extends around only a portion of the inner perimeter of the cavity. In embodiments, the frame encloses a side of the cavity.

In embodiments, the handle is a raised handle. In embodiments, the frame is an injection molded frame. The frame can be further configured to provide a gap between a work surface and the hydrogel. The forming can include assembling individual components. The handle can be an ergonomic handle. In embodiments, the mold frame is an injection molded frame.

In embodiments, the frame includes a microchip. In embodiments, the microchip is an electronically erasable programmable read only memory (EEPROM) chip. For example, the EEPROM chip can be affixed in a pocket, other structure molded into the frame, or directly to the frame itself. In embodiments, the EEPROM chip can store identifying information (e.g., lot numbers, sample run, etc.). Optionally, the frame can include an EEPROM chip and a RFID tag. In embodiments, the frame can further include a proximal ferromagnetic pin and a distal ferromagnetic pin. In embodiments, the ferromagnetic pin includes iron, cobalt, or nickel, or oxides thereof. In embodiments, the ferromagnetic pin is an alloy containing a transition metal (e.g., Fe, Co, or Ni) and a metalloid (e.g., B, C, Si, P or Al). In embodiments, the frame can further include a proximal magnetic pin and a distal magnetic pin. In embodiments, the frame can further include a proximal steel pin and a distal steel pin. In some embodiments, the proximal steel pin and the distal steel pin further comprise a nickel coating or nickel alloy coating. The pins can be located at opposite ends of the pocket. For example, the pin is located at or near the handle while the pin is located at an opposite end of the pocket. The positions, size, shape and material of the pins can vary.

Tissue sections, e.g., tumor tissue samples, may be obtained surgically or using a laparoscope. A tissue section may be a tissue sample obtained from any part of the body to examine it for disease or injury, e.g., presence of cancer tissue or cells, or the extent or characteristics thereof. In embodiments, the tissue section includes abdominal tissue, bone, bone marrow, breast tissue, endometrial tissue, kidney tissue, liver tissue, lung or chest tissue, lymph node, nerve tissue, skin, testicular tissue, head or neck tissue, or thyroid tissue. In certain embodiments, the tissue is obtained from brain, breast, skin, bone, joint, skeletal muscle, smooth muscle, red bone marrow, thymus, lymphatic vessel, thoracic duct, spleen, lymph node, nasal cavity, pharynx, larynx, trachea, bronchus, lung, oral cavity, esophagus, liver, stomach, small intestine, large intestine, rectum, anus, spinal cord, nerve, pineal gland, pituitary gland, thyroid gland, thymus, adrenal gland, pancreas, ovary, testis, heart, blood vessel, kidney, uterus, urinary bladder, urethra, prostate gland, penis, prostate, testis, scrotum, ductus deferens, mammary glands, ovary, uterus, vagina, or uterine tube.

In an aspect is provided a carrier, including a base including a planar body that defines an aperture; a handle connected to the base and offset (e.g., vertically spaced apart) from the base; a bridge that connects the handle to the base; and a mold frame removably seated on the base, wherein the mold frame defines a cavity that forms a mold for forming a polymeric gel (e.g., hydrogel) cast. In embodiments, the base forms an aperture and wherein the mold frame can be seated into the aperture. In embodiments, the aperture is surrounded by a peripheral wall. In embodiments, the mold frame has a peripheral wall that defines the cavity.

In embodiments, the cavity complements a shape of the aperture. In embodiments, the carrier further includes a cover that is removably positionable atop the mold frame to cover the cavity of the mold frame. In embodiments, the base has a retention mechanism, such as a clip or latch that removably secures the mold frame to the base. In embodiments, the base lies within a first plane and wherein the first plane is substantially vertical when the carrier is positioned in the vertical orientation. In embodiments, the base lies within a first plane and the handle lies within a second plane offset from the first plane.

In another aspect is provided a tissue catch tray assembly. In embodiments, the tissue catch tray assembly includes a tissue catch tray. In embodiments, the tissue catch tray is a carrier as described herein. In embodiments, the tissue catch tray is formed of a frame that forms a periphery of a cavity having an upper end and a lower end, wherein the frame forms a peripheral trough that surrounds the cavity, and wherein the cavity is configured to contain a polymeric gel. In embodiments, the tissue catch tray includes a rib on the frame, wherein the rib extends into the cavity. The rib may serve to retain the polymeric gel within the pocket cavity. Alternative retention mechanisms are contemplated herein, for example, compression tabs, posts, snap-fit retention clips, interlocking grooves, angled edges, or a frictional fit with a perimeter gasket. In embodiments, the rib extends into the cavity from a peripheral wall of the frame, and wherein the rib extends around an inner perimeter of the cavity. See, for example, the rib 2020 in FIG. 20. In embodiments, the rib extends around an entire inner perimeter of the cavity. In embodiments, the rib extends around 50% of the inner perimeter of the cavity. In embodiments, the rib extends around only a portion of the inner perimeter of the cavity. In embodiments, the frame encloses a side of the cavity.

In embodiments, the tissue catch tray includes a handle extending outwardly from the tissue catch tray. In embodiments, the handle is offset from the base. In embodiments, the handle lies within the same plane as the tissue catch tray base. In embodiments, the handle includes a planar structure that extends outwardly from a side of the tissue catch tray. In embodiments, the handle includes a tab that extends outwardly from a side of the tissue catch tray.

In embodiments, the tissue catch tray includes a planar substrate removably positionable on a top of the frame such that the substrate encloses a top end of the cavity. In embodiments, the tissue catch tray includes a cover film removably positionable on a bottom of the frame such that the cover film encloses a lower end of the cavity. In embodiments, the substrate is a sticker with an adhesive. In embodiments, the substrate is a polyester (PE) film, polypropylene (PP) film, polyvinyl chloride (PVC) film, or a low-density polyethylene (LDPE) film. In embodiments, the substrate may be referred to as a backing material and may include Mylar® or other peelable, flexible films, such as polypropylene (PP) films, polyvinyl chloride (PVC) films, or low-density polyethylene (LDPE) films. Such materials may provide temporary adhesion and can be easily peeled away without leaving residue. Alternative materials may include silicone-coated release liners, wax-coated papers, or other peelable polyester films, which function similarly as removable backing layers.

In embodiments, the frame forms an outer peripheral wall that surrounds the cavity and an inner peripheral wall that surrounds the cavity, and wherein the peripheral trough is positioned between the outer peripheral wall and the inner peripheral wall.

In embodiments, the tissue catch tray has a length and a width, wherein the length is greater than the width. For example, measured edge-to-edge, the tissue catch tray includes a length of 80 mm, 85 mm, 90 mm, or 100 mm and a width of 30 mm, 35 mm, 40 mm, 45 mm, or 50 mm. In embodiments, the tissue catch tray includes a length of about 85 mm and a width of about 40 mm. In embodiments, the tissue catch tray is rectangular when viewed from a top. Alternative shapes are contemplated herein, for example, circular, oval, hexagonal, triangular, elliptical, or irregular polygonal shapes when viewed from a top.

In embodiments, the tissue catch tray includes a lid that removably attachable to a top end of the frame such that the substrate is interposed between the lid and the cavity. In embodiments, the lid has an outer peripheral wall that defines a groove sized and shaped to removably receive an upwardly extending tongue of the frame. In embodiments, the cavity forms a mold for forming a polymeric gel cast. In embodiments, the cavity forms a mold for forming a hydrogel cast.

In an aspect is provided a kit including the device (e.g., the carrier, the cast, the tissue catch tray assembly) as described herein. For example, the carrier includes a base including a planar body that defines an aperture, a handle connected to the base, and a bridge that connects the handle to the base. In embodiments, the mold frame is removably seated on the base, wherein the mold frame defines a cavity that forms a mold for forming a hydrogel cast. In embodiments, the carrier includes a base including a planar body including a polymeric gel. In embodiments, the polymeric gel includes agarose. In embodiments, the polymeric gel includes a tissue section.

In embodiments, the kit is stored for 1 to 90 days. In embodiments, the kit is stored for greater than 90 days. In embodiments, the kit is stored for 1 to 30 days. In embodiments, the kit is stored for 1, 5, 7, 14, 21, 30, 45, 60, 75, 90, or more days. In embodiments, the kit is stored at less than about 25° C. In embodiments, the kit is stored at less than about 5° C. In embodiments, the kit is stored at about 4° C. In embodiments, the kit is stored in the dark (e.g., in the absence of light, such as visible light or UV light). In embodiments, the kit is stored at 2-8° C. In embodiments, the kit is stored for at least 1 day, at least 2 days, at least 3 days, or at least 7 days. In embodiments, the kit is stored for about 1 week, about 2 weeks, about 3 weeks, about 4 weeks, about 5 weeks, about 6 weeks, about 7 weeks, or about 8 weeks. In embodiments, the kit is stored for about 1 month, about 2 months, about 3 months, about 4 months, about 5 months, about 6 months, about 7 months, about 8 months, about 9 months, about 10 months, about 11 months, or about 12 months. In embodiments, the kit is stored at about 2° C.-8° C., about 20° C.-30° C., or about 4° C.-37° C. In embodiments, the kit is stored at about −5° C. to −30° C. and protected from light. In embodiments, the kit is stored at about 2° C.-8° C. and protected from light. In embodiments, the kit is stored at about 20° C.-30° C. and protected from light. In embodiments, the kit is stored at or about 4° C.-37° C. and protected from light.

In embodiments, the kit can further include one or more biological stain(s) (e.g., any of the biological stains as described herein). For example, the kit can further include eosin and hematoxylin. In other examples, the kit can include a biological stain such as acridine orange, Bismarck brown, carmine, coomassie blue, crystal violet, DAPI, eosin, ethidium bromide, acid fuchsine, hematoxylin, Hoechst stains, iodine, methyl green, methylene blue, neutral red, Nile blue, Nile red, osmium tetroxide, propidium iodide, rhodamine, safranin, or any combination thereof. In embodiments, the kit is designed for staining tissue samples for imaging and detecting target molecules (e.g., proteins) can be significantly expanded beyond the inclusion of fluorophores. For instance, the kit can include eosin and hematoxylin, which are classic histological stains. Eosin, a red dye, typically stains acidic components of the cell such as cytoplasmic proteins, while hematoxylin, a basic dye, binds to nucleic acids, coloring the cell nucleus blue. This combination is widely used in histopathology for detailed tissue structure visualization. Moreover, the kit can encompass stains such as acridine orange, a nucleic acid-selective fluorescent cationic dye, and Bismarck brown, which is often used for staining backgrounds in histological tissue sections. Carmine, another potential inclusion, is a natural red dye used for staining glycogen, while Coomassie blue is a popular choice for protein staining in gel electrophoresis. Crystal violet, a triarylmethane dye, can be included for staining cell walls and nuclei, and DAPI, a fluorescent stain that binds strongly to A-T rich regions in DNA, is useful in fluorescence microscopy. Ethidium bromide, a fluorescent intercalator, is also a valuable addition for its role in nucleic acid staining, especially in gel electrophoresis. Further, the kit can include acid fuchsine, used in Masson's trichrome stain; Hoechst stains, which are cell-permeable, DNA-specific blue fluorescent dyes; and iodine, commonly used in Gram staining and for staining starch in plant cells. Methyl green and methylene blue, both traditional histological stains, can be included for their affinity towards nucleic acids. Neutral red, a vital stain that accumulates in lysosomes, Nile blue and Nile red, both used for staining lipids, and osmium tetroxide, a heavy metal stain for lipid bilayers in electron microscopy, can be part of the kit. Propidium iodide, a popular red-fluorescent nuclear and chromosome counterstain, along with rhodamine, may be utilized. Safranin, commonly used in Gram staining, can be included for its ability to stain cell components like nuclei, cytoplasm, and cell walls in various colors, enhancing the contrast and detail in tissue imaging.

In embodiments, the kit includes a microplate or solid support as described herein. In embodiments, the kit includes a flow cell as described herein.

In an aspect is provided a device configured to detect multiple targets as described herein. In embodiments, the device includes a microscope. Examples of suitable microscopes include, but are not limited to, the Zeiss Axioscope 5 multichannel microscope (Carl Zeiss Microscopy, LLC, White Plains, N), the Olympus BX63 automated microscope (Olympus Scientific Solutions Americas Corp., Waltham, MA), and the Nikon Eclipse Ti2 microscope (Nikon Instruments, Inc., Melville, NY). In embodiments, the device includes one or more light sources, one or more objective lenses, one or more sample carriers (e.g., sample holders, sample stages, and/or translation stages), one or more tube lenses, one or more image sensors or cameras, one or more processors or controllers, one or more additional optical components (e.g., lenses, mirrors, prisms, beam-splitters, optical filters, colored glass filters, narrowband interference filters, broadband interference filters, dichroic reflectors, diffraction gratings, apertures, shutters, optical fibers, optical waveguides, and/or acousto-optic modulators), or any combination thereof. In embodiments, the device includes a focus mechanism, e.g., an autofocus mechanism. In embodiments, the device is be configured to perform multichannel imaging, e.g., multichannel fluorescence imaging including the use of excitation light at one or more excitation wavelengths, and imaging the emitted fluorescence at two or more different emission wavelengths.

In embodiments, the device includes one or more image sensors (or cameras) that may be the same or may be different, and may include any of a variety of image sensors including but not limited to, photodiode arrays, charge-coupled device (CCD) sensors or cameras, or complementary metal-oxide-semiconductor (CMOS) image sensors or cameras. In embodiments, the one or more image sensors may comprise one-dimensional (linear) or two-dimensional pixel array sensors. In embodiments, the one or more image sensors may comprise monochrome image sensors (e.g., configured to capture greyscale images) or color image sensors (e.g., configured to capture RGB or color images). In embodiments, the one or more image sensors may be used to capture single images, e.g., a single image for each cycle of a plurality of cycles. In embodiments, the one or more image sensors may be used to capture a series of images, e.g., a series of images during each cycle of a plurality of cycles. In embodiments, a series of images may include images (or video frames) that correspond to images captured before, during, and/or after an event, e.g., before, during, and/or after addition of a probe to the sample being imaged. In embodiments, a series of images includes 2 images, 3 images, 4 images, 5 images, 10 images, 20 images, 30 images, 40 images, 50 images, 100 images, 200 images, 300 images, 400 images, 500 images, 1,000 images, or more than 1,000 images.

In embodiments, the device is configured to perform volumetric imaging (or optical sectioning). In embodiments, the imaging includes the acquisition of a plurality (or "stack") of two-dimensional (2D) images to form a three-dimensional (3D) representation of the sample, where each two-dimensional image is aligned with the other images of the plurality in the sample plane (e.g., the X-Y plane), but is offset from the other two-dimensional images in a direction parallel to the optical axis of the imaging module (e.g., in the Z-direction). In embodiments, the stack of images may be acquired sequentially. In embodiments, the stack of images may be acquired simultaneously.

In embodiments, the device is configured to control the delivery of fluids such as reagents and/or buffers to a sample, e.g., a sample contained within the flow cell. In embodiments, the one or more fluidics controllers may be configured to control volumetric flow rates for one or more fluids or reagents, linear flow velocities for one or more fluids or reagents, mixing ratios for one or more fluids or reagents, or any combination thereof. Fluidics modules may include one or more fluid flow sensors (e.g., flow rate sensors, pressure sensors, etc.), one or more fluid flow actuators (e.g., pumps), one or more fluid flow control devices (e.g., valves), one or more processors (and associated electronics), tubing and connectors to connect the one or more fluidics modules to one or more flow cells, or any combination thereof.

III. Methods

In an aspect is provided a method of immobilizing a biological sample (e.g., tissue section or a plurality of cells) to a receiving substrate. In embodiments, the biological sample is a tissue section. In embodiments, the method includes contacting a tissue section with a carrier substrate, thereby immobilizing the tissue section to the carrier substrate. In embodiments, the method further includes contacting the carrier substrate with a receiving substrate. In embodiments, the method includes imaging the immobilized tissue section.

In embodiments, the method includes a) immobilizing the tissue section onto a carrier substrate to generate a sample-carrier construct, wherein the carrier substrate includes a first adhesion strength; b) contacting the tissue section of the sample-carrier construct with a receiving substrate to generate an immobilized tissue section, wherein the receiving substrate includes a second adhesion strength, wherein the second adhesion strength is greater than the first adhesion strength; c) removing the carrier substrate from the immobilized tissue section; d) optionally permeabilizing the immobilized tissue section; and e) contacting the biomolecule in the tissue section with a detection agent thereby detecting the biomolecule in the tissue section. In embodiments, the detection agent includes a fluorophore. In embodiments, the second adhesion strength is greater than the first adhesion strength to enable differential release of the carrier substrate from the immobilized tissue section. In embodiments, step c) occurs prior to step e). In embodiments, step c) occurs prior to step d). In embodiments, the adhesion strength between the tissue section and the receiving substrate (e.g., the second adhesion strength) is greater than the adhesion strength between the carrier substrate and the tissue section (e.g., the first adhesion strength), such that the transfer of the tissue section occurs following contact between the tissue section and the receiving substrate. For example, removal of the carrier substrate from the immobilized tissue section does not remove the immobilized tissue section from the receiving substrate, as the second adhesion strength is greater than the first adhesion strength.

In embodiments, the adhesion strength (e.g., the first adhesion strength and/or the second adhesion strength) may be measured as a shear strength or a tensile strength. For example, shear strength is the strength of a material against the type of yield when the material fails under a shear load. A shear load is a force that tends to produce a sliding failure on a material along a plane that is parallel to the direction of the force. In embodiments, the shear strength is less than about 0.1 kPa to 2 MPa. In embodiments, the shear strength is less than 2 MPa, less than 1 MPa, less than 500 kPa, less than 200 kPa, less than 100 kPa, less than 10 kPa, less than 1 kPa, or less than 0.1 kPa.

In embodiments, the method includes contacting a vessel including a tissue section with a device described herein (e.g., a polymer gel cast, carrier, or tissue catch tray) wherein the vessel includes water and wherein the tissue section is at or on the surface of the water; and removing the device from the vessel, wherein the tissue section is immobilized to the polymer gel.

In embodiments, the method includes contacting a vessel including a tissue section with a tissue catch tray, wherein the vessel includes water and wherein the tissue section is at or on the surface of the water and removing the tissue catch tray from the vessel using the handle, wherein the tissue section is immobilized to the tissue catch tray. In embodiments, the tissue catch tray includes a frame including a three-dimensional polymer slab. In embodiments, the tissue catch tray includes a handle extending outwardly from the tissue catch tray.

In an aspect is provided a method of detecting a biomolecule in a tissue section, the method including: a) immobilizing the tissue section onto a hydrogel carrier substrate to generate a sample-carrier construct; b) contacting the tissue section of the sample-carrier construct with a receiving substrate to generate an immobilized tissue section; c) removing the hydrogel carrier substrate from the immobilized tissue section; d) optionally permeabilizing the immobilized tissue section; and e) contacting the biomolecule in the tissue section with a detection agent thereby detecting the biomolecule in a tissue section. In embodiments, permeabilizing the immobilized tissue section allows access to the biomolecule within the immobilized tissue section. In embodiments, permeabilizing includes contacting the immobilized tissue section with a detergent. In embodiments, permeabilizing includes modulating the temperature (e.g., freezing or heating) of the immobilized tissue section. In embodiments, the detection agent includes a fluorophore. In embodiments, step c) occurs prior to step e). In embodiments, step c) occurs prior to step d).

In embodiments, the carrier substrate includes interfacial water, wherein the interfacial water is on the surface, such that the interfacial water is between the carrier substrate and the tissue section when forming a sample-carrier construct.

In embodiments, the method further includes permeabilizing the tissue section of the sample-carrier construct prior to binding the immobilized specific binding agent to the biomolecule. Methods for permeabilization are known in the art, as exemplified by Cremer et al., The Nucleus: Volume 1: Nuclei and Subnuclear Components, R. Hancock (ed.) 2008; and Larsson et al., Nat. Methods (2010) 7:395-397, the content of each of which is incorporated herein by reference in its entirety. In embodiments, the tissue section is cleared (e.g., digested) of proteins, lipids, or proteins and lipids. In embodiments, permeabilizing the tissue section does not release the biomolecules (e.g., the one or more biomolecules) from within the tissue section. For example, after a fixation process (e.g. formaldehyde cross-linking), proteins and nucleic acids are immobilized within the cells of a tissue section, and are therefore not liberated into the environment following permeabilization of the cells.

Imaging deep into a tissue volume is problematic due to inherently fluorescent molecules present in the tissue or introduced during processing which give rise to autofluorescence that masks fluorescently labelled structures of interest. Typically, autofluorescence decreases image quality by lowering the signal to noise ratio across multiple fluorescence channels and undermines sharp images. Autofluorescence may arise from endogenous fluorescent biomolecules (NADPH, collagen, flavins, tyrosine, and others) or be introduced by the formation of Schiff's bases during fixation with aldehydes (e.g., glutaraldehyde and paraformaldehyde). Additional light scattering is provided by various cellular components, such as ribosomes, nuclei, nucleoli, mitochondria, lipid droplets, membranes, myelin, cytoskeletal components, and extracellular matrix components such as collagen and elastin.

In embodiments, the tissue is cleared using a solvent-based clearing approach. Solvent-based clearing techniques typically includes two steps: 1) dehydration (e.g., contacting the sample with methanol with or without hexane or, tetrahydrofurane (THF) alone) and 2) clearing by refractive index matching to the remaining dehydrated tissue's index (e.g., contacting the tissue sample with methylsalicilate, benzyl alcohol, benzyl benzoate, dichloromethane, or dibenzyl ether). Alternatively, the initial dehydration may be performed using phosphate buffered saline (PBS), detergent, and dimethyl sulfoxide (DMSO). In embodiments, the tissue is cleared by contacting the tissue sample with an aqueous solution containing sucrose, fructose, 2,2'-thiodiethanol (TDE), or formamide.

In embodiments, the tissue is cleared utilizing the 3D imaging of solvent-cleared organs (3DISCO) method as described in Ertürk A et al. Nat Protoc. 2012 November;7(11):1983-95, which is incorporated herein by reference. For example, a sample is incubated overnight in 50% v/v tetrahydrofuran/$H_2O$ (THF), followed by incubation for at least one hour 80% THF/$H_2O$ and followed by incubation in a 100% THE solution. This is then followed by contacting the sample with dichloromethane (DCM) and an incubation in dibenzyl ether (DBE) until clear.

In embodiments, the tissue is cleared according to a known technique in the art, for example CLARITY (Chung K., et al. Nature 497, 332-337 (2013)), PACT-PARS (Yang B et al. Cell 158, 945-958 (2014).), CUBIC (Susaki E. A. et al. Cell 157, 726-739 (2014)., 18), ScaleS (Hama H., et al. Nat. Neurosci. 18, 1518-1529 (2015)), OPTIClear (Lai H. M., et al. Nat. Commun. 9, 1066 (2018)), $C_e3D$ (Li W., et al. Proc. Natl. Acad. Sci. U.S.A. 114, E7321-E7330 (2017)), BABB (Dodt H. U. et al. Nat. Methods 4, 331-336 (2007)), iDISCO (Renier N., et al. Cell 159, 896-910 (2014)), uDISCO (Pan C., et al. Nat. Methods 13, 859-867 (2016)), FluoClearBABB (Schwarz M. K., et al. PLOS ONE 10, e0124650 (2015)), Ethanol-ECi (Klingberg A., et al. J. Am. Soc. Nephrol. 28, 452-459 (2017)), and PEGASOS (Jing D. et al. Cell Res. 28, 803-818 (2018)).

In embodiments, the tissue section is contacted with an alkaline solution containing a combination of 2,2'-thiodicthanol (TDE), DMSO, D-sorbitol, and Tris. In embodiments, the tissue section is contacted with an aqueous solution including 20% (vol/vol) DMSO, 40% (vol/vol) TDE, 20% (wt/vol) sorbitol, and 6% (wt/vol, equal to 0.5 M) Tris base. In embodiments, the tissue section is contacted with an aqueous solution including 25% (wt/wt) urea, 25% (wt/wt) N,N,N',N'-Tetrakis (2-hydroxypropyl) ethylenediamine, and 15% (wt/wt) Triton X-100. In embodiments, the tissue section is contact with an aqueous solution including 9.1 M urea, 22.5% (wt/vol) D-sorbitol, and 5% (wt/vol) Triton X-100. In embodiments, the tissue section is contact with an aqueous solution including 30% (wt/vol) urea, 20% (wt/vol) D-sorbitol, and 5% (wt/vol) glycerol dissolved in DMSO. In embodiments, the tissue section is contact with an aqueous solution according to the protocols described in Shan, QH., Qin, XY., Zhou, N. et al. BMC Biol 20, 77 (2022).

In embodiments, the biological sample can be permeabilized using any of the methods described herein (e.g., using any of the detergents described herein, e.g., SDS and/or N-lauroylsareosine sodium salt solution) before or after enzymatic treatment (e.g., treatment with any of the enzymes described herein, e.g., trypin, proteases (e.g., pepsin and/or proteinase K)). In embodiments, the biological sample can be permeabilized by contacting the sample with a permeabilization solution. In some embodiments, the biological sample is permeabilized by exposing the sample to greater than about 1.0 w/v % (e.g., greater than about 2.0 w/v %, greater than about 3.0 w/v %, greater than about 4.0 w/v %, greater than about 5.0 w/v %, greater than about 6.0 w/v %, greater than about 7.0 w/v %, greater than about 8.0 w/v %, greater than about 9.0 w/v %, greater than about 10.0 w/v %, greater than about 11.0 w/v %, greater than about 12.0 w/v %, or greater than about 13.0 w/v %) sodium dodecyl sulfate (SDS) and/or N-lauroylsareosine or N-lauroylsareosine sodium salt. In some embodiments, the biological sample can be permeabilized by exposing the sample (e.g., for about 5 minutes to about 1 hour, about 5 minutes to about 40 minutes, about 5 minutes to about 30 minutes, about 5 minutes to about 20 minutes, or about 5 minutes to about 10 minutes) to about 1.0 w/v % to about 14.0 w/v % (e.g., about 2.0 w/v % to about 14.0 w/v %, about 2.0 w/v % to about 12.0 w/v %, about 2.0 w/v % to about 10.0 w/v %, about 4.0 w/v % to about 14.0 w/v %, about 4.0 w/v % to about 12.0 w/v %, about 4.0 w/v % to about 10.0 w/v %, about 6.0 w/v % to about 14.0 w/v %, about 6.0 w/v % to about 12.0 w/v %, about 6.0 w/v % to about 10.0 w/v %, about 8.0 w/v % to about 14.0 w/v %, about 8.0 w/v % to about 12.0 w/v %, about 8.0 w/v % to about 10.0 w/v %, about 10.0% w/v % to about 14.0 w/v %, about 10.0 w/v % to about 12.0 w/v %, or about 12.0 w/v % to about 14.0 w/v %) SDS and/or N-lauroylsareosine salt solution and/or proteinase K (e.g., at a temperature of about 4% to about 35° C., about 4° C. to about 25° C., about 4° C. to about 20° C., about 4° C. to about 10° C., about 10° C. to about 25° C., about 10° C. to about 20° C., about 10° C. to about 15° C., about 35° C. to about 50° C., about 35° C. to about 45° C., about 35° C. to about 40° C., about 40° C. to about 50° C., about 40° C. to about 45° C., or about 45° C. to about 50° C.).

In embodiments, the method further includes removing the carrier substrate from the immobilized tissue section prior to contacting the biomolecule in the tissue section with a detection agent. In embodiments, the method further includes removing the carrier substrate from the immobilized tissue section during contacting the biomolecule in the tissue section with a detection agent.

In embodiments, generating a sample-carrier construct includes forming a plurality of non-covalent bonds between the tissue section and the carrier substrate. In embodiments, the carrier substrate includes water molecules attached to the surface of the carrier substrate.

In embodiments, the method includes retrieving the tissue sample in a water bath. For example, as illustrated in FIG. 10A-10B, the tissue sample is placed in a warm water bath, wherein the water bath temperature is set to about 40-50° C. (e.g., 42° C.), and the tissue sample floats on the surface of the water (e.g., floating for several seconds or up to a few minutes to allow the section to spread open and remove any wrinkles). In embodiments, the method includes contacting the tissue sample with the carrier substrate and attaching (e.g., non-covalently attaching) the tissue sample to the carrier substrate. Methods for transferring tissue sections via a water bath are known in the art, see for example Qin et al. (Qin C, et al. The Cutting and Floating Method for Paraffin-embedded Tissue for Sectioning. J Vis Exp. 2018 Sep. 5;(139):58288.) which is incorporated herein by reference, and may include additional tools such as forceps and brushes to minimize wrinkles, air bubbles, or damage.

In embodiments, generating an immobilized tissue section includes forming a plurality of covalent bonds between the tissue section and the receiving substrate. In embodiments, the plurality of covalent bonds include amide and imide bonds. In embodiments, the plurality of covalent bonds include amide bonds. In embodiments, the plurality of covalent bonds includes imide bonds.

In embodiments, the receiving substrate includes (3-aminopropyl)triethoxysilane (APTES), (3-Aminopropyl)trimethoxysilane (APTMS), γ-Aminopropylsilatrane (APS), N-(6-aminohexyl)aminomethyltriethoxysilane (AHAMTES), polyethylenimine (PEI), 5,6-epoxyhexyltriethoxysilane, or triethoxysilylbutyraldehyde, or a combination thereof. In embodiments, the receiving substrate includes (3-aminopropyl)triethoxysilane (APTES). In embodiments, the receiving substrate includes (3-Aminopropyl)trimethoxysilane (APTMS). In embodiments, the receiving substrate includes γ-Aminopropylsilatrane (APS). In embodiments, the receiving substrate includes N-(6-aminohexyl)aminomethyltriethoxysilane (AHAMTES). In embodiments, the receiving substrate surface includes polyethylenimine (PEI). In embodiments, the receiving substrate includes 5,6-epoxyhexyltriethoxysilane. In embodiments, the receiving substrate includes triethoxysilylbutyraldehyde. In embodiments, the receiving substrate is a functionalized glass surface or a functionalized plastic surface. In embodiments, the functionalized glass surface is functionalized with APTES, APTMS, APS, or AHAMTES. In embodiments, the receiving substrate includes a plurality of amines (e.g., —$NH_2$ moieties).

In embodiments, the receiving substrate includes a plurality of immobilized specific binding agents (e.g., immobilized oligonucleotides as described herein or immobilized proteins capable of specifically hybridizing a target of interest). In embodiments, the biomolecule is a target nucleic acid sequence. In embodiments, the immobilized specific-binding agent includes an oligonucleotide complementary to the target nucleic acid sequence. In embodiments, the immobilized specific-binding agent includes a poly(T) sequence. In embodiments, the immobilized specific-binding agent includes a spatial barcode, unique molecule identifying sequence, cleavable site, an amplification primer binding sequence, or a combination thereof. In embodiments, the method further includes extending with a polymerase the target nucleic acid sequence bound to the immobilized specific binding agent. In embodiments, the method further includes digesting the tissue section by contacting the sample-carrier construct with an endopeptidase. In embodiments, the immobilized specific binding agents are attached to the solid support via a linker.

In embodiments, the thickness of the tissue section is about 1 µm to about 20 µm. In embodiments, the thickness of the tissue section is about 5 µm to about 12 µm. In embodiments, the thickness of the tissue section is about 8 µm to about 15 µm. In embodiments, the thickness of the tissue section is about 1 µm, about 2 µm, about 3 µm, about 4 µm, about 5 µm, about 6 µm, about 7 µm, about 8 µm, about 9 µm, about 10 µm, about 11 µm, about 12 µm, about 13 µm, about 14 µm, or about 15 µm. In embodiments, the thickness of the tissue section is about 1 µm. In embodiments, the thickness of the tissue section is about 2 µm. In embodiments, the thickness of the tissue section is about 3 µm. In embodiments, the thickness of the tissue section is about 4 µm. In embodiments, the thickness of the tissue section is about 5 µm. In embodiments, the thickness of the tissue section is about 6 µm. In embodiments, the thickness of the tissue section is about 7 µm. In embodiments, the thickness of the tissue section is about 8 µm. In embodiments, the thickness of the tissue section is about 9 µm. In embodiments, the thickness of the tissue section is about 10 µm. In embodiments, the thickness of the tissue section is about 11 µm. In embodiments, the thickness of the tissue section is about 12 µm. In embodiments, the thickness of the tissue section is about 13 µm. In embodiments, the thickness of the tissue section is about 14 µm. In embodiments, the thickness of the tissue section is about 15 µm.

In particular embodiments, a tissue section has a size greater than sections typically examined by traditional pathology thin section or immunohistochemical analysis, which are typically in the range of 4-10 microns thick. In certain embodiments, a tissue section is greater than 20 microns, greater than 50 microns, greater than 100 microns, greater than 200 microns, greater than 500 microns, greater than 1 mm, greater than 2 mm, greater than 5 mm, greater than 10 mm or greater than 20 mm in thickness and/or length. In particular embodiments, the tissue section has a length and/or a thickness between 20 microns and 20 mm, between 20 microns and 10 mm, or between 50 microns and 1 mm. In certain embodiments, a tissue section is a cubic sample with each side greater than 10 microns, greater than 20 microns, greater than 50 microns, greater than 100 microns, greater than 200 microns, greater than 500 microns, greater than 1 mm, greater than 2 mm, greater than 5 mm, greater than 10 mm, or greater than 2 mm in thickness and/or length. In some embodiments, a tissue section is thinner, e.g., from about 4-10 or 4-20 microns in thickness.

In embodiments, the tissue section includes a tissue or a cell (e.g. plurality of cells such as blood cells, T-cells or B-cells). In embodiments, the tissue section includes one or more cells. In embodiments, the tissue section forms part of a tissue in situ. In embodiments, the tissue section includes one or more prokaryotic cells. In embodiments, the tissue section includes one or more eukaryotic cells. In embodiments, the tissue section includes a bacterial cell (e.g., a bacterial cell or bacterial spore), a fungal cell (e.g., a fungal spore), a plant cell, or a mammalian cell. In embodiments, the tissue section includes a stem cell. In embodiments, the stem cell is an embryonic stem cell, a tissue-specific stem cell, a mesenchymal stem cell, or an induced pluripotent stem cell. In embodiments, the tissue section includes an endothelial cell, muscle cell, myocardial, smooth muscle cell, skeletal muscle cell, mesenchymal, epithelial cell; hematopoietic cell, such as lymphocytes, including T cell, e.g., (Th1 T cell, Th2 T cell, ThO T cell, cytotoxic T cell); B cell, pre-B cell; monocytes; dendritic cell; neutrophils; or a macrophage. In embodiments, the tissue section includes a stem cell, an immune cell, a cancer cell (e.g., a circulating tumor cell or cancer stem cell), a viral-host cell, or a cell that selectively binds to a desired target. In embodiments, the cell includes a T cell receptor gene sequence, a B cell receptor gene sequence, or an immunoglobulin gene sequence. In embodiments, the cell includes a Toll-like receptor (TLR) gene sequence. In embodiments, the cell includes a gene sequence corresponding to an immunoglobulin light chain polypeptide and a gene sequence corresponding to an immunoglobulin heavy chain polypeptide. In embodiments, the tissue section includes a genetically modified cell. In embodiments, the tissue section includes a circulating tumor cell or cancer stem cell.

In embodiments, the tissue section includes an adherent cell (e.g., epithelial cell, endothelial cell, or neural cell). Adherent cells are usually derived from tissues of organs and attach to a substrate (e.g., epithelial cells adhere to an extracellular matrix coated substrate via transmembrane adhesion protein complexes). Adherent cells typically require a substrate, e.g., tissue culture plastic, which may be coated with extracellular matrix (e.g., collagen and laminin) components to increase adhesion properties and provide other signals needed for growth and differentiation. In embodiments, the tissue section includes a neuronal cell, an endothelial cell, epithelial cell, germ cell, plasma cell, a muscle cell, peripheral blood mononuclear cell (PBMC), a myocardial cell, or a retina cell. In embodiments, the tissue section includes a suspension cell (e.g., a cell free-floating in the culture medium, such a lymphoblast or hepatocyte). In embodiments, the tissue section includes a glial cell (e.g., astrocyte, radial glia), pericyte, or stem cell (e.g., a neural stem cell). In embodiments, the tissue section includes a neuronal cell. In embodiments, the tissue section includes an endothelial cell. In embodiments, the tissue section includes an epithelial cell. In embodiments, the tissue section includes a germ cell. In embodiments, the tissue section includes a plasma cell. In embodiments, the tissue section includes a muscle cell. In embodiments, the tissue section includes a peripheral blood mononuclear cell (PBMC). In embodiments, the tissue section includes a myocardial cell. In embodiments, the tissue section includes a retina cell. In embodiments, the tissue section includes a lymphoblast. In embodiments, the tissue section includes a hepatocyte. In embodiments, the tissue section includes a glial cell. In embodiments, the tissue section includes an astrocyte. In embodiments, the tissue section includes a radial glia. In embodiments, the tissue section includes a pericyte. In embodiments, the tissue section includes a stem cell. In embodiments, the tissue section includes a neural stem cell.

In embodiments, the tissue section is embedded in an embedding material including paraffin wax, polyepoxide polymer, polyacrylic polymer, agar, gelatin, celloidin, cryogel, optimal cutting temperature (OCT) compositions, glycols, or a combination thereof. In embodiments, the tissue section is embedded in an embedding material including paraffin wax. In embodiments, the OCT composition includes about 10% polyvinyl alcohol and about 4% polyethylene glycol. In embodiments, the OCT composition includes sucrose (e.g., 30% sucrose). In embodiments, the OCT composition is Tissue Freezing Medium (TFM) available from Leica Microsystems, Catalog #14020108926.

In embodiments, the tissue section includes a protein. In embodiments, the method includes contacting the protein with a detection agent (e.g., a labeled antibody or an antibody-oligo conjugate). In embodiments, the method includes detecting the oligonucleotide of the antibody-oligo conjugate. In embodiments, the tissue section includes a nucleic acid molecule, and the method includes detecting the nucleic acid molecule via sequencing or via hybridizing a labeled oligonucleotide probe.

In embodiments, the tissue section is an artificial tissue section, wherein the artificial tissue section includes one or more cells suspended in a hydrogel. In embodiments, the artificial tissue section includes one or more cells suspended in a hydrogel that is embedded in an optimal cutting temperature (OCT) composition. In embodiments, the artificial tissue section is prepared according to the following method: the sample containing the biomolecule of interest (e.g., a cell or a particle) is embedded in a crosslinked hydrogel (e.g., a polymer composition including 3 to 20% acrylamide and N,N-dimethylacrylamide). Any suitable hydrogel may be used, for example a hydrogel including poly(2-hydroxycthyl methacrylate) (PHEMA), optionally crosslinked with polyethylene glycol dimethacrylate; 2-hydroxyethyl methacrylate (HEMA) optionally crosslinked with TEGDMA (tricthylene glycol dimethacrylate); polyethylene glycol methacrylate (PEGMA), optionally crosslinked with TEGDMA (triethylene glycol dimethacrylate); a copolymer of methacrylic acid (MAA) and polyethylene glycol methacrylate (PEGMA), optionally crosslinked with tetra(ethylene glycol) dimethacrylate; or poly(N-isopropyl acrylamide) (PNIPAM), optionally crosslinked with N,N-methylene bisacrylamide. Additional hydrogels include a polymer such as poly(hydroxyethyl methacrylate) (PHEMA), poly(glyceryl methacrylate) (PGMA), poly(hydroxypropyl methacrylate) (PHPMA), polyacrylamide (PAM), polymethacrylamide (PMAM), polyvinyl alcohol (PVA), polyacrylic acid (PAA), polyvinyl pyrrolidone (PVP), poly($\varepsilon$-caprolactone) (PCL), poly(ethyleneimine) (PEI), poly(N,N-dimethylacrylamide) (PDMAM), poly(2-methoxyethyl acrylate) (PMEA), or a copolymer thereof. Polymer chains in a hydrogel may be crosslinked with each other chemically via covalent bonds or physically via non-covalent interactions to produce the network structure. The physical cross-linking involves hydrogen bonding, hydrophobic interactions, crystallinity, and ionic interactions. In chemically cross-linked hydrogels, covalent bonds cross-link individual polymer chains. Any suitable crosslinker may be used, for example N,N-methylene bisacrylamide, N,N-ethylene bisacrylamide, 1,4-Bis(acryloyl)piperazine, triethylene glycol dimethacrylate (TEGDMA), 1,1,1-trimethylolpropane trimethacrylate (TMPTMA), poly(ethylene glycol) dimethacrylate (PEGDMA), glyoxal, or tetramethylethylenediamineor N,N'-Bis(acryloyl)cystamine.

Following hydrogel embedding, the sample was frozen in OCT at −80° C. The frozen OCT-hydrogel complex was then sectioned (e.g., tissue sections of 5 μm and 9 μm thickness were derived). It is known that OCT compounds may impact PCR amplification, see for example Turbett and Sellner (Diagn Mol Pathol. 1997 October;6(5):298-303), so embedding the biological sample in a hydrogel first helps protect the sample from downstream effects from the OCT.

In embodiments, the tissue section is embedded in an embedding material including a polyepoxide polymer. In embodiments, the tissue section is embedded in an embedding material including polyacrylic polymer. In embodiments, the tissue section is embedded in an embedding material including agar. In embodiments, the tissue section is embedded in an embedding material including gelatin. In embodiments, the tissue section is embedded in an embedding material including celloidin. In embodiments, the tissue section is embedded in an embedding material including a cryogel. In embodiments, the tissue section is embedded in an embedding material including an optimal cutting temperature (OCT) compositions. In embodiments, the tissue section is embedded in an embedding material including one or more glycols.

In embodiments, the method further includes removing the embedding material. In embodiments, the method further includes removing the embedding material prior to contacting the tissue section of the sample-carrier construct with the receiving substrate (e.g., step C)). For example, if the embedding material is paraffin wax, the embedding material is removed by contacting the sample-carrier construct with a hydrocarbon solvent, such as xylene or hexane, followed by two or more washes with decreasing concentrations of an alcohol, such as ethanol.

In embodiments, the carrier substrate includes a hydrogel. In embodiments, the carrier substrate includes agarose, amylose, amylopectin, alginate, gelatin, cellulose, polyolefin, polyethylene glycol, polyvinyl alcohol, and/or acrylate polymers and copolymers thereof. In embodiments, the carrier substrate includes agarose, amylose, or amylopectin. In embodiments, the carrier substrate includes agarose. In embodiments, the carrier substrate includes amylose. In embodiments, the carrier substrate includes amylopectin. In embodiments, the carrier substrate includes alginate. In embodiments, the carrier substrate includes gelatin. In embodiments, the carrier substrate includes cellulose. In embodiments, the carrier substrate includes polyolefin. In embodiments, the carrier substrate includes polyethylene glycol. In embodiments, the carrier substrate includes polyvinyl alcohol. In embodiments, the carrier substrate includes acrylate polymers and copolymers thereof.

In embodiments, the hydrogel carrier substrate includes a Young's modulus of about 5 kPa to about 30 kPa. In embodiments, the hydrogel carrier substrate includes a Young's modulus of about 5 kPa to about 20 kPa. In embodiments, the hydrogel carrier substrate includes a Young's modulus of about 5 kPa to about 15 kPa. In embodiments, the hydrogel carrier substrate includes a Young's modulus of about 5 kPa, about 10 kPa, about 15 kPa, about 20 kPa, about 25 kPa, or about 30 kPa. In embodiments, the hydrogel carrier substrate includes a Young's modulus of about 5 kPa. In embodiments, the hydrogel carrier substrate includes a Young's modulus of about 10 kPa. In embodiments, the hydrogel carrier substrate includes a Young's modulus of about 15 kPa. In embodiments, the hydrogel carrier substrate includes a Young's modulus of about 20 kPa. In embodiments, the hydrogel carrier substrate includes a Young's modulus of about 25 kPa. In embodiments, the hydrogel carrier substrate includes a Young's modulus of about 30 kPa. In embodiments, the Young's modulus is quantified according to known techniques in the art (e.g., the indentation test). For example, the indentation test employs the use of an indenter which comes in to contact with and applies a perpendicular force on a small area of the carrier substrate. Alternatively, the Young's Modulus of thin elastic membranes of materials can be determined using Diaphragm tests, where the membrane is clamped at two ends and inflated in the form of a dome while the pressure of suction is controlled by a pressure controller.

In embodiments, the sample-carrier construct includes interfacial water, wherein the interfacial water is between the carrier substrate and the tissue section. In embodiments, the sample-carrier construct includes interfacial water, wherein the interfacial water is between the hydrogel carrier substrate and the tissue section.

In embodiments, the hydrogel carrier substrate includes interfacial water, wherein the interfacial water is on the surface, such that the interfacial water is between the carrier substrate and the tissue section when forming a sample-carrier construct.

In embodiments, the hydrogel carrier substrate includes about 80% to about 99% water. In embodiments, the hydrogel carrier substrate includes about 80% to about 95% water. In embodiments, the hydrogel carrier substrate includes about 80% to about 90% water. In embodiments, the hydrogel carrier substrate includes about 80% to about 85% water. In embodiments, the hydrogel carrier substrate includes about 80%, about 85%, about 90%, about 91%, about 92%, about 93%, about 94%, about 95%, about 96%, about 97%, about 98%, or about 99% water. In embodiments, the hydrogel carrier substrate includes about 80% water. In embodiments, the hydrogel carrier substrate includes about 85% water. In embodiments, the hydrogel carrier substrate includes about 90% water. In embodiments, the hydrogel carrier substrate includes about 91% water. In embodiments, the hydrogel carrier substrate includes about 92% water. In embodiments, the hydrogel carrier substrate includes about 93% water. In embodiments, the hydrogel carrier substrate includes about 94% water. In embodiments, the hydrogel carrier substrate includes about 95% water. In embodiments, the hydrogel carrier substrate includes about 96% water. In embodiments, the hydrogel carrier substrate includes about 97% water. In embodiments, the hydrogel carrier substrate includes about 98% water. In embodiments, the hydrogel carrier substrate includes about 99% water.

In embodiments, prior to contacting the tissue section of the sample-carrier construct with the receiving substrate, a portion of the sample-carrier construct is removed. Removal of a portion of the sample-carrier construct may be performed, for example, with a cutting device. The cutting device may include a sharp blade, and the cutting may be performed manually, or may be automated. In other embodiments, removal of a portion of the sample-carrier construct may be performed, for example, through the use of photon or acoustic energy (see, e.g., U.S. Pat. Pubs. US2004/0247777 and US2016/0025604, each of which is incorporated herein by reference in its entirety). In embodiments, a portion of the hydrogel carrier substrate is cut and removed from the total substrate.

In embodiments, the receiving substrate includes a functionalized glass surface or a functionalized plastic surface. Functionalization, as used herein, refers to a modification of the original surface. For example, functionalization may include topographical modifications (e.g., groves, posts, etching), chemical modifications (e.g., binding one or more compounds to the surface to alter the surface charge or bioconjugate reactive moieties on the surface), biological modifications (e.g., immobilizing one or more heparin proteins, heparin sulfate binding proteins, peptide sequences, growth factors, fibronectin, laminin, or collagen), or plasma treatment on reactive glass to generate bioconjugate reactive moieties on the surface. In embodiments, the receiving substrate is functionalized with an RGD peptide or YIGSR peptide. RGD peptide is one of the most physiologically ubiquitous binding motifs commonly used, which is found in many natural adhesive proteins such as fibronectin, vitronectin, laminin and collagen type I.

In embodiments, the receiving substrate is functionalized with one or more synthetic chemical molecules. In embodiments, the receiving substrate includes dimethyl sulfoxide (DMSO), all-trans retinoic acid (RA), dynorphin B, ascorbic acid. In embodiments, the receiving substrate includes one or more bioconjugate reactive moieties (e.g., carboxyl or amine groups) on the surface of the receiving substrate. In embodiments, the receiving substrate includes a glass solid support that is functionalized by contacting the glass solid support in triethanolamine buffer containing glutaraldehyde and 1-hydroxbenzol (HOBt), followed by contacting with 1-ethyl-3-(3-dimethylaminopropyl) carbodiimide (EDC) and/or N-hydroxysuccinimide (NHS). In embodiments, the functionalized glass surface includes (3-aminopropyl) tricthoxysilane (APTES), (3-Aminopropyl)trimethoxysilane (APTMS), γ-Aminopropylsilatrane (APS), N-(6-aminohexyl)aminomethyltriethoxysilane (AHAMTES), polyethylenimine (PEI), 5,6-epoxyhexyltriethoxysilane, or triethoxysilylbutyraldehyde, or a combination thereof. In embodiments, the functionalized glass surface includes (3-aminopropyl)tricthoxysilane (APTES). In embodiments, the functionalized glass surface includes (3-Aminopropyl) trimethoxysilane (APTMS). In embodiments, the functionalized glass surface includes γ-Aminopropylsilatrane (APS). In embodiments, the functionalized glass surface includes N-(6-aminohexyl)aminomethyltriethoxysilane (AHAMTES). In embodiments, the functionalized glass surface includes polyethylenimine (PEI). In embodiments, the functionalized glass surface includes 5,6-epoxyhexyltricthoxysilane. In embodiments, the functionalized glass surface includes triethoxysilylbutyraldehyde. In embodiments, the receiving substrate is a functionalized glass surface or a functionalized plastic surface. In embodiments, the functionalized glass surface is functionalized with APTES, APTMS, APS, or AHAMTES. In embodiments, the functionalized glass surface includes a plurality of amine moieties.

In embodiments, the tissue is immobilized to the receiving substrate by covalently binding the tissue to one or more bioconjugate reactive moieties of the receiving substrate. In embodiments, the tissue is immobilized to the receiving substrate by non-covalently binding the tissue to the receiving substrate. For non-covalent binding, the tissue sections attach to the receiving substrate surface due to surface interactions, such as Van der Waal forces, electrostatic forces, hydrophobic interactions and hydrogen bonds. The physical adsorption efficiency can be enhanced by treating the material with air plasma to increase its hydrophilicity.

In embodiments, prior to contacting the tissue section with the receiving substrate, the sample-carrier construct is stored for one or more days. In embodiments, the sample-carrier construct is stored for 1 to 90 days. In embodiments, the sample-carrier construct is stored for greater than 90 days. In embodiments, the sample-carrier construct is stored for 1 to 30 days. In embodiments, the sample-carrier construct is stored for 1, 5, 7, 14, 21, 30, 45, 60, 75, 90, or more days. In embodiments, the sample-carrier construct is stored at less than about 25° C. In embodiments, the sample-carrier construct is stored at less than about 5° C. In embodiments, the sample-carrier construct is stored at about 4° C. In embodiments, the sample-carrier construct is stored in the dark (e.g., in the absence of light, such as visible light or UV light).

In embodiments, removing the carrier substrate includes thermally removing, chemically removing, or enzymatically removing. In embodiments, removing the carrier substrate includes thermally removing. In embodiments, removing the carrier substrate includes chemically removing. In embodiments, removing the carrier substrate includes enzymatically removing. Thermally removing, for example, may include heating the carrier substrate to facilitate its detachment from the tissue section. In embodiments, thermally removing the carrier substrate includes heating the carrier substrate to about 40° C. up to about 70° C. In embodiments, thermally removing the carrier substrate includes heating the carrier substrate to about 40° C. In embodiments, thermally removing the carrier substrate includes heating the carrier substrate to about 42° C. In embodiments, thermally removing the carrier substrate includes heating the carrier substrate to about 45° C. In embodiments, thermally removing the carrier substrate includes heating the carrier substrate to about 48° C. In embodiments, thermally removing the carrier substrate includes heating the carrier substrate to about 50° C. In embodiments, thermally removing the carrier substrate includes heating the carrier substrate to about 55° C. In embodiments, thermally removing the carrier substrate includes heating the carrier substrate to about 60° C. In embodiments, thermally removing the carrier substrate includes heating the carrier substrate to about 65° C. In embodiments, thermally removing the carrier substrate includes heating the carrier substrate to about 70° C. In embodiments, chemically removing the carrier substrate may include the use of, for example, alcohols, acids, oxygen, ozone, or peroxides in combination with physical action (e.g., heat, light, ultrasound, or mechanical energy). In embodiments, enzymatically removing the carrier substrate may include treatment with a, for example, proteinase, protease, hydrolase, carboxylesterase, agarose, or chitinase. In embodiments, removing the carrier substrate includes physically removing (e.g., mechanically pulling or lifting to remove the carrier substrate).

In embodiments, removing the hydrogel carrier substrate includes thermally removing, chemically removing, or enzymatically removing. In embodiments, removing the hydrogel carrier substrate includes thermally removing. In embodiments, removing the hydrogel carrier substrate includes chemically removing. In embodiments, removing the hydrogel carrier substrate includes enzymatically removing. Thermally removing, for example, may include heating the hydrogel carrier substrate to facilitate its detachment from the tissue section. In embodiments, thermally removing the hydrogel carrier substrate includes heating the hydrogel carrier substrate to about 40° C. up to about 70° C. In embodiments, thermally removing the hydrogel carrier substrate includes heating the hydrogel carrier substrate to about 40° C. In embodiments, thermally removing the hydrogel carrier substrate includes heating the hydrogel carrier substrate to about 42° C. In embodiments, thermally removing the hydrogel carrier substrate includes heating the hydrogel carrier substrate to about 45° C. In embodiments, thermally removing the hydrogel carrier substrate includes heating the hydrogel carrier substrate to about 48° C. In embodiments, thermally removing the hydrogel carrier substrate includes heating the hydrogel carrier substrate to about 50° C. In embodiments, thermally removing the hydrogel carrier substrate includes heating the hydrogel carrier substrate to about 55° C. In embodiments, thermally removing the hydrogel carrier substrate includes heating the hydrogel carrier substrate to about 60° C. In embodiments, thermally removing the hydrogel carrier substrate includes heating the hydrogel carrier substrate to about 65° C. In embodiments, thermally removing the hydrogel carrier substrate includes heating the hydrogel carrier substrate to about 70° C. In embodiments, chemically removing the hydrogel carrier substrate may include the use of, for example, alcohols, acids, oxygen, ozone, or peroxides in combination with physical action (e.g., heat, light, ultrasound, or mechanical energy). In embodiments, enzymatically removing the hydrogel carrier substrate may include treatment with a, for example, proteinase, protease, hydrolase, carboxylesterase, agarose, or chitinase. In embodiments, removing the hydrogel carrier substrate includes physically removing (e.g., mechanically pulling or lifting to remove the hydrogel carrier substrate).

In embodiments, the receiving substrate includes a functionalized glass surface or a functionalized plastic surface. In embodiments, the functionalized glass surface includes (3-aminopropyl)triethoxysilane (APTES), (3-Aminopropyl) trimethoxysilane (APTMS), γ-Aminopropylsilatrane (APS), N-(6-aminohexyl)aminomethyltriethoxysilane (AHAMTES), polyethylenimine (PEI), 5,6-epoxyhexyl-trictethoxysilane, or trictethoxysilylbutyraldehyde, or a combination thereof.

In embodiments, prior to contacting the tissue section with the receiving substrate, the sample-carrier construct is stored for one or more days. In embodiments, the sample-carrier construct is stored for 1 to 90 days. In embodiments, the sample-carrier construct is stored for 1 to 30 days. In embodiments, the sample-carrier construct is stored at less than about 25° C. In embodiments, the sample-carrier construct is stored at less than about 5° C. In embodiments, the sample-carrier construct is stored at about 4° C.

In certain embodiments, tissue sections are tumor tissue samples. Tumor samples may contain only tumor cells, or they may contain both tumor cells and non-tumor cells. In particular embodiments, a tissue section includes only non-tumor cells. In particular embodiments, the tumor is a solid tumor. In particular embodiments, the tissue section is obtained from or includes an adrenal cortical cancer, anal cancer, aplastic anemia, bileduct cancer, bladder cancer, bone cancer, bone metastasis, brain tumor, brain cancer, breast cancer, childhood cancer, cancer of unknown primary origin, Castleman disease, cervical cancer, colon/rectal cancer, endometrial cancer, esophagus cancer, Ewing family of tumors, eye cancer, gallbladder cancer, gastrointestinal carcinoid tumors, gastrointestinal stromal tumors, gestational trophoblastic disease, head or neck cancer, Kaposi sarcoma, renal cell carcinoma, laryngeal and hypopharyngeal cancer, liver cancer, non-small cell lung cancer, small cell lung cancer, lung carcinoid tumor, lymphoma of the skin, malignant mesothelioma, myelodysplasia syndrome, nasal cavity or paranasal sinus cancer, nasopharyngeal cancer, neuroblastoma, oral cavity or oropharyngeal cancer, osteosarcoma, ovarian cancer, pancreatic cancer, penile cancer, pituitary tumors, prostate cancer, retinoblastoma, rhabdomyosarcoma, salivary gland cancer, sarcoma in adult soft tissue, basal or squamous cell skin cancer, melanoma, small intestine cancer, stomach cancer, testicular cancer, throat cancer, thymus cancer, thyroid cancer, uterine sarcoma, vaginal cancer, vulvar cancer, Waldenstrom macroglobulinemia, Wilms tumor and secondary cancers caused by cancer treatment, is a tissue section obtained from a subject diagnosed with or suspected of having any of these tumors or cancers. In embodiments, the tissue is an infected tissue, a necrotic tissue, or a diseased tissue.

In embodiments, the tissue section includes a tissue or a cell. Biological tissue samples suitable for use with the methods and systems described herein generally include any type of tissue samples collected from living or dead subjects, such as, for example, tumor tissue and autopsy samples. Tissue samples may be collected and processed using the methods and systems described herein and subjected to microscopic analysis immediately following processing, or may be preserved and subjected to microscopic analysis at a future time, e.g., after storage for an extended period of time. In some embodiments, the methods described herein may be used to preserve tissue samples in a stable, accessible and fully intact form for future analysis. For example, tissue samples, such as, e.g., human tumor tissue samples, may be processed as described herein and cleared to remove a plurality of cellular components, such as, e.g., lipids, and then stored for future analysis. In some embodiments, the methods and systems described herein may be used to analyze a fresh tissue section. In some embodiments, the methods and systems described herein may be used to analyze a previously-preserved (e.g., previously fixed) or stored tissue section (e.g., tissue sample). For example, in some embodiments a previously-preserved tissue sample that has not been subjected to a sample preparation process described herein may be processed and analyzed as described herein. In particular methods, a tissue sample is frozen prior to being processed as described herein.

In certain embodiments, tissue sections are tumor tissue samples. Tumor samples may contain only tumor cells, or they may contain both tumor cells and non-tumor cells. In particular embodiments, a tissue section includes only non-tumor cells. In particular embodiments, the tumor is a solid tumor. In particular embodiments, the tissue section is obtained from or includes an adrenal cortical cancer, anal cancer, aplastic anemia, bileduct cancer, bladder cancer, bone cancer, bone metastasis, brain tumor, brain cancer, breast cancer, childhood cancer, cancer of unknown primary origin, Castleman disease, cervical cancer, colon/rectal cancer, endometrial cancer, esophagus cancer, Ewing family of tumors, eye cancer, gallbladder cancer, gastrointestinal carcinoid tumors, gastrointestinal stromal tumors, gestational trophoblastic disease, head or neck cancer, Kaposi sarcoma, renal cell carcinoma, laryngeal and hypopharyngeal cancer, liver cancer, non-small cell lung cancer, small cell lung cancer, lung carcinoid tumor, lymphoma of the skin, malignant mesothelioma, myelodysplasia syndrome, nasal cavity or paranasal sinus cancer, nasopharyngeal cancer, neuroblastoma, oral cavity or oropharyngeal cancer, osteosarcoma, ovarian cancer, pancreatic cancer, penile cancer, pituitary tumors, prostate cancer, retinoblastoma, rhabdomyosarcoma, salivary gland cancer, sarcoma in adult soft tissue, basal or squamous cell skin cancer, melanoma, small intestine cancer, stomach cancer, testicular cancer, throat cancer, thymus cancer, thyroid cancer, uterine sarcoma, vaginal cancer, vulvar cancer, Waldenstrom macroglobulinemia, Wilms tumor and secondary cancers caused by cancer treatment, is a tissue section obtained from a subject diagnosed with or suspected of having any of these tumors or cancers.

In embodiments, the method includes detecting a biomolecule, wherein the biomolecule is in or on the tissue section. In embodiments, the biomolecule is a nucleic acid sequence, carbohydrate, or protein. In embodiments, the biomolecule is a nucleic acid sequence. In embodiments, contacting the biomolecule includes detecting the biomolecule by hybridizing one or more fluorescent probes to the biomolecule and detecting the one or more fluorescent probes. In embodiments, contacting the biomolecule (e.g., step c)) includes hybridizing a sequencing primer to the biomolecule and sequencing the biomolecule. In embodiments, sequencing includes (a) extending a sequencing primer by incorporating a labeled nucleotide, or labeled nucleotide analogue and (b) detecting the label to generate a signal for each incorporated nucleotide or nucleotide analogue.

In embodiments, sequencing includes extending a sequencing primer to incorporate a nucleotide containing a detectable label that indicates the identity of a nucleotide in the target polynucleotide, detecting the detectable label, and repeating the extending and detecting of steps. In embodiments, the methods include sequencing one or more bases of a target nucleic acid by extending a sequencing primer hybridized to a target nucleic acid (e.g., an amplification product of a target nucleic acid). In embodiments, the sequencing includes sequencing-by-synthesis, sequencing-by-binding, sequencing by ligation, sequencing-by-hybridization, or pyrosequencing, and generates a sequencing read. In embodiments, generating a sequencing read includes executing a plurality of sequencing cycles, each cycle including extending the sequencing primer by incorporating a nucleotide or nucleotide analogue using a polymerase and detecting a characteristic signature indicating that the nucleotide or nucleotide analogue has been incorporated.

In embodiments, generating a sequencing read includes determining the identity of the nucleotides in the template polynucleotide (or complement thereof). In embodiments, a sequencing read, e.g., a first sequencing read or a second sequencing read, includes determining the identity of a portion (e.g., 1, 2, 5, 10, 20, 50 nucleotides) of the total template polynucleotide. In embodiments the first sequencing read determines the identity of 5-10 nucleotides and the second sequencing read determines the identity of more than 5-10 nucleotides (e.g., 11 to 200 nucleotides). In embodiments the first sequencing read determines the identity of more than 5-10 nucleotides (e.g., 11 to 200 nucleotides) and the second sequencing read determines the identity of 5-10 nucleotides. In embodiments, following the generation of a sequencing read, subsequent extension is performed using a plurality of standard (e.g., non-modified) dNTPs until the complementary strand is copied. In other embodiments, following the generation of a sequencing read, subsequent extension is performed using a plurality of dideoxy nucleotide triphosphates (ddNTPs) to prevent further extension of the first sequencing read product during a second sequencing read. In embodiments, following the identification of at least 5-10 (e.g., 11 to 200 nucleotides, or up to 1000 nucleotides), subsequent extension is performed using a plurality of standard (e.g., non-modified) dNTPs until the complementary strand is copied. In embodiments, following the identification of at least 5-10 (e.g., 11 to 200 nucleotides, or up to 1000 nucleotides), subsequent extension is performed using a plurality of dideoxy nucleotide triphosphates (ddNTPs) to prevent further extension of the sequencing read product.

In embodiments, the detection agent includes a label. In embodiments, the detection agent includes a fluorescent label. In embodiments, the detection agent includes an oligonucleotide barcode (e.g., a 5 to 15 nucleotide sequence). In embodiments, the oligonucleotide barcode includes at least two primer binding sequences. In embodiments, the oligonucleotide barcode includes an amplification primer binding sequence. In embodiments, the oligonucleotide barcode includes a sequencing primer binding sequence. The amplification primer binding sequence refers to a nucleotide sequence that is complementary to a primer useful in initiating amplification (i.e., an amplification primer). Likewise, a sequencing primer binding sequence is a nucleotide sequence that is complementary to a primer useful in initiating sequencing (i.e., a sequencing primer). Primer binding sequences usually have a length in the range of between 3 to 36 nucleotides, also 5 to 24 nucleotides, also from 14 to 36 nucleotides. In embodiments, an amplification primer and a sequencing primer are complementary to the same primer binding sequence, or overlapping primer binding sequences. In embodiments, an amplification primer and a sequencing primer are complementary to different primer binding sequences. In embodiments, the primer binding sequence is complementary to a fluorescent in situ hybridization (FISH) probe. FISH probes may be custom designed using known techniques in the art, see for example Gelali, E., et al. Nat Commun 10, 1636 (2019). In embodiments, the detection probe is an oligonucleotide including a barcode sequence. In embodiments the oligonucleotide further includes a primer binding sequence.

In embodiments, contacting the biomolecule (e.g., step e)) includes hybridizing a padlock probe to two adjacent nucleic acid sequences of the biomolecule, wherein the padlock probe is a single-stranded polynucleotide having a 5' and a 3' end, the padlock probe includes at least one oligonucleotide barcode, and wherein the padlock probe includes a primer binding sequence. In embodiments, the method further includes ligating the 5' and 3' ends of the padlock probe to form a circular polynucleotide.

In embodiments, contacting the biomolecule (e.g., step e)) includes hybridizing a padlock probe to a nucleic acid sequence of the biomolecule, wherein the padlock probe is a single-stranded polynucleotide having a 5' and a 3' end, wherein 3' end hybridizes to a first complementary region of the biomolecule and 5' end hybridizes to a second complementary region of the biomolecule. In embodiments, the padlock probe includes a primer binding sequence. In embodiments, the method further includes extending the 3' end of the padlock probe along the nucleic acid sequence of the biomolecule to generate a complementary sequence and ligating the complementary sequence to 5' end of the padlock probe thereby forming a circular oligonucleotide.

In embodiments, the method includes sequencing an endogenous nucleic acid of a cell, the method including: contacting the cell with a polynucleotide probe including a first region and a second region, hybridizing the first region of the polynucleotide probe to a first sequence of the endogenous nucleic acid, and hybridizing the second region of the polynucleotide probe to a second sequence of the endogenous nucleic acid, thereby forming a complex including the polynucleotide probe hybridized to the endogenous nucleic acid, wherein the endogenous nucleic acid includes a target sequence between the first sequence and the second sequence; extending the polynucleotide probe with nucleotides (e.g., deoxynucleotide triphosphates (dNTPs)) along the target sequence to generate a complement of the target sequence, and ligating the complement of the target sequence to the polynucleotide probe thereby forming a circular oligonucleotide; amplifying the circular oligonucleotide to form an extension product including one or more copies of the target sequence; and sequencing the one or more copies of the target sequence in the cell.

A variety of sequencing methodologies can be used such as sequencing-by-synthesis (SBS), pyrosequencing, sequencing by ligation (SBL), or sequencing by hybridization (SBH). Pyrosequencing detects the release of inorganic pyrophosphate (PPi) as particular nucleotides are incorporated into a nascent nucleic acid strand (Ronaghi, et al., Analytical Biochemistry 242(1), 84-9 (1996); Ronaghi, Genome Res. 11(1), 3-11 (2001); Ronaghi et al. Science 281(5375), 363 (1998); U.S. Pat. Nos. 6,210,891; 6,258,568; and. 6,274,320, each of which is incorporated herein by reference in its entirety). In pyrosequencing, released Ppi can be detected by being converted to adenosine triphosphate (ATP) by ATP sulfurylase, and the level of ATP generated can be detected via light produced by luciferase. In this manner, the sequencing reaction can be monitored via a luminescence detection system. In both SBL and SBH methods, target nucleic acids, and amplicons thereof, that are present at features of an array are subjected to repeated cycles of oligonucleotide delivery and detection. SBL methods, include those described in Shendure et al. Science 309:1728-1732 (2005); U.S. Pat. Nos. 5,599,675; and 5,750, 341, each of which is incorporated herein by reference in its entirety; and the SBH methodologies are as described in Bains et al., Journal of Theoretical Biology 135(3), 303-7 (1988); Drmanac et al., Nature Biotechnology 16, 54-58 (1998); Fodor et al., Science 251(4995), 767-773 (1995); and WO 1989/10977, each of which is incorporated herein by reference in its entirety.

In embodiments, sequencing is performed according to a "sequencing-by-binding" method (see, e.g., U.S. Pat. Pubs. US2017/0022553 and US2019/0048404, each of which is incorporated herein by reference in its entirety), which refers to a sequencing technique wherein specific binding of a polymerase and cognate nucleotide to a primed template nucleic acid molecule (e.g., blocked primed template nucleic acid molecule) is used for identifying the next correct nucleotide to be incorporated into the primer strand of the primed template nucleic acid molecule. The specific binding interaction need not result in chemical incorporation of the nucleotide into the primer. In some embodiments, the specific binding interaction can precede chemical incorporation of the nucleotide into the primer strand or can precede chemical incorporation of an analogous, next correct nucleotide into the primer. Thus, detection of the next correct nucleotide can take place without incorporation of the next correct nucleotide. As used herein, the "next correct nucleotide" (sometimes referred to as the "cognate" nucleotide) is the nucleotide having a base complementary to the base of the next template nucleotide. The next correct nucleotide will hybridize at 3'-end of a primer to complement the next template nucleotide. The next correct nucleotide can be, but need not necessarily be, capable of being incorporated at the 3' end of the primer. For example, the next correct nucleotide can be a member of a ternary complex that will complete an incorporation reaction or, alternatively, the next correct nucleotide can be a member of a stabilized ternary complex that does not catalyze an incorporation reaction. A nucleotide having a base that is not complementary to the next template base is referred to as an "incorrect" (or "non-cognate") nucleotide.

In embodiments, the sequencing method relies on the use of modified nucleotides that can act as reversible reaction terminators. Once the modified nucleotide has been incorporated into the growing polynucleotide chain complementary to the region of the template being sequenced there is no free 3'—OH group available to direct further sequence extension and therefore the polymerase cannot add further nucleotides. Once the identity of the base incorporated into the growing chain has been determined, 3' reversible terminator may be removed to allow addition of the next successive nucleotide. These such reactions can be done in a single experiment if each of the modified nucleotides has attached a different label, known to correspond to the particular base, to facilitate discrimination between the bases added at each incorporation step. Alternatively, a separate reaction may be carried out containing each of the modified nucleotides separately.

In embodiments, the method further includes terminating extension by incorporating one or more unmodified dNTPs and/or one or more ddNTPs into the 3' end of the extension strand. In embodiments, the method further includes terminating extension by incorporating one or more unmodified dNTPs. In embodiments, the method further includes terminating extension by incorporating one or more ddNTPs into the 3' end of the extension strand.

The modified nucleotides may carry a label (e.g., a fluorescent label) to facilitate their detection. Each nucleotide type may carry a different fluorescent label. However, the detectable label need not be a fluorescent label. Any label can be used which allows the detection of an incorporated nucleotide. One method for detecting fluorescently labeled nucleotides includes using laser light of a wavelength specific for the labeled nucleotides, or the use of other suitable sources of illumination. The fluorescence from the label on the nucleotide may be detected (e.g., by a CCD camera, CMOS camera, or other suitable detection means).

In embodiments, the method includes detecting a protein in or on a cell, the method including: contacting a cell with a specific binding reagent (e.g., antibody, single-chain Fv fragment (scFv), antibody fragment-antigen binding (Fab), or an aptamer) and binding the specific binding reagent to the protein, wherein the specific binding reagent includes an oligonucleotide; hybridizing a first sequence of a polynucleotide to the oligonucleotide, and hybridizing a second sequence of the polynucleotide to the oligonucleotide, thereby forming a complex including the polynucleotide hybridized to the oligonucleotide, wherein the oligonucleotide includes a barcode sequence between the first sequence and the second sequence; extending the polynucleotide along the barcode sequence to generate a complement of the barcode sequence, and ligating the complement of the barcode sequence to the polynucleotide thereby forming a circular oligonucleotide; amplifying the circular oligonucleotide to form an extension product including one or more copies of the barcode sequence; and sequencing the one or more copies of the barcode sequence in or on the cell, thereby detecting the protein.

In embodiments, contacting the biomolecule includes hybridizing a padlock probe to a nucleic acid sequence of the biomolecule, wherein the padlock probe is a single-stranded polynucleotide having a 5' and a 3' end, wherein 3' end hybridizes to a first complementary region of the nucleic acid sequence and 5' end hybridizes to a second complementary region of the RNA molecule. In embodiments, the padlock probe includes a primer binding sequence. In embodiments, the method further includes extending 3' end of the padlock probe along the nucleic acid sequence of the biomolecule to generate a complementary sequence and ligating the complementary sequence to 5' end of the padlock probe thereby forming a circular oligonucleotide.

In embodiments, the method includes amplifying the circular polynucleotide by extending an amplification primer with a strand-displacing polymerase, wherein the primer extension generates an extension product including multiple complements of the circular polynucleotide. In embodiments, the method of amplifying includes an isothermal amplification method. In embodiments, the method of amplifying includes rolling circle amplification (RCA) or rolling circle transcription (RCT). In embodiments, the method of amplifying is rolling circle amplification (RCA). In embodiments, amplifying includes exponential rolling circle amplification (eRCA). Exponential RCA is similar to the linear process except that it uses a second primer (e.g., one or more immobilized oligonucleotide(s)) having a sequence that is identical to at least a portion of the circular template (Lizardi et al. Nat. Genet. 19:225 (1998)). This two-primer system achieves isothermal, exponential amplification. Exponential RCA has been applied to the amplification of non-circular DNA through the use of a linear probe that binds at both of its ends to contiguous regions of a target DNA followed by circularization using DNA ligase (Nilsson et al. Science 265(5181):208 5(1994)).

Optionally, the rolling circle amplification reaction can be done with modified nucleotides that contain chemical groups that serve as attachment points to the cell or the matrix in which the cell is embedded (e.g. a hydrogel). The attachment of the amplified product to the matrix can help confine & fix the amplicon to a small volume. In embodiments, amplification reactions include standard dNTPs and a modified nucleotide (e.g., amino-allyl dUTP, 5-TCO-PEG4-dUTP, C8-Alkyne-dUTP, 5-Azidomethyl-dUTP, 5-Vinyl-dUTP, or 5-Ethynyl dLTTP). For example, during amplification a mixture of standard dNTPs and aminoallyl deoxyuridine 5'-triphosphate (dUTP) nucleotides may be incorporated into the amplicon and subsequently cross-linked to the cell protein matrix by using a cross-linking reagent (e.g., an amine-reactive crosslinking agent with PEG spacers, such as (PEGylated bis(sulfosuccinimidyl)suberate) (BS(PEG)9)).

In embodiments, the method does not include ligation or amplification. For example, the method includes hybridizing a probe nucleic acid to the target (i.e., to a complementary region or gene of interest), wherein the probe nucleic acid is branched DNA or a concatemer and includes at least one sequencing primer binding sequence and a plurality of oligonucleotide barcodes. In embodiments, the probe nucleic acid includes a plurality of identical barcodes. In embodiments, associating an oligonucleotide barcode with each of the plurality of targets includes hybridizing a probe nucleic acid, wherein the probe nucleic acid includes branched DNA or a concatemer and includes at least one sequencing primer binding sequence and a plurality of oligonucleotide barcodes. In embodiments, the probe nucleic acid includes a plurality of identical oligonucleotide barcodes. In embodiments, the probe nucleic acid includes two or more complementary sequences to the target. In embodiments, the probe nucleic acid includes two or more different oligonucleotide barcodes.

In embodiments, the probe nucleic acid includes a two or more complementary sequences to the target. In embodiments, the probe nucleic acid includes two or more different oligonucleotide barcodes. In embodiments, the probe includes a primer binding sequence from a known set of primer binding sequences. In embodiments, the probe includes a sequencing primer binding sequence from a known set of sequencing primer binding sequences In embodiments, the detection agent includes a protein-specific binding agent. In embodiments, the detection agent includes a protein-specific binding agent bound to a nucleic acid sequence, bioconjugate reactive moiety, an enzyme, or a label. In embodiments, the protein-specific binding agent is an antibody, single domain antibody, single-chain Fv fragment (scFv), antibody fragment-antigen binding (Fab), affimer, or an aptamer.

In embodiments, the method includes detecting a plurality of biomolecules. In embodiments, the biomolecules are proteins or carbohydrates. In embodiments, the biomolecules are proteins. In embodiments, the biomolecules are carbohydrates. In embodiments when the biomolecules are proteins and/or carbohydrates, the method includes contacting the proteins with a specific binding reagent, wherein the specific binding reagent includes an oligonucleotide barcode. In embodiments, the specific binding reagent includes an antibody, single-chain Fv fragment (scFv), antibody fragment-antigen binding (Fab), or an aptamer. In embodiments, the specific binding reagent is a peptide, a cell penetrating peptide, an aptamer, a DNA aptamer, an RNA aptamer, an antibody, an antibody fragment, a light chain antibody fragment, a single-chain variable fragment (scFv), a lipid, a lipid derivative, a phospholipid, a fatty acid, a triglyceride, a glycerolipid, a glycerophospholipid, a sphingolipid, a saccharolipid, a polyketide, a polylysine, polyethyleneimine, diethylaminoethyl (DEAE)-dextran, cholesterol, or a sterol moiety. In embodiments, the specific binding reagent interacts (e.g., contacts, or binds) with one or more specific binding reagents in or on the cell. Carbohydrate-specific antibodies are known in the art, see for example Kappler, K., Hennet, T. Genes Immun 21, 224-239 (2020).

In embodiments, the method further includes digesting the tissue section by contacting the sample-carrier construct with an endopeptidase. In embodiments, the endopeptidase is pepsin.

In an aspect is provided a method of obtaining an image of a tissue section, the method including: immobilizing the tissue section onto a hydrogel carrier substrate to generate a sample-carrier construct including the carrier substrate and the tissue section; contacting the tissue section of the sample-carrier construct with a receiving substrate to generate an immobilized tissue section; removing the hydrogel carrier substrate from the immobilized tissue section; and imaging the tissue section, thereby obtaining an image of the tissue section.

In another aspect is provided a method of obtaining an image of a portion of a tissue section, the method including: A) immobilizing the tissue section onto a hydrogel carrier substrate as described herein to generate a sample-carrier construct including the carrier substrate and the tissue section; B) removing a portion of the sample-carrier construct, wherein the portion includes a portion of the carrier substrate and a portion of the tissue section; C) contacting the tissue section of the portion of the sample-carrier construct with a receiving substrate to generate an immobilized tissue section; D) removing the hydrogel carrier substrate from the immobilized tissue section; and E) imaging the tissue section, thereby obtaining an image of the portion of the tissue section.

In embodiments, the imaging reagents or stains include electron microscopy (e.g., transmission electron microscopy or scanning electron microscopy) or cryo-electron microscopy imaging reagents. Examples of electron microscopy contrast agents may include one or more heavy metals (e.g., gold particles, colloidal gold particles, uranium, lead, platinum, and/or osmium) and/or antibodies bound to one or more types of heavy metals (e.g., gold particles, colloidal gold particles, uranium, lead, platinum, and/or osmium). For example, immunogold labels that may be used to contact the tissue section include may include different antibodies bound to gold particles of different sizes to image different molecules of interest. Optionally, the method may include contacting the tissue section with heavy metals. Heavy metals that may be used to stain additional features of interest and/or provide contrast between different structures in the tissue section may include uranium, lead, platinum, and/or osmium (see, e.g., U.S. Pat. Pubs. 2019/0355550 and 2013/0344500, each of which is incorporated herein by reference in its entirety).

In an aspect is provided a method of capturing a biomolecule from a tissue section, the method including: i) immobilizing the tissue section onto a hydrogel carrier substrate as described herein to generate a sample-carrier construct; ii) contacting the tissue section of the sample-carrier construct with a receiving substrate, wherein the receiving substrate includes an immobilized specific-binding agent; and iii) binding the immobilized specific-binding agent to the biomolecule from the tissue section thereby capturing a biomolecule from the tissue section.

In embodiments, the method includes imaging the immobilized tissue section. In embodiments, the method further includes an imaging modality, immunofluorescence (IF), or immunohistochemistry modality (e.g., immunostaining). In embodiments, the method includes ER staining (e.g., contacting the tissue section with a cell-permeable dye which localizes to the endoplasmic reticula), Golgi staining (e.g., contacting the tissue section with a cell-permeable dye which localizes to the Golgi), F-actin staining (e.g., contacting the tissue section with a phalloidin-conjugated dye that binds to actin filaments), lysosomal staining (e.g., contacting the tissue section with a cell-permeable dye that accumulates in the lysosome via the lysosome pH gradient), mitochondrial staining (e.g., contacting the tissue section with a cell-permeable dye which localizes to the mitochondria), nucleolar staining, or plasma membrane staining. For example, the method includes live cell imaging (e.g., obtaining images of the tissue section) prior to or during fixing, immobilizing, and permeabilizing the tissue section. Immunohistochemistry (IHC) is a powerful technique that exploits the specific binding between an antibody and antigen to detect and localize specific antigens in cells and tissue, commonly detected and examined with the light microscope. Known IHC modalities may be used, such as the protocols described in Magaki, S., Hojat, S. A., Wei, B., So, A., & Yong, W. H. (2019). *Methods in molecular biology* (Clifton, N.J.), 1897, 289-298, which is incorporated herein by reference. In embodiments, the additional imaging modality includes bright field microscopy, phase contrast microscopy, Nomarski differential-interference-contrast microscopy, or dark field microscopy. In embodiments, the method further includes determining the cell morphology of the tissue section (e.g., the cell boundary or cell shape) using known methods in the art. For example, to determining the cell boundary includes comparing the pixel values of an image to a single intensity threshold, which may be determined quickly using histogram-based approaches as described in Carpenter, A. et al Genome Biology 7, R100 (2006) and Arce, S., Sci Rep 3, 2266 (2013)). By "microscopic analysis" is meant the analysis of a specimen using techniques that provide for the visualization of aspects of a specimen that cannot be seen with the unaided eye, i.e., that are not within the resolution range of the normal human eye. Such techniques may include, without limitation, optical microscopy, e.g., bright field, oblique illumination, dark field, phase contrast, differential interference contrast, interference reflection, epifluorescence, confocal microscopy, CLARITY-optimized light sheet microscopy (COLM), light field microscopy, tissue expansion microscopy, etc., laser microscopy, such as, two photon microscopy, electron microscopy, and scanning probe microscopy. By "preparing a biological specimen for microscopic analysis" is generally meant rendering the specimen suitable for microscopic analysis at an unlimited depth within the specimen. In embodiments, the immobilized tissue section is imaged using "optical sectioning" techniques, such as laser scanning confocal microscopes, laser scanning 2-Photon microscopy, parallelized confocal (i.e. spinning disk), computational image deconvolution methods, and light sheet approaches. Optical sectioning microscopy methods provide information about single planes of a volume by minimizing contributions from other parts of the volume and do so without physical sectioning. The resulting "stack" of such optically sectioned images, represents a full reconstruction of the 3-dimensional features of a tissue volume. A typical confocal microscope includes a 10×/0.5 objective (dry; working distance, 2.0 mm) and/or a 20×/0.8 objective (dry; working distance, 0.55 mm), with a s z-step interval of 1 to 5 µm. A typical light sheet fluorescence microscope includes an sCMOS camera, a 2×/0.5 objective lens, and zoom microscope body (magnification range of ×0.63 to ×6.3). For entire scanning of whole samples, the z-step interval is 5 or 10 µm, and for image acquisition in the regions of interest, an interval in the range of 2 to 5 µm may be used.

In embodiments, the methods described herein may further include constructing a 3-dimensional pattern of abundance, expression, and/or activity of each target from spatial patterns of abundance, expression, and/or activity of each target of multiple samples. In embodiments, the multiple samples can be consecutive tissue sections of a 3-dimensional tissue sample. For example, the method may include computationally aligning and assembling the plurality of images.

To visualize tissue sections prepared by the methods described herein, in some embodiments the tissue section is embedded in a mounting medium. Mounting medium is typically selected based on its suitability for the reagents used to visualize the cellular biomolecules, the refractive index of the tissue section, and the microscopic analysis to be performed. For example, for phase-contrast work, the refractive index of the mounting medium should be different from the refractive index of the specimen, whereas for bright-field work the refractive indexes should be similar. As another example, for epifluorescence work, a mounting medium should be selected that reduces fading, photobleaching or quenching during microscopy or storage. In certain embodiments, a mounting medium or mounting solution may be selected to enhance or increase the optical clarity of the cleared tissue specimen. Nonlimiting examples of suitable mounting media that may be used include glycerol, CC/Mount™, Fluoromount™ Fluoroshield™, ImmunHistoMount™, Vectashield™, Permount™, Acrytol™, CureMount™, FocusClear™, or equivalents thereof.

In embodiments, the method further includes cutting a sample portion from the biological sample (e.g., including cells or tissues) using a punch device such that the punch device contains the sample portion; mounting the punch device containing the sample portion onto the first solid support as described herein (e.g., inverting the punch device); pushing the sample portion out of the punch device using a piston, so that all or a portion thereof of the sample portion is positioned on the first solid support as described herein. In embodiments, the method further includes cutting a sample portion from the biological sample using two or more punch devices such that each punch device contains a different the sample portion; mounting each punch device containing the sample portion onto the first solid support as described herein; pushing the sample portions out of the punch devices using one or more pistons so that the sample portions are positioned onto the solid support as described herein (e.g., a flow cell). In embodiments, the method further includes immobilizing a plurality of tissue sections to a solid support (e.g., a flow cell), wherein a tissue in a plurality of tissue sections includes the biomolecule to be detected. In embodiments, the method includes immobilizing 24 tissue sections (10 mm×17 mm sections). In embodiments, the method includes immobilizing 40 tissue sections (10 mm×10 mm sections). In embodiments, the method includes immobilizing 128 tissue sections (4 mm×4 mm sections).

In an aspect is provided a method of detecting multiple targets. In embodiments, the method includes: (i) contacting a cell or tissue immobilized on a solid support with a probe including a detectable label, wherein the detectable label is attached to the probe via a cleavable linker; (ii) binding the probe to a target of the cell or tissue; (iii) detecting the probe bound to a target; (iv) cleaving the cleavable linker; and repeating steps (i) to (iii) to detect multiple targets. In embodiments, the target is a biomolecule. In embodiments, the biomolecule is a lipid, carbohydrate, peptide, protein, or antigen binding fragment. In embodiments, the biomolecule is a lipid. In embodiments, the biomolecule is a carbohydrate. In embodiments, the biomolecule is a peptide. In embodiments, the biomolecule is a protein. In embodiments, the biomolecule is an antigen binding fragment. In embodiments, the biomolecule is an oligonucleotide. In embodiments, the target is a nucleic acid. In embodiments, the target is a non-nucleic acid target. Non-nucleic acid targets include, but are not limited to, lipids, carbohydrates, peptides, proteins, glycoproteins, lipoproteins, phosphoproteins, acetylated variants of proteins, amidation variants of proteins, hydroxylation variants of proteins, methylation variants of proteins, ubiquitylation variants of proteins, sulfation variants of proteins, viral coat proteins, extracellular and intracellular proteins, antibodies, and antigen binding fragments. In embodiments, the target is inside a cell or on a cell surface, such as a transmembrane analyte or one that is attached to the cell membrane. In embodiments, the target is an organelle (e.g., nuclei or mitochondria).

In embodiments, the method includes: contacting a cell or tissue with a first probe set, wherein the first probe set includes a plurality of probes, wherein each probe is attached to a first detectable label; binding each probe to a different target of the cell or tissue; serially detecting each probe bound to a different target; contacting the cell or tissue with a second probe set, wherein the second probe set includes a plurality of probes, wherein each probe is attached to a second detectable label; binding each probe to a different target of the cell or tissue; and serially detecting each probe bound to a different target. In embodiments, the first probe set include 2 or more spectrally distinct fluorescent moieties, and the second set includes the same spectrally distinct fluorescent moieties as the first probe set (e.g., the first set includes Alexa Fluor® 532 and Alexa Fluor® 680, and the second set also includes Alexa Fluor® 532 and Alexa Fluor® 680). For example, detecting the probes in the first set enables the detection of the Golgi apparatus, endoplasmic reticulum, actin, lysosomes, and specific cell surface receptors of a cell. Following cleavage and removal of the fluorophores from the first probe set, the second set of probes are incubated with the sample cell. The second set can then illuminate the nucleus, nucleoli, mitochondria, nuclear envelop, cell surface receptors, and plasma membrane. The sequential addition of probe sets can continue for N cycles providing additional information about the cell. The resulting images may be computationally processed and overlaid to provide a composite image of the cell and/or tissue.

In an aspect is provided a method of immobilizing a tissue section, the method including contacting a vessel comprising a tissue section with a tissue catch tray (e.g., a tissue catch tray or carrier as described herein). In embodiments, the vessel includes water and wherein the tissue section is at or on the surface of the water. In embodiments, the tissue catch tray includes a frame that forms a periphery of a cavity having an upper end and a lower end, wherein the frame forms a peripheral trough that surrounds the cavity; a rib on the frame, wherein the rib extends into the cavity; a handle extending outwardly from the tissue catch tray; and removing the tissue catch tray from the vessel using the handle, wherein the tissue section is immobilized to the tissue catch tray.

EXAMPLES

Example 1. Carrier-Assisted Tissue Section Transfer

Biopsies and cytology specimens typically include cell and tissue sections and are a major component of disease research and clinical pathology. Unstained slides derived from formalin-fixed paraffin-embedded (FFPE) tissue sections may be analyzed using hematoxylin and eosin (H&E) histology techniques, immunohistochemistry/immunofluorescence assays and protocols, and chromogenic or fluorescent in situ hybridization methods. H&E staining of FFPE sections reviewed by a pathologist are highly valuable to ensure the presence of suitable lesional cells for molecular and other analyses (Sy J. and Ang L. C. Methods Mol. Biol. 2019; 1897:269-278). In addition to standard morphology-based imaging, more current approaches are interrogating the spatial and structural context of specimens. For example, in situ gene expression approaches, such as those commercialized by 10× Genomics, Interpace Biosciences, Thermo Fisher Scientific, and others represent an emerging area of spatial genomics. In addition, multiplexed in situ proteomic expression approaches such as those commercialized by Akoya Biosciences, Fluidigm, Ionpath, and others are developing complementary spatial proteomics approaches. For example, in situ gene expression methods typically involve attaching a section of a frozen tissue of interest to patterned microarrays carrying spatially barcoded oligo-dT primers that capture the polyadenylated transcriptome contained within the tissue section. Each spot on the microarray contains a capture probe with a spatial barcode unique to that spot allowing the individual sequencing reads to be mapped to the originating spot. After cDNA synthesis on the surface via reverse transcription, the tissue is removed and the mRNA-cDNA hybrids are released from the array to be prepared for sequencing on a separate platform; see Vickovic, S., et al. Nat. Methods 16, 987-990 (2019) for greater detail on the approach. In parallel, multiplex protein measurements in situ enable profiling multiple detectable tags simultaneously (e.g., cyclical immunostaining).

A number of new techniques have been described for reading out RNA transcription levels in tissue sections directly (i.e., in situ), without requiring spatial barcoding, based on single molecule fluorescence in situ hybridization. These include MERFISH (Multiplexed Error-Robust Fluorescence In Situ Hybridization), STARmap (Spatially-resolved Transcript Amplicon Readout mapping), FISSEQ, BaristaSeq, seq-FISH (Sequential Fluorescence In Situ Hybridization) and others (see for example Chen, K. H., et al. (2015). Science, 348(6233), aaa6090; Wang, G., Moffitt, J. R. & Zhuang, X. Sci Rep. 2018; 8, 4847; Wang X. et al; Science, 2018; 27, Vol 361, Issue 6400, caat5691; Cai, M. Dissertation, (2019) UC San Diego. ProQuest ID: Cai_ucsd_0033D_18822; and Sansone, A. Nat Methods 16, 458; 2019). In these techniques, individual RNA transcripts are individually resolved, typically with pre-amplification or requiring multiple instances of labeled probes. Some of these techniques have been combined with super-resolution microscopy, expansion microscopy, or both, to increase the resolution and allow more transcripts to be resolved and thus counted.

Methods for acquiring, preparing, and storing tissue sections for either immediate or future analysis have been largely unchanged for decades. For example, when a patient has a biopsy or surgery, the surgeon often removes a portion of tissue for examination by a pathologist. Typically when dealing with biopsy samples, the recommended approach is to process the samples by embedding individually in a supporting material such as a paraffin block or freezing the sample. The resected tissue may be snap-frozen in liquid nitrogen shortly after surgical resection, generating what is commonly referred to as "fresh frozen" tissue. Freshly obtained tissue samples require snap freezing to prevent RNA degradation and avoid crystal formation, which can cause physical damage to the tissue architecture. Once frozen, tissue samples are embedded in a freezing and embedding compound, referred to as optimal cutting temperature (OCT), to preserve the structure of the tissue and provide structural support during subsequent cryosectioning. Alternatively, preservation techniques such as formalin-fixation and paraffin embedding (FFPE) are widely used for preserving the macroscopic architecture of cellular structures (e.g., preserve tissue architecture, cell shape, and the components of the cell, such as proteins, carbohydrates, and enzymes) in tissue sections but are known to damage and alter nucleic acids. Prolonged formalin fixation causes the crosslinking of proteins and nucleic acids and random breakages in nucleotide sequences rendering downstream analyses a challenge. Fresh frozen tissue is the preferred sample for detecting gene mutations due to its superiority in preserving DNA, while FFPE tissue provides the benefits of case of storage and preservation of cellular and architectural morphology. However, the fixation and archiving process in FFPE often leads to the cross-linking, degradation, and fragmentation of DNA molecules (Gao X H et al. Front. Oncol. 2020; 10:310). In recent years with the development of additional technologies to further analyze the sample (e.g., spatial gene expression and/or proteomic analyses), extracting or transferring the sample from a glass slide/ transitional surface to another medium would be an attractive step in the processing of tissue samples. However, subsequent transfer of the tissue section to another surface often introduces additional damage to the sample. For example, once the tissue section is attached to the first surface (e.g., a typical biopsy slide, such as a charged glass surface), it may be extremely difficult to transfer again without damaging the tissue due to strong contact forces between the tissue section and attachment surface. Novel approaches for transferring biological specimens while minimizing damage are greatly needed.

Tissue samples, such as those taken by biopsy, are commonly formalin-fixed and paraffin embedded (FFPE) to allow for extended storage of the samples and the structure of the cell and sub-cellular components to be maintained. In such FFPE processing, the samples are typically fixed in a formalin solution (e.g., a 10% formalin solution may contain 3.7% formaldehyde and 1.0 to 1.5% methanol), which creates crosslinks between nucleic acids, between proteins and/or between nucleic acids and proteins. Afterward, the sample is dehydrated, e.g., by placing the sample in an alcohol, and exposed xylene. The sample is then embedded in paraffin, where the sample is surrounded by paraffin which replaces the xylene in the sample. The paraffin embedded sample (i.e., an FFPE block) can then be stored for extended periods of days, months, or years. At a desired time, the samples may then be transferred to a vessel or other system for further processing.

Once a tissue sample has been obtained and preserved (e.g., either a fresh frozen tissue block or FFPE tissue block), a scientist typically slices the tissue sample into very thin sections (e.g., sectioning using a microtome, vibratome, or cryotome). A vibratome (i.e., a vibrating microtome) is an instrument that uses a vibrating blade to cut thin slices of material, for example, from about 10 µm to about 300 µm in thickness (e.g., product number E0977 from Beyotime), or from about 1 mm to about 40 mm (e.g., model #VT1000S from Leica Biosystems). FFPE tissue sections, for example, are placed in a warm water bath and then mounted onto a glass slide following sectioning from a tissue block. The water bath temperature may be set about 5-10° C. below the melting point of paraffin (e.g., the water bath temperature is maintained at about 40-50° C.), and the tissue section is floated for several seconds or up to a few minutes to allow the section to spread open and remove any wrinkles prior to contacting the receiving substrate (i.e., the glass slide). The water bath temperature is highly dependent upon the ambient temperature in the room, the humidity, and the melting temperature of the wax. Typical water bath temperatures include about 37° C. to about 50° C. The temperature should be selected such that the water bath temperature is lower than the melting temperature of the wax, but high enough so that the section completely flattens out for even transfer.

Once on the slide, the tissue section is baked at 50-60° C., to improve adherence to the slide. Next, the tissue section may be inspected under a microscope for proper positioning of the section prior to further processing. This process (i.e., mounting a tissue section onto a glass slide) leads to a strong attachment between the tissue section and the glass slide.

Transferring intact regions of interest from a tissue section into a vessel or another slide would be very advantageous for downstream analysis. Though it would be desirable to be able to transfer undamaged tissue sections from a prepared glass slide after sectioning, current technology is limited. Subsequent transfer of the tissue section, or regions of interest, from the glass slide to another surface often introduces additional damage to the sample. For example, once the tissue section is attached to the first surface (e.g., a typical biopsy slide, such as a charged glass surface), it may be extremely difficult to transfer again without damaging the tissue section due to strong contact forces between the tissue section and attachment surface. Being able to effectively transfer tissue sections without damage or loss of material is critical when working with rare and valuable samples such as tissue biopsy specimens.

Current commercial solutions for spatial transcriptome analyses, such as the Visium Spatial Gene Expression method, requires that one to four sections be captured on a single slide using traditional approaches. A user interested in analyzing 4 FFPE samples using the Visium platform would need to float each corresponding tissue section in a water bath and catch them individually on the patterned slide, for example, in the small 6.5×6.5 mm oligo-patterned areas provided in a Visium Spatial Gene Expression Slide (10× Genomics, Item #PN-2000233). Not only are these protocols labor intensive, obtaining proper alignment and placement on the patterns slide is difficult due to the mobility of the tissue section on the surface of the as the water bath. Complicating matters, following capture and immobilization of a first tissue section, the sections may move again while retrieving subsequent tissue sections. Accordingly, the Visium for FFPE tissue protocol does not prevent the immobilized tissue sections from folding, wrinkling, or moving out of the specified target capture regions on the slide during this process.

Unique challenges arise when working with fresh frozen tissue sections. Usually upon contact with the slide, the frozen tissue sections melt and bind to the surface of the slide. To prevent the temperature differential, maintaining the slides at a reduced temperature (e.g., −20° C.) reduces tissue section thawing and allows for proper placement, however the tissue strongly adheres to the slide upon increasing the temperature. These issues are further complicated when attempting to place tissue sections into a concave well (e.g., a well of a microtiter plate). For example, the tissue sections may adhere to the walls of the wells due to various forces (e.g., electrostatic forces) that may interact with the tissue section during the transfer and mounting process. The methods described herein describe approaches that overcome existing challenges in tissue transfer-associated damage through the introduction of a carrier layer between the tissue section and the attachment surface and allow for effective transfer of tissue sections to both slides and multi-well plates (e.g., a 6-well, 12-well, 24-well, 48-well, or 96-well plate) without significant physical damage to the tissue section.

Given the challenges described supra, few commercial solutions exist for transferring frozen tissue sections onto a slide. One offering for transferring frozen tissue sections is the CryoJane Tape-Transfer System from Leica Biosystems, which uses adhesive coated slides and adhesive tapes to capture sections (see, e.g., Yang Y et al. J. Orthop. Translat. 2020; 26:92-100, which is incorporated herein by reference in its entirety). Briefly, a strip of cold adhesive tape is affixed to the trimmed frozen tissue block and a section is then cut onto the tape. The tape with the frozen tissue section is then placed on a pre-coated cold adhesive slide. UV light is then applied to the slide, converting the adhesive coating into a hard, solvent-resistant plastic, and the tape is then peeled away. Other cryofilm-based approaches have been commercialized for similar processing of tissue sections, such as Cryofilm (#C-MK001-C2, cryofilm type 2C(9) 3.5 cm, Section lab, Hiroshima, Japan), as described in Ticha P et al. Scientific Reports. 2020; 10:19510 and Kawamoto T. Arch. Histol. Cytol. 2003; 66(2): 123-143, each of which is incorporated by reference herein in its entirety. Recent modifications to the cryofilm protocol include a "sticker method", which combines cryofilm with OCT-embedded tissue samples to transfer tissue sections, instead of freeze-embedding of the tissue sample with CMC gel in hexane using a stainless-steel container, and subsequent UV light treatment (see, Ryu B et al. Journal of Neuroscience Methods. 2019; 328:108436, which is incorporated herein by reference in its entirety). These adhesive-based frozen tissue section methods have a number of shortcomings that may affect downstream analyses. First, the films are applied at the time of sectioning the tissue, slowing down the tissue sectioning process for which timing is critical given the fragile nature of frozen tissue. Secondly, these tape-based methods rely on adhesive compounds which, following mounting of the tape-transferred tissue section, are removed with organic solvents (e.g., hexane), and may therefore not be compatible with commercial multi-well plates, many of which have poor chemical compatibility with organic solvents (e.g., multi-well plates made from polystyrene). These studies on adhesive tape-based transfer of frozen tissue sections also did not explore the stability of the tissue sections after transferring, for example, stability after heating and cooling the transferred tissue section. Adhesive removal, and treatment with solvents, may impact the structural integrity of the tissue sections when subjected to thermal variation.

The methods described herein are applicable to both freshly cut tissue and frozen tissue samples, as well as preserved samples, and are compatible with a broad range of downstream applications such as in situ sequencing and proteomic analysis. In lieu of a glass slide, tissue sections are first mounted on a carrier substrate, forming a sample-carrier construct. An overview of this process is provided in FIG. 1, for example. In embodiments, the carrier substrate includes a hydration layer (i.e., interfacial water layer) between the tissue section and the carrier substrate hydrated prior to transfer to a final substrate (e.g., a charged glass slide). In contrast to the adhesive tape-based methods discussed supra, the carrier substrate described herein is free of adhesives and does not require UV curing following transfer to the final substrate. Reducing the strength of the tissue section adherence to the carrier substrate facilitates subsequent detachment and transference without damaging the tissue. Maintaining hydration of the tissue section is also useful for facilitating transfer from the carrier substrate to the final target surface. Under hydrated conditions, the tissue section is more likely to have complete contact with a hydration layer surface of the carrier substrate while exhibiting reduced contact forces, in comparison to dehydrated conditions. After dehydration, ideally once the tissue section is transferred to the final surface, strong surface interactions (e.g., van der Waals and/or electrostatic interactions) result in the tissue section being retained on the surface. For example, the carrier substrate may include agarose or gelatin.

Figure 2A:
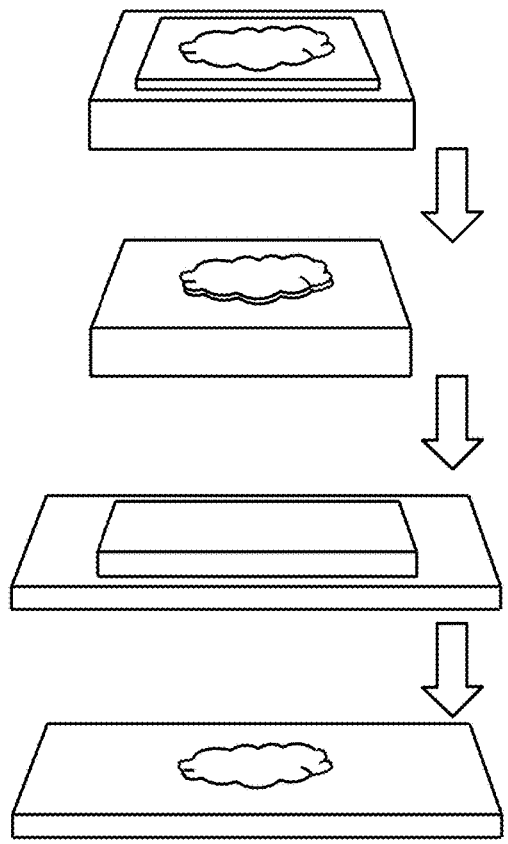
FIGS. 2A-2C illustrate different workflows for the sample-carrier constructs. For example.
Figure 2B:
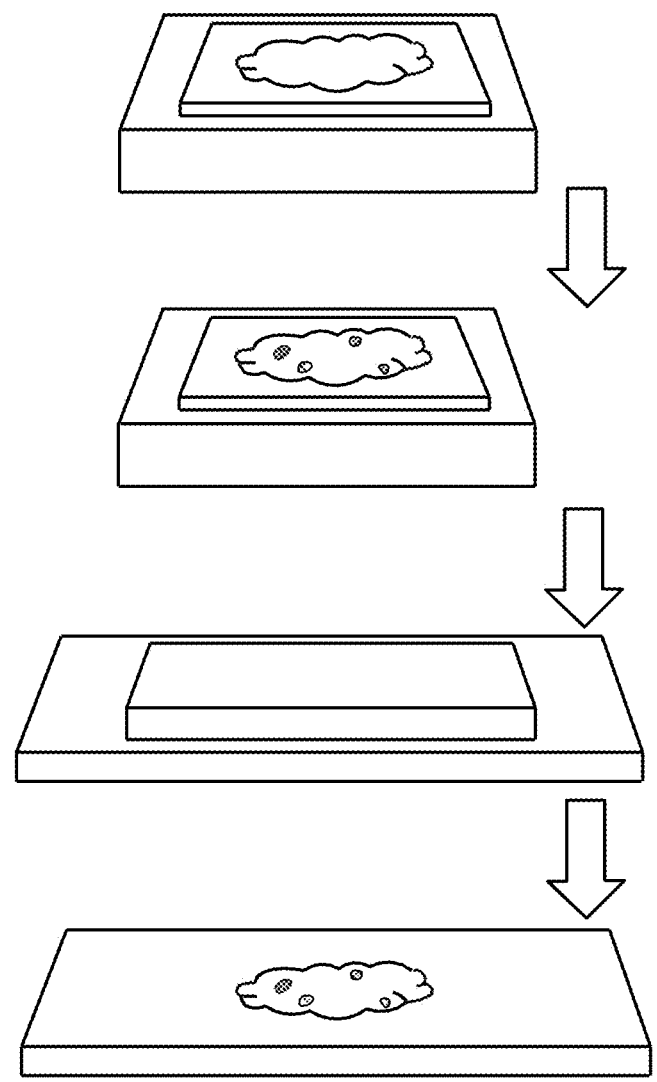
Figure 2C:
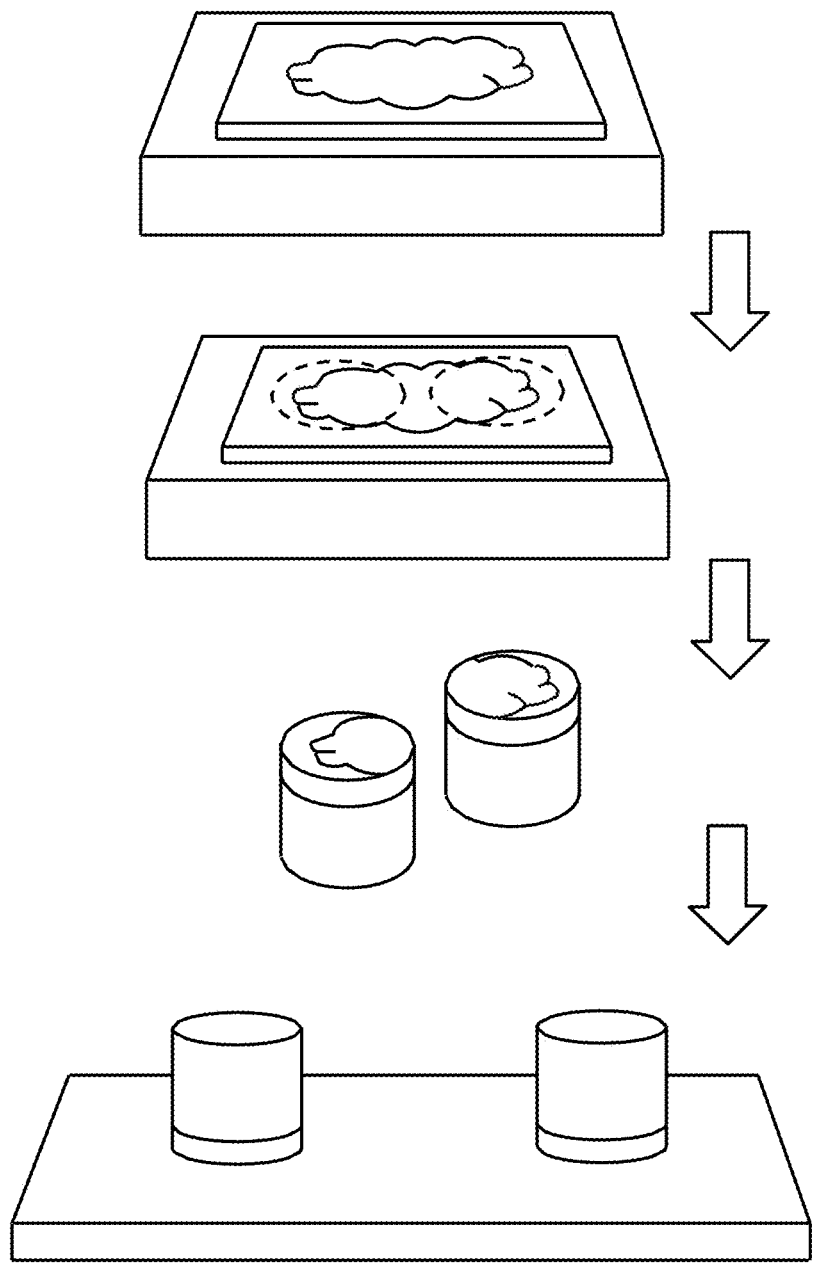
Figure 3A:
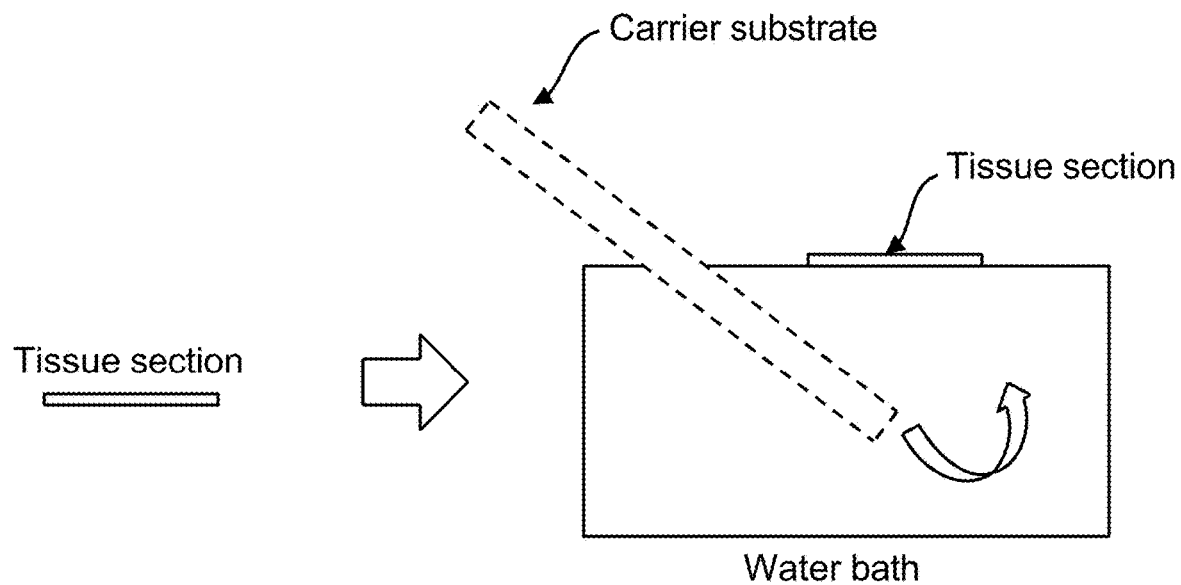
FIGS. 3A-3B describes tissue section transfer techniques. In an embodiment, a carrier substrate (e.g., a hydrophilic polymeric gel) is used to facilitate tissue section transfer. As illustrated, a tissue section, for example, an FFPE tissue section is placed in a water bath and then caught with a carrier substrate, yielding a sample-carrier construct (FIG. 3A). In embodiments, the carrier substrate maintains a hydrated interfacial surface (i.e., a plurality of water molecules at the surface forming an interstitial water layer) depicted as a solid bar between the tissue section and the carrier substrate. Without wishing to be bound by any theory, the interfacial water is useful at facilitating transfer and does not significantly affect the structural integrity of the tissue section upon subsequent transfer. The hydrophobicity of the carrier substrate may impact how the sample is captured. In embodiments, a substantially hydrophilic carrier substrate is at least partially submerged into the water bath, and the tissue section is attracted to the substrate and may be pulled out of the water bath. Alternatively, a substantially hydrophobic carrier substrate is at least partially submerged into the water bath and pushed up against the tissue section to promote adherence. The resulting construct is then applied to a receiving substrate (e.g., bare or functionalized glass, plastic, polymer receiving substrate) such that the tissue section can contact and become immobilized on the receiving substrate (FIG. 3B). Following transfer of the tissue section, the carrier substrate is removed. The bound FFPE tissue section may then be subjected additional manipulation (e.g., deparaffinization), and/or analyses (e.g., tissue labeling, and imaging) as required by the specific application.
Figure 3B:
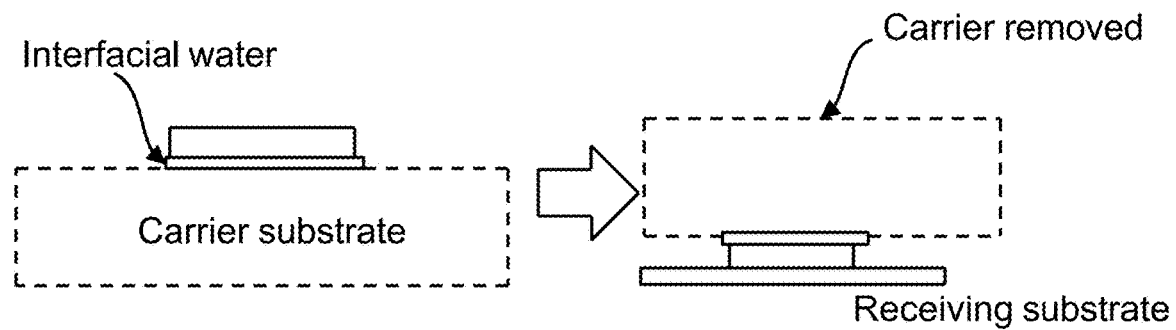

The sample-carrier construct can undergo additional manipulations, see for example FIGS. 2A-2C that illustrate different workflows for the sample-carrier constructs. For example, FIG. 2A depicts a sample-carrier construct (i) wherein the sample is embedded in an embedding material, e.g., paraffin wax. The embedding material is then removed, for example when the embedding material is paraffin wax by contacting the construct with an organic solvent such as xylene or heptane, leaving the tissue section on the construct, as illustrated in step (ii) of FIG. 2A. The tissue section of the construct is then contacted with a receiving substrate (e.g., bare or functionalized glass, plastic, polymer receiving substrate), see step (iii) of FIG. 2A, followed by removal of the carrier substrate, see step (iv) of FIG. 2A. Alternatively, the sample-carrier construct may be subjected to fluorogenic and/or chromogenic counterstaining (e.g., H&E staining) methods to aid in visualization and identifying details of the cell types, organelles, structures in the tissue section. The tissue section of the construct is then contacted with a receiving substrate (e.g., bare or functionalized glass, plastic, polymer receiving substrate), see step (iii) of FIG. 2B, followed by removal of the carrier substrate, see step (iv) of FIG. 2B. Shown in FIG. 2C is an overview of selected removal of one or more portions of the construct. To a sample-carrier construct, (i) of FIG. 2C, one or more portions of the construct are removed, for example using a cutting device, and depicted as dashed lines in step (ii) of FIG. 2C. The resulting portions of the construct, illustrated in step (iii) of FIG. 2C, are then contacted with a receiving substrate, such that the tissue section of the portion is in contact with the receiving substrate, as shown in step (iv) of FIG. 2C.

In an embodiment, the tissue section is transferred from a carrier substrate (e.g., a hydrophilic polymeric layer) to a receiving substrate (e.g., charged glass surface). In embodiments, the carrier substrate includes agarose, gelatin, polyacrylamide, or any suitable hydrogel. In embodiments, the carrier substrate includes a hydrophilic surface (e.g., an interfacial water layer). The hydrophilic surface maintains the tissue section wet at the point of contact with the underlying attachment surface and prevents damage to the tissue during the transfer process. As an example, an agarose gel layer with similar dimensions to the charged glass slide is prepared for use as a carrier substrate using methods described. The concentration of agarose is chosen to provide optimal support for the tissue section to be transferred, and to prevent tissue section distortion during subsequent transfer steps.

Figure 4A:
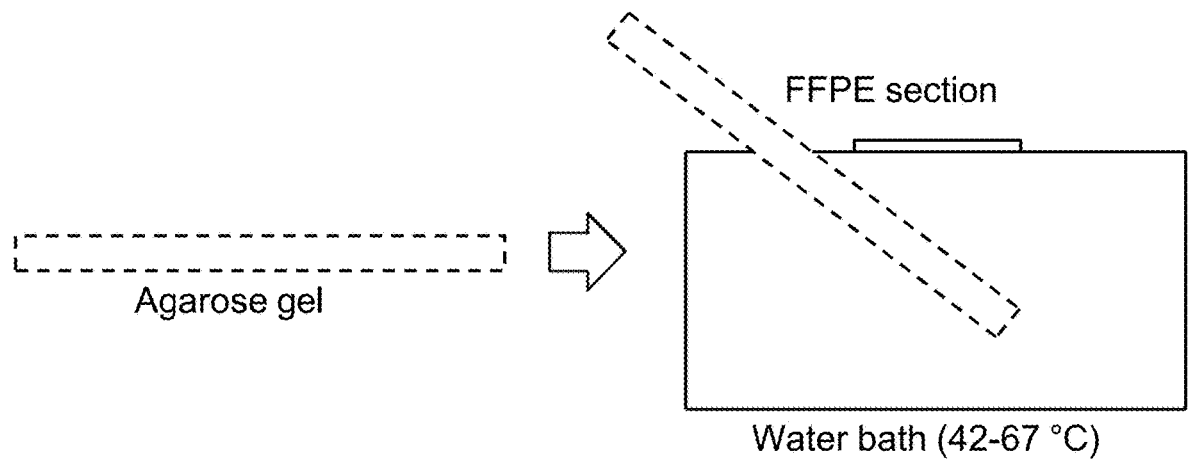
FIGS. 4A-4C presents a diagram of an embodiment described herein using a carrier substrate for tissue section transfer onto a glass slide. In this embodiment, the carrier substrate is an agarose gel and is prepared and placed in a warm water bath (e.g., maintained at a temperature between 42° C. and 67° C.), as shown in FIG. 4A. An FFPE tissue section floats in the water bath, followed by contacting the tissue section with the agarose gel to layer it atop the agarose. The tissue section and agarose gel (collectively referred to as a sample-carrier construct) are removed from the warm water bath and allowed to cool without completely drying out. A portion of the construct is removed, for example using a cutting device, e.g., a hole punch or cutting blade. Multiple portions may be made from a single tissue section. The portions (i.e., cutouts) are then mounted onto a functionalized glass slide by bringing the tissue section in contact with the glass surface. The glass, tissue section, and agarose are then heated to facilitate removal of the agarose gel while retaining the tissue section on the glass surface.
Figure 4B:
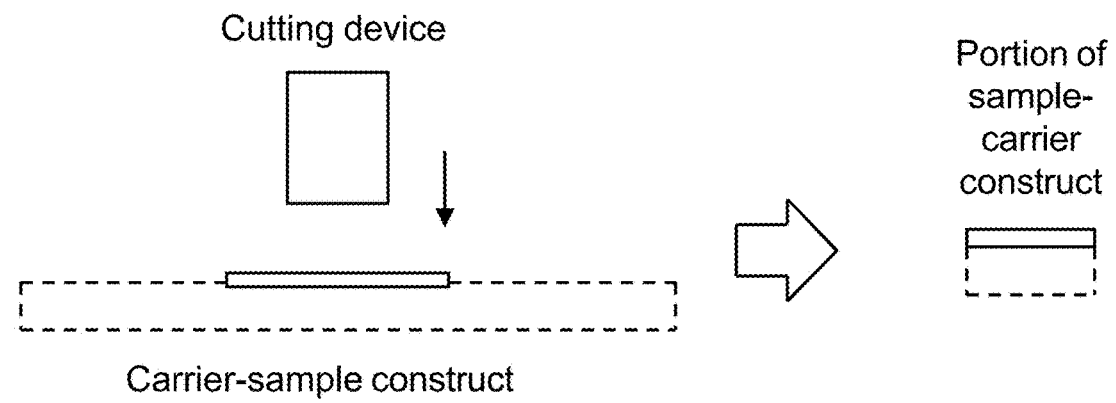
Figure 4C:
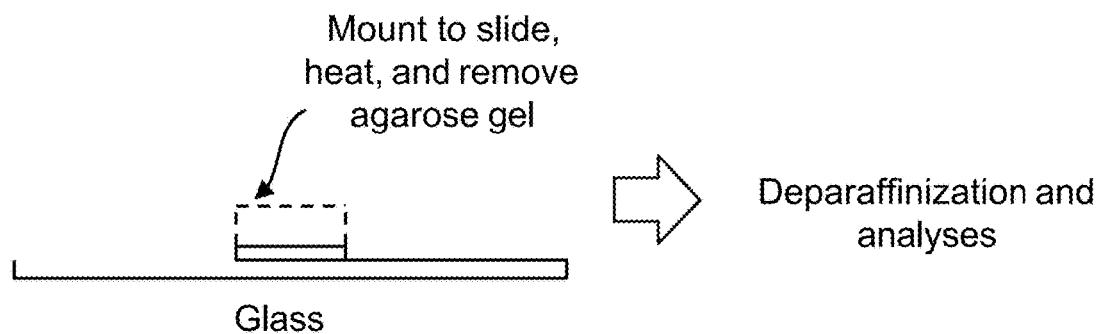

For example, an agarose gel medium is prepared by dissolving agarose powder in boiling nuclease-free water such that the final concentration of the agarose gel is between 2% to 5%. The dissolved agarose is then poured into the mold and cooled to cast the gel. In embodiments, and depending on the thickness of the tissue section, an agarose concentration of at least 5% or higher may be preferable when facilitating tissue transfer to provide rigidity and avoid fracturing tissue sections. Once the agarose surface is prepared, the agarose surface and tissue section (e.g., a FFPE tissue section) are contacted in a warm water bath (e.g., a water bath with a temperature setpoint of about 42° C.) such that the floating FFPE section can be mounted on the surface of the agarose gel layer (see, e.g., FIGS. 3A-3B and FIGS. 4A-4C). The agarose contacted FFPE section is then removed from the incubation bath and allowed to dry. Portions of the agarose-FFPE construct are then cut and removed, (e.g., punched-out using a small hole punch with sharp edges), and subsequently mounted on a charged glass slide such that the FFPE section is contacted directly with the glass surface (see FIG. 2C and FIGS. 4B-4C). The removed portion may be cut according to any dimension depending on the application and region of interest, for example the diameter and dimensions of individual portions may be suitable for use in 96-well, 48-well, 24-well, and 12-well plates, or placement on a receiving substrate suitable for a microfluidic device (e.g., a flow cell). The agarose-tissue section cutout is then gently pressed and heated (e.g., heated to anywhere between 42° C. or 67° C.) to facilitate release of the agarose layer from the slide, leaving behind the FFPE tissue section on the glass slide. In embodiments, the agarose-tissue section cutout is then gently pressed and heated to about 37° C., about 38° C., about 39° C., about 40° C., about 41° C., about 42° C., about 43° C., about 44° C., about 45° C., about 46° C., about 47° C., about 48° C., about 49° C., about 50° C., about 51° C., about 52° C., about 53° C., about 54° C., about 55° C., about 56° C., about 57° C., about 58° C., about 59° C., about 60° C., about 61° C., about 62° C., about 63° C., about 64° C., about 65° C., about 66° C., about 67° C., about 68° C., about 69° C., about 70° C., about 71° C., about 72° C., about 73° C., about 74° C., or about 75° C.

When considering a carrier substrate for effective tissue transfer onto a receiving substrate, for example, the carrier substrate composition (e.g., the percentage of agarose in an agarose gel layer) should withstand manipulation (e.g., have a Young's modulus to support handling by a user during tissue section catching, cutting, and transferring, wherein the Young's modulus is between about 5 kPa to about 2.5 MPa, or more) while effectively transferring the tissue section onto the receiving substrate. As illustrated in FIG. 12, several tissue section samples were transferred from a series of agarose gel layers, wherein each agarose gel layer contained a different weight percentage of agarose (e.g., 0.5%, 1%, 2%, 5%, or 10%, as indicated in the photograph). Both 0.5% and 1% agarose gel layers effectively transferred the tissue sections, as shown in FIG. 12, but may require additional care while handling due to their low expected compression modulus (e.g., about 5 kPa and about 40 kPa, respectively), in contrast with the 2%, 5%, and 10% agarose gel layers, each of which have a higher expected compression modulus (e.g., about 100 kPa, about 900 kPa, and about 2.5 MPa, respectively). An agarose gel layer with a higher compression modulus of about 100 kPa to about 1 MPa, or more, may therefore provide easier handling while retaining effective tissue transfer properties as described herein. Additional information on the mechanical properties of agarose gels is described, e.g., in Normand V et al. Biomacromolecules. 2000; 1(4): 730-8, which is incorporated herein by reference in its entirety.

In another embodiment, a fresh frozen tissue section is prepared using a cryostat with a temperature setpoint of about −15° C. to about −25° C. The tissue section is then mounted directly onto a carrier substrate (e.g., an agarose polymeric layer) to transfer it onto a glass slide or multiwell plate, bypassing the water bath floating step that described supra for FFPE tissue section transfers. The capture regions of various sizes of multiwell plates and commercial slides can vary in surface area, and each may be suitable for use in an embodiment of the invention. As the polymeric layer has reversible adherence to the fresh frozen tissue section, the issues that typically exist when mounting frozen tissue sections onto glass slides (e.g., rapid melting and binding) are overcome using the methods described herein.

Various properties of the carrier substrate being used may be optimized for more effective transfer of the tissue section, including the stiffness of the hydrophilic material, for example, whether the layer forms a softer or harder gel. The thickness of the gel may also contribute to whether there is any deformation of the tissue section while it is being cut from the construct. The methods presented herein describe a novel approach to transferring fresh or preserved tissue sections onto a final medium (e.g., a receiving substrate, such as a functionalized glass slide) that minimizes tissue damage and is scalable, flexible, and also compatible with the conventional lab equipment and consumables, enabling easy adaptation and automation.

Example 2. Tissue Transfer Devices for Loading a Flow Cell

There has been developed a method for tissue transfer to NGS sequencing slides (e.g., Singular Genomics sequencing slides used in flow cells) that enables easy and precise placement a plurality of unique sections (e.g., 24 unique sections, depending on the tissue section punch size) per flow cell and simplifies the overall workflow for identifying regions of interest. The method builds on standard pathology protocols for sectioning FFPE blocks on a microtome, followed by floating the individual sections in a water bath and then capturing each section using a carrier substrate. A punch device is used to cut out the region of tissue with desired characteristics. For example, using a holder apparatus (punch tool including a plunger or actuator for retaining and expelling a punch cutting device). The cutter portion of the punch is removed, flipped, and placed in a receiving array. After the punch devices are loaded, a glass slide in a holder is aligned over the tissue array. The glass slide may include channels. Alternatively, the glass slide may be substantially planar and a channel slide is later affixed to the planar glass slide to form one or more channels, after the tissue samples have been deposited. The glass slide may be functionalized. The holder may contain an indentation, recession, or suitable pocket for receiving the glass slide. One or more retention mechanisms may be included with the holder for securing and aligning the glass slide.

This workflow allows for robust and consistent high density spatial patterning of sections in flow cells. Finally, heat (e.g., 30° C.-40° C.) and pressure (e.g., a downward force of about 5-10 N, such as the weight of a 1 kg weight placed on the assembly, 9.8 N) are applied to release the section from the carrier substrate, then baking is used as normal for tissue transfer onto glass. From this point on, tissue handling returns to standard pathology protocols. The total sample area that can be achieved on one slide/flow cell is unparalleled across existing spatial platforms. Using the methods and devices as described herein on a Singular Genomics in situ sequencing platform enables results for up to 96 unique sections (e.g., when the sections of cut tissue are about 4 mm in diameter).

Existing platforms can all only process a handful of small samples per week at peak performance, making their use expensive and often niche. The level of throughput our system provides will transform what is possible with in situ transcript and protein profiling, including enabling large cohort studies and 3D reconstructions from multiple 5 μm sections. This approach dramatically improves the workflow for tissue handling and unlocks higher density tissue placement than is possible on other platforms.

What is claimed is:

1. A tissue catch tray assembly, comprising:
   a tissue catch tray formed of a frame that forms a periphery of a cavity having an upper end and unenclosed lower end, wherein the frame has an outer peripheral wall and an inner peripheral wall concentrically positioned within the outer peripheral wall wherein the outer peripheral wall and the inner peripheral wall collectively form therebetween a peripheral trough that surrounds the cavity, and wherein the cavity is configured to contain a three-dimensional polymer slab;
   a handle extending outwardly from the tissue catch tray; and
   a cover film removably positionable on a bottom of the frame such that the cover film encloses a lower end of the cavity and forms a bottom surface of the cavity when positioned on the bottom of the frame.

2. The tissue catch tray assembly of claim 1, wherein the tissue catch tray comprises a rib on the frame, wherein the rib extends into the cavity.

3. The tissue catch tray assembly of claim 2, wherein the rib extends into the cavity from a peripheral wall of the frame, and wherein the rib extends around an inner perimeter of the cavity.

4. The tissue catch tray assembly of claim 3, wherein the rib extends around an entire inner perimeter of the cavity.

5. The tissue catch tray assembly of claim 3, wherein the rib extends around only a portion of the inner perimeter of the cavity.

6. The tissue catch tray assembly of claim 1, further comprising a planar substrate removably positionable on a top of the frame such that the substrate encloses a top end of the cavity such that the cavity is positioned between the planar substrate and the cover film.

7. The tissue catch tray assembly of claim 6, further comprising a lid that removably attachable to a top end of the frame such that the substrate is interposed between the lid and the cavity.

8. The tissue catch tray assembly of claim 1, wherein the frame forms an outer peripheral wall that surrounds the cavity and an inner peripheral wall that surrounds the cavity, and wherein the peripheral trough is positioned between the outer peripheral wall and the inner peripheral wall.

9. The tissue catch tray assembly of claim 1, wherein the cavity forms a mold for forming a three-dimensional polymer slab.

10. The tissue catch tray assembly of claim 1, wherein the handle comprises a planar structure that extends outwardly from a side of the outer peripheral wall of the tissue catch tray.

11. A method of immobilizing a tissue section, the method comprising:
   contacting a vessel comprising a tissue section with a tissue catch tray having an outer peripheral wall and an inner peripheral wall concentrically positioned within the outer peripheral wall wherein the outer peripheral wall and the inner peripheral wall collectively form therebetween a trough, wherein the vessel comprises water and wherein the tissue section is at or on the surface of the water, and wherein the tissue catch tray comprises:
   a frame comprising a three-dimensional polymer slab;
   a handle extending outwardly from the tissue catch tray; and removing the tissue catch tray from the vessel using the handle, wherein the tissue section is immobilized to the tissue catch tray.

\* \* \* \* \*